United States Patent
Li et al.

(10) Patent No.: US 12,068,876 B2
(45) Date of Patent: Aug. 20, 2024

(54) COMMUNICATION METHOD AND APPARATUS

(71) Applicant: Huawei Technologies Co., Ltd., Shenzhen (CN)

(72) Inventors: Meng Li, Beijing (CN); Yanmei Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/899,275

(22) Filed: Aug. 30, 2022

(65) Prior Publication Data

US 2022/0407730 A1 Dec. 22, 2022

Related U.S. Application Data

(63) Continuation of application No. PCT/CN2020/077374, filed on Mar. 1, 2020.

(51) Int. Cl.
*H04L 12/18* (2006.01)

(52) U.S. Cl.
CPC ........ *H04L 12/184* (2013.01); *H04L 12/1845* (2013.01)

(58) Field of Classification Search
CPC ... H04L 12/184; H04L 12/1845; H04L 65/80; H04L 65/611; H04W 76/11; H04W 76/12; H04W 76/19; H04W 76/40
See application file for complete search history.

(56) References Cited

U.S. PATENT DOCUMENTS

| | | | |
|---|---|---|---|
| 2018/0199243 A1* | 7/2018 | Bharatia | H04W 36/0066 |
| 2019/0289459 A1 | 9/2019 | Shan | |
| 2020/0068528 A1* | 2/2020 | Abraham | H04L 1/1854 |
| 2020/0336940 A1* | 10/2020 | Salkintzis | H04W 28/085 |
| 2022/0321485 A1* | 10/2022 | Rost | H04W 28/0263 |

FOREIGN PATENT DOCUMENTS

| | | |
|---|---|---|
| CN | 109699013 A | 4/2019 |
| CN | 110167190 A | 8/2019 |
| CN | 110366131 A | 10/2019 |

(Continued)

OTHER PUBLICATIONS

"3rd Generation Partnership Project; Technical Specification Group Services and System Aspects; System architecture for the 5G System (5GS); Stage 2 (Release 16)," 3GPP TS 23.501 V16.3.0, pp. 1-417, 3rd Generation Partnership Project, Valbonne, France (Dec. 2019).

(Continued)

*Primary Examiner* — Farzana B Huq
(74) *Attorney, Agent, or Firm* — Leydig, Voit & Mayer, Ltd.

(57) ABSTRACT

A communication method for transmitting multicast data by using a same multicast user plane function (UPF) includes: a first session management function (SMF) obtains forwarding configuration information or quality of service (QoS) context information of multicast data, and sends, to a second SMF, first path information for establishing a transmission path for multicast data transmission between a multicast UPF and a unicast UPF, or second path information for establishing a transmission path between the multicast UPF and an access network device.

19 Claims, 24 Drawing Sheets

(56) References Cited

FOREIGN PATENT DOCUMENTS

| WO | 2019136128 A1 | 7/2019 |
| WO | 2019137546 A1 | 7/2019 |
| WO | 2019223005 A1 | 11/2019 |

OTHER PUBLICATIONS

"3rd Generation Partnership Project; Technical Specification Group Core Network and Terminals; Non-Access-Stratum (NAS) protocol for 5G System (5GS); Stage 3 (Release 16)," 3GPP TS 24.501 V16.3.0, pp. 1-645, 3rd Generation Partnership Project, Valbonne, France (Dec. 2019).

"3rd Generation Partnership Project; Technical Specification Group Services and System Aspects; Architecture enhancements for 5G System (5GS) to support Vehicle-to-Everything (V2X) services (Release 16)," 3GPP TS 23.287 V16.1.0, pp. 1-51, 3rd Generation Partnership Project, Valbonne, France (Dec. 2019).

"3rd Generation Partnership Project; Technical Specification Group Services and System Aspects; Procedures for the 5G System (5GS); Stage 2 (Release 16)," 3GPP TS 23.502 V16.3.0, pp. 1-558, 3rd Generation Partnership Project, Valbonne, France (Dec. 2019).

Qualcomm Incorporated, "Solution: Integrated Multicast and Unicast Transport with Full Separation of MBS Service," SS WG2 Meeting #136-AH, Incheon, South Korea, S2-2000266, Total 8 pages, 3rd Generation Partnership Project, Valbonne, France (Jan. 13-17, 2020).

Vivo, "Solution for multicast session management," SA WG2 Meeting #136AH, Seoul, Korea, S2-2001428, Total 6 pages 3rd Generation Partnership Project, Valbonne, France (Jan. 13-17, 2020).

\* cited by examiner

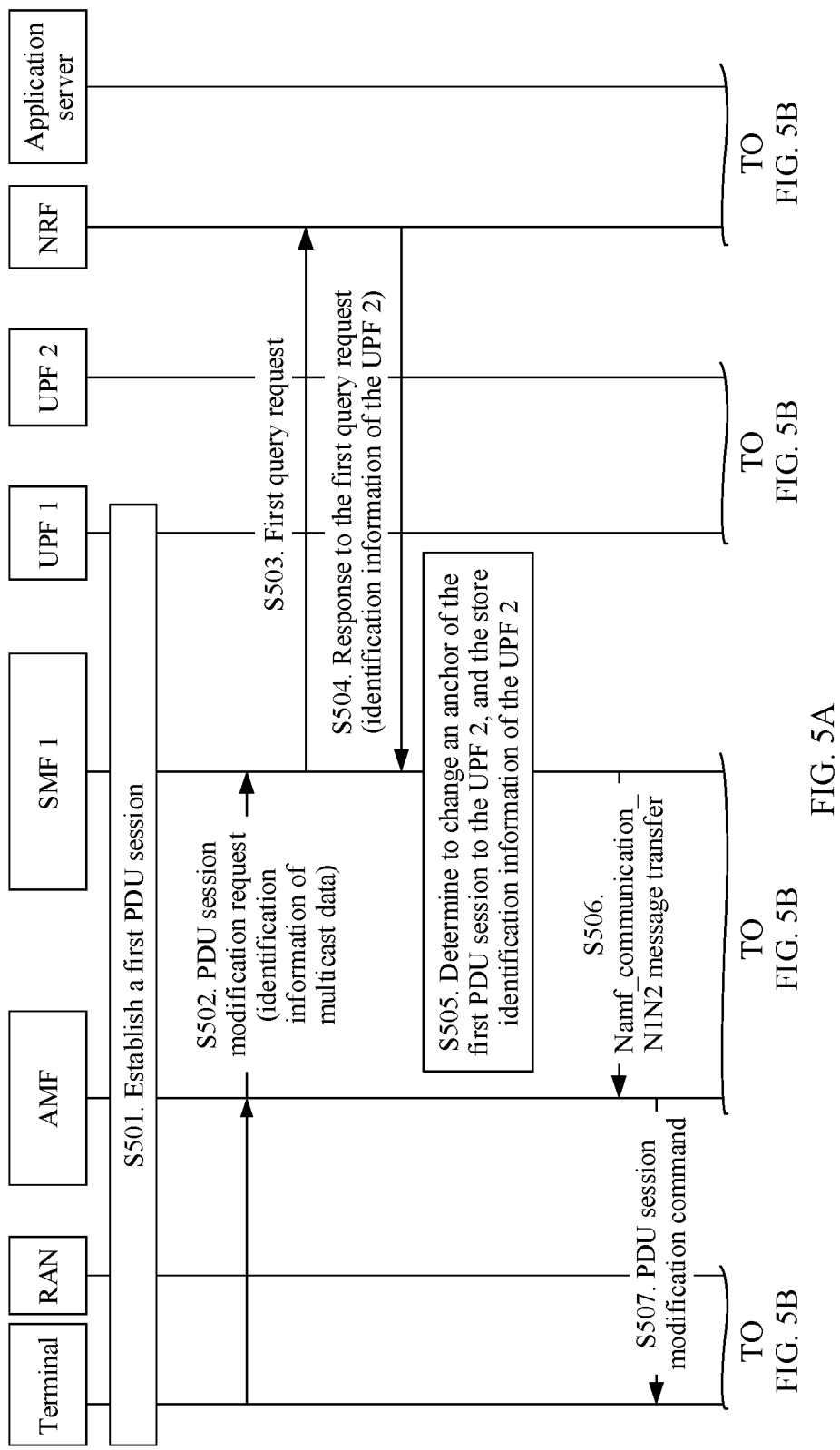

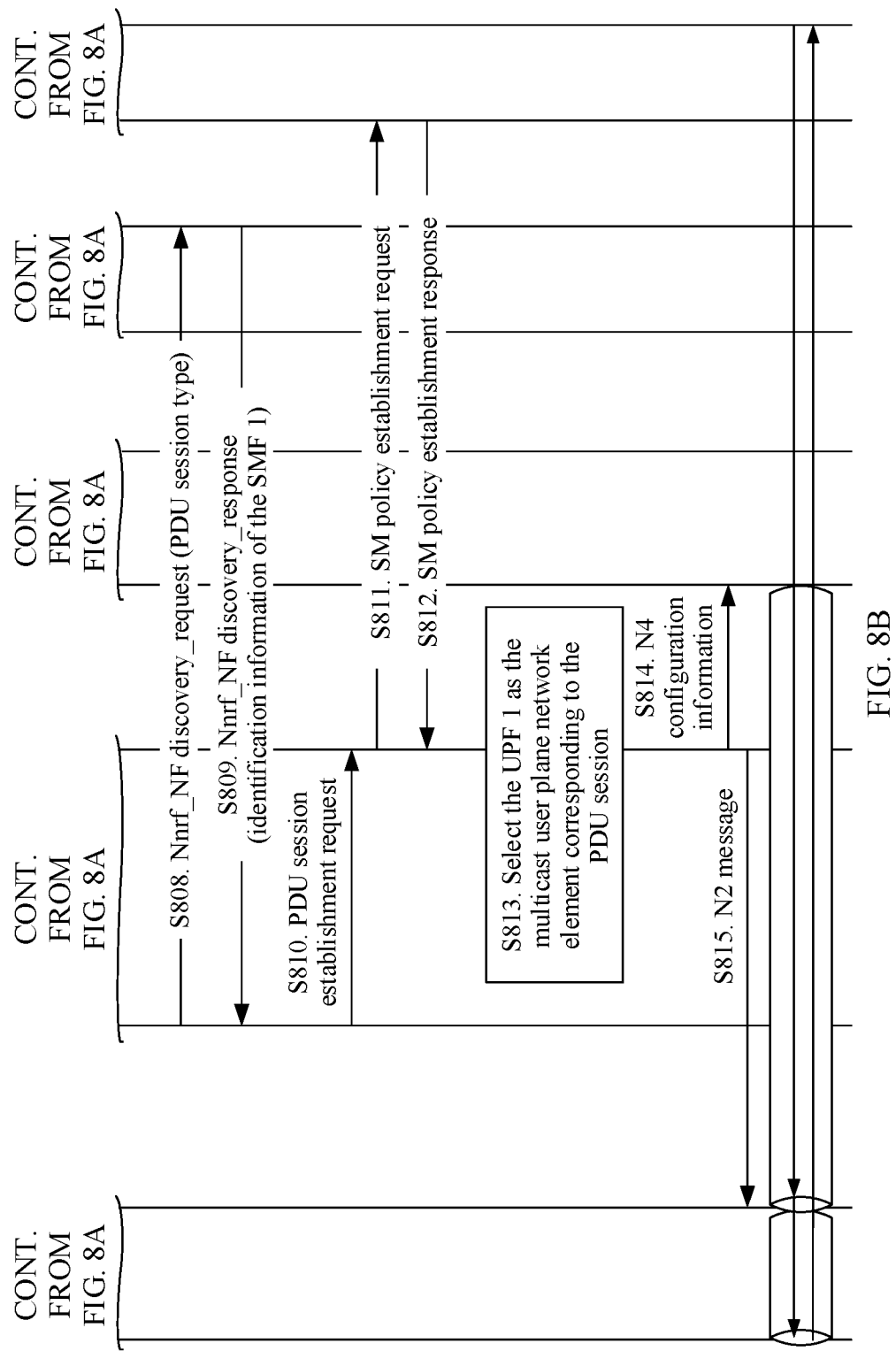

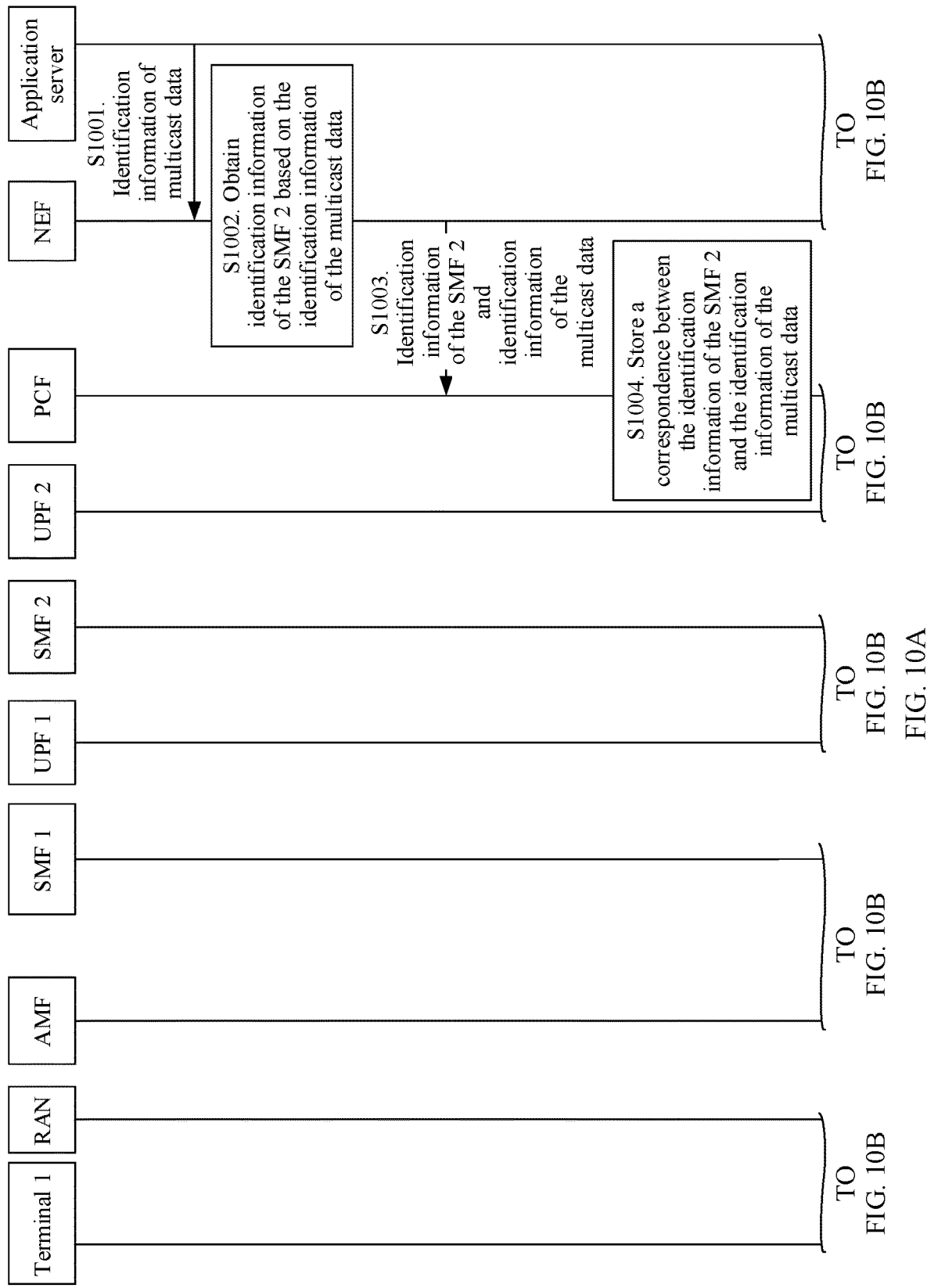

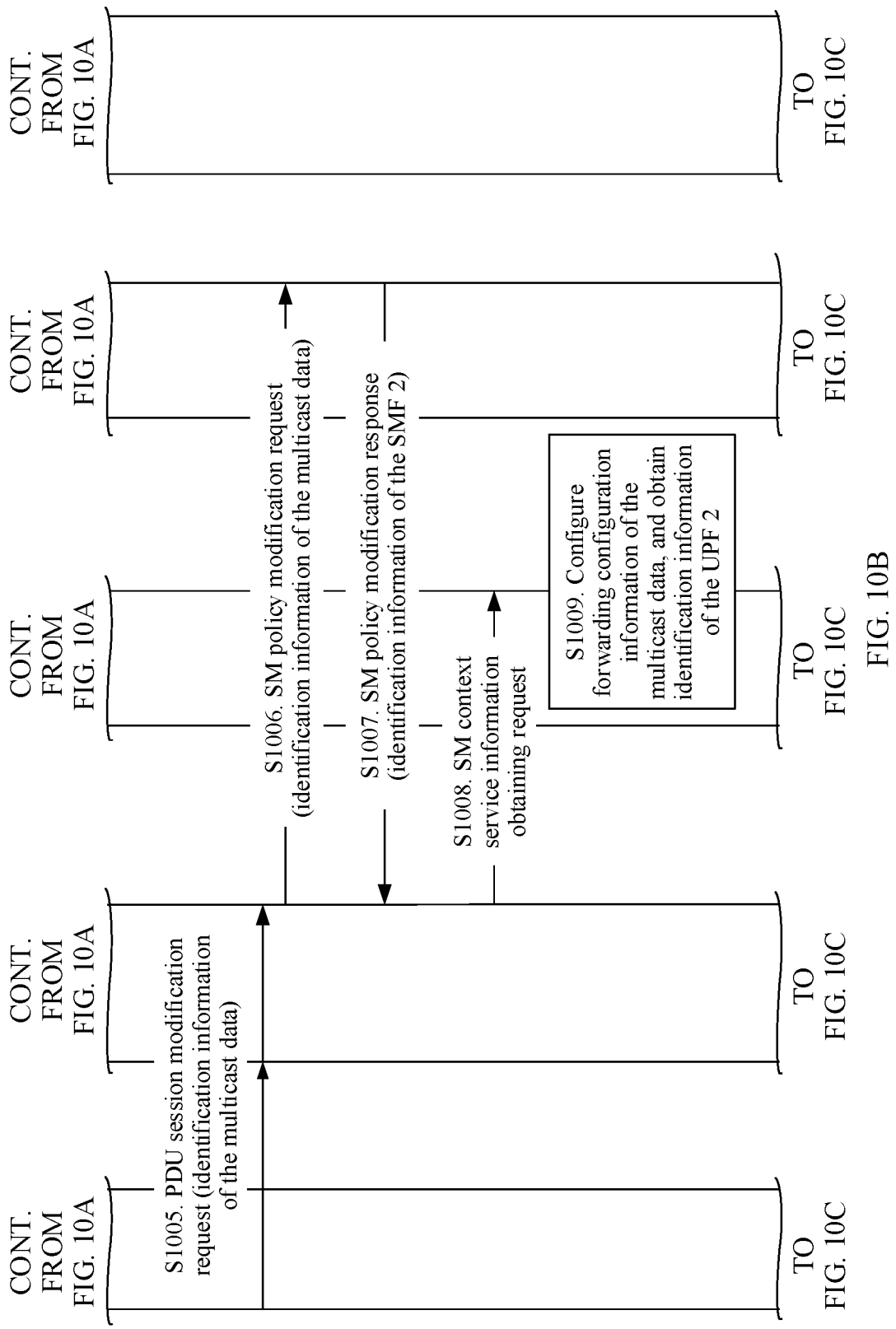

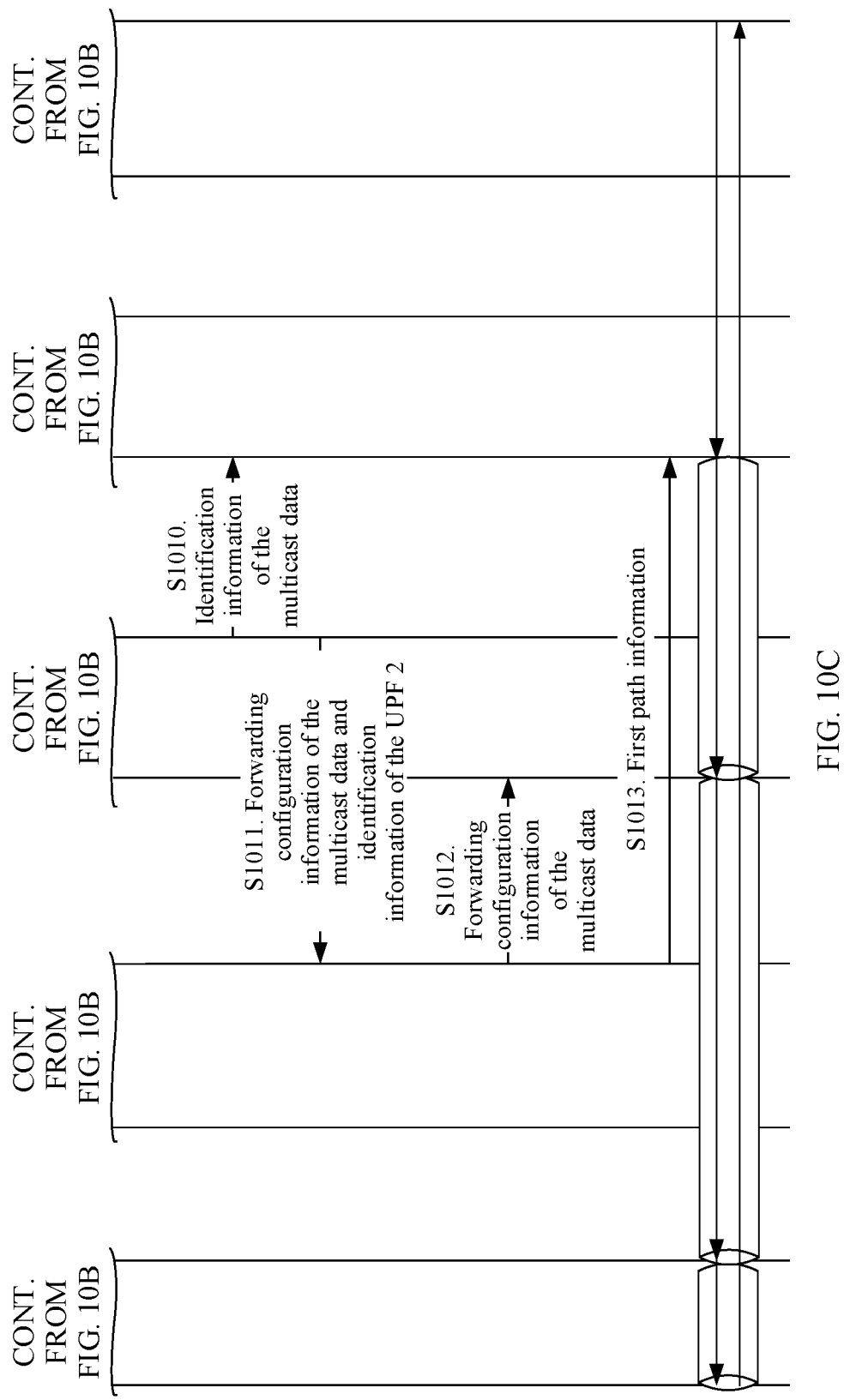

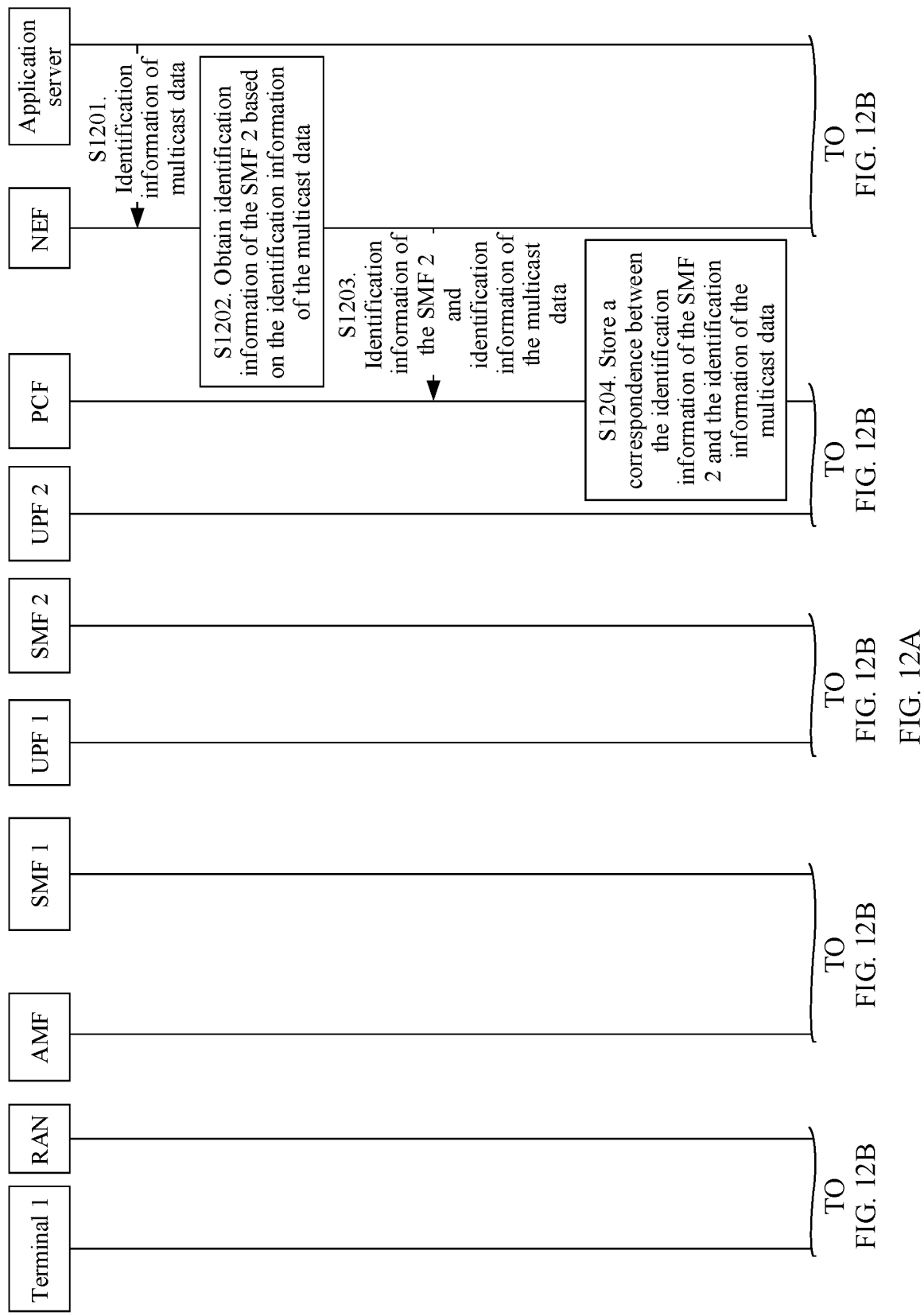

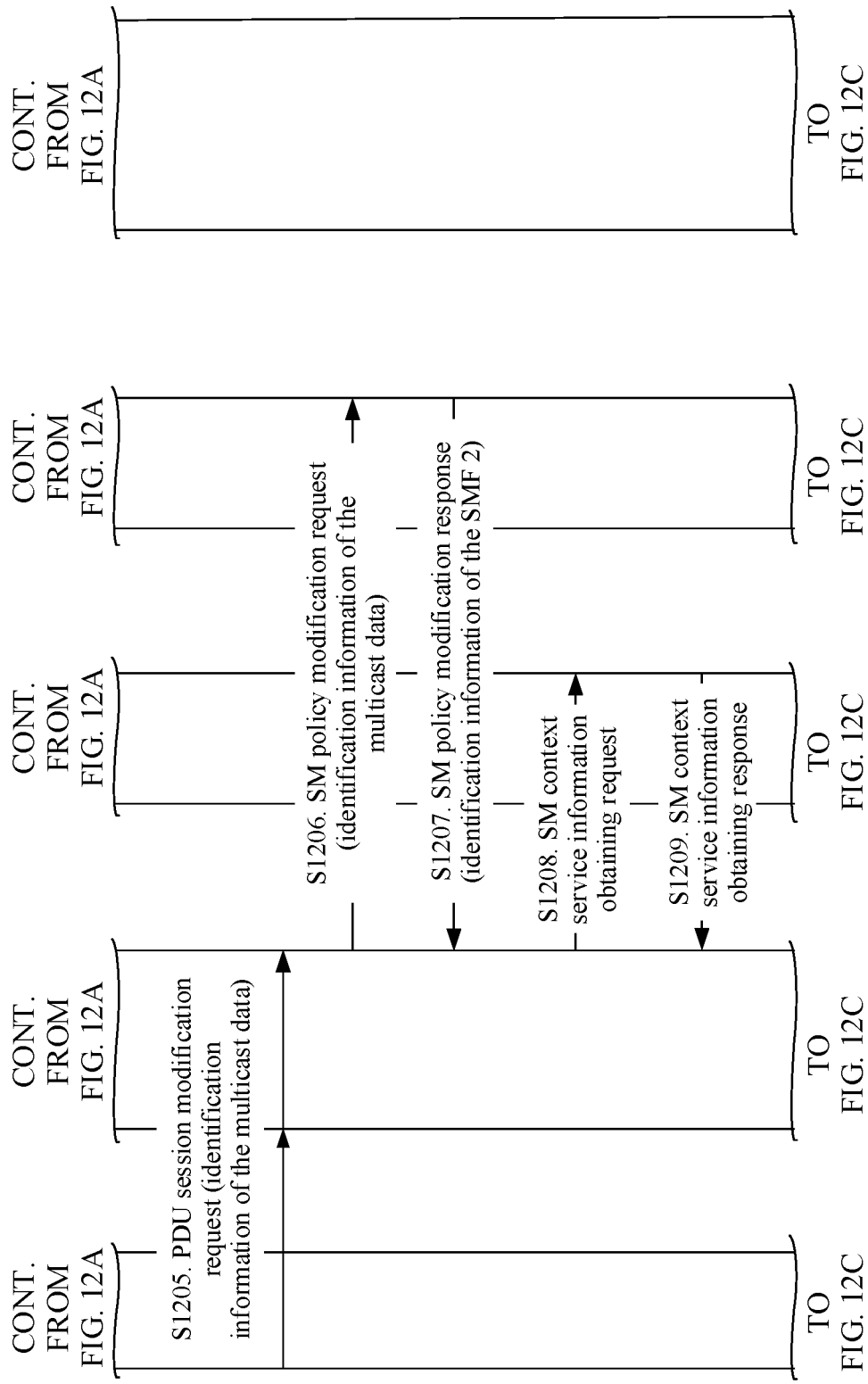

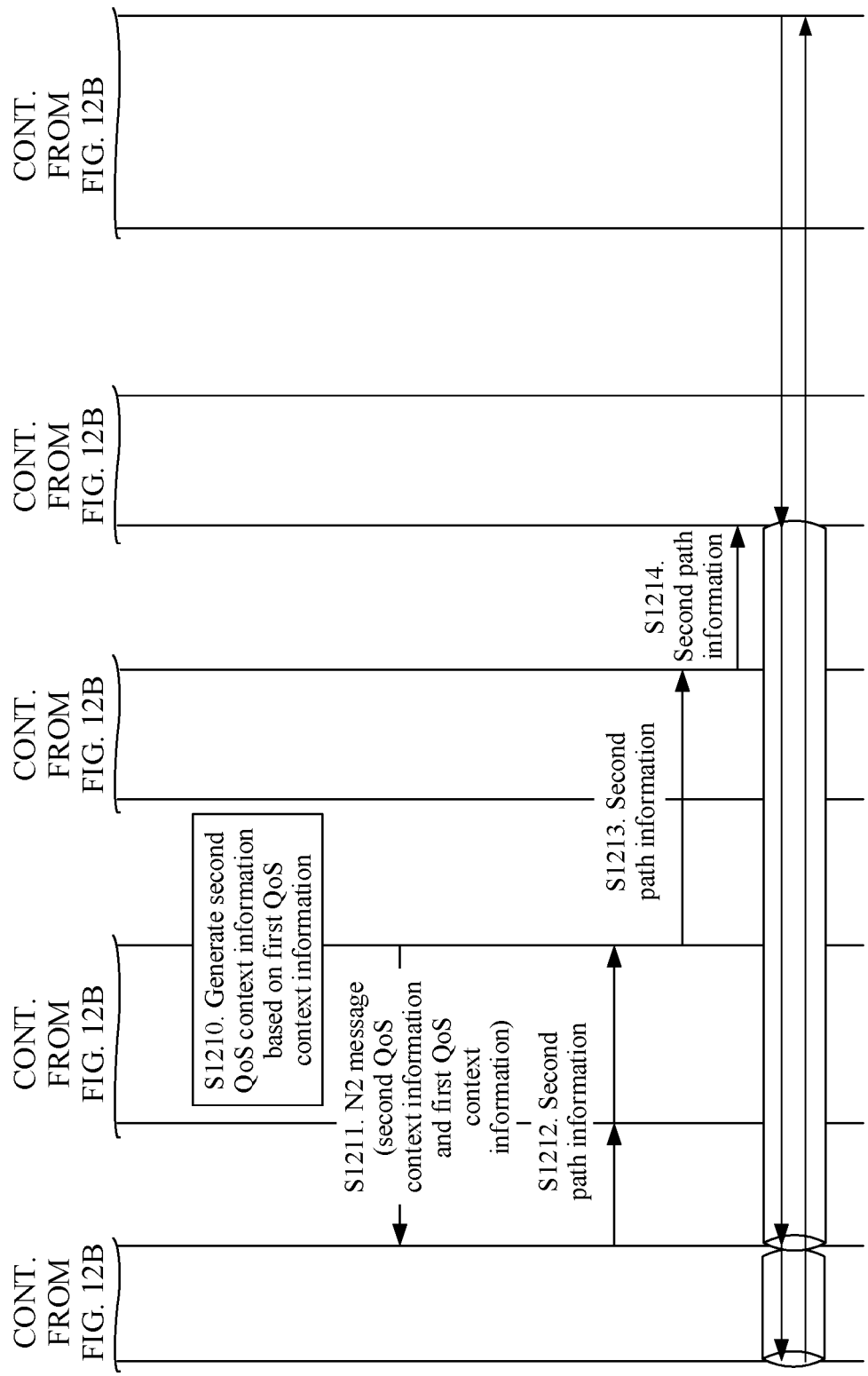

COMMUNICATION METHOD AND APPARATUS

CROSS-REFERENCE TO RELATED APPLICATIONS

This application is a continuation of International Application No. PCT/CN2020/077374, filed on Mar. 1, 2020, the disclosure of which is hereby incorporated by reference in its entirety.

TECHNICAL FIELD

Embodiments of this application relate to the wireless communication field, and in particular, to a communication method and apparatus.

BACKGROUND

In a 3rd generation partnership project (3GPP) network, a network side device is required to send same data to a plurality of terminals, that is, there is a point-to-multipoint data transmission requirement.

To meet this requirement, the following solution is usually used in a conventional technology: Each of a plurality of terminals establishes a unicast protocol data unit (PDU) session, and data is sent to the terminal by using a user plane function (UPF) corresponding to the unicast PDU session established by the terminal. In this manner, an application server needs to make a plurality of copies of the data, and send the data to the plurality of terminals by using UPFs corresponding to the plurality of unicast PDU sessions. Therefore, a large quantity of transmission resources are required.

To save network side transmission resources and air interface transmission resources, it is expected that data sent to a plurality of terminals may share a same UPF, that is, the data is sent to the plurality of terminals by using the same UPF. However, currently, there is no related solution to how to send, to a plurality of terminals by using a same UPF, multicast data delivered by an application server.

SUMMARY

Embodiments of this application provide a communication method and apparatus, to resolve a problem of how to transmit same data to a plurality of terminals by using a same user plane network element.

In a first technical solution, a terminal initiates a PDU session modification procedure. A first session management network element corresponding to a unicast PDU session is triggered to select a multicast user plane network element, notify the terminal to initiate a PDU session establishment procedure to switch an anchor of the PDU session to the multicast user plane network element, and send multicast data to the terminal by using the multicast user plane network element. Specifically, related descriptions of the solution are provided in the following first aspect to twenty-fourth aspect.

According to a first aspect, an embodiment of this application provides a communication method. The method may be performed by a first session management network element, a chip, or another apparatus. For example, the method is performed by a first session management network element. The method may include: The first session management network element receives a first request including identification information of multicast data, where the first request is used to request to use a first PDU session to transmit the multicast data; and the first session management network element obtains identification information of a multicast user plane network element based on the first request, where the multicast user plane network element is an anchor for transmitting the multicast data, and the first session management network element is a session management network element corresponding to the first PDU session.

Based on the method in the first aspect, after receiving a request message including the identification information of the multicast data, the first session management network element may obtain the identification information of the multicast user plane network element, to subsequently transmit the multicast data by using the multicast user plane network element. In this way, the multicast data is transmitted to a terminal by using a same user plane network element, improving resource utilization.

In an exemplary embodiment, that the first session management network element receives a first request includes: When the first request is a protocol data unit (PDU) session modification request, the first session management network element receives the PDU session modification request from a mobility management network element; or the first session management network element receives the first request from a unicast user plane network element, where the unicast user plane network element is a user plane network element corresponding to the first PDU session.

Based on this exemplary embodiment, the message for requesting to transmit the multicast data by using the first PDU session may be sent to the first session management network element through control plane signaling transmission or user plane event notification. Sending manners are flexible and diversified, and an application scope of the method is expanded.

In an exemplary embodiment, the multicast user plane network element is different from the user plane network element corresponding to the first PDU session, and there is a connection relationship between the first session management network element and the multicast user plane network element. The method further includes: The first session management network element sends a notification message including identification information of the first PDU session to a mobility management network element, where the notification message is used to notify a terminal to establish a second PDU session; and the first session management network element receives a first message that is from the mobility management network element and that includes a PDU session establishment request and the identification information of the first PDU session, where the PDU session establishment request is used to request to establish a PDU session, and the PDU session establishment request includes identification information of the second PDU session; and sends the identification information of the multicast data to the multicast user plane network element based on the first message.

Based on this exemplary embodiment, an anchor of a PDU session may be switched from the unicast user plane network element to the multicast user plane network element by using an existing PDU session re-establishment procedure. This is simple and easy to implement, and signaling overheads are reduced.

In an exemplary embodiment, the method further includes: The first session management network element updates a context of the first PDU session, where an updated context of the first PDU session includes the identification information of the first PDU session and the identification information of the multicast user plane network element. That the first session management network element sends the identification information of the multicast data to the multicast user plane network element based on the first message includes: The first session management network element sends the identification information of the multicast data to the multicast user plane network element based on the first message and the updated context of the first PDU session.

Based on this exemplary embodiment, the identification information of the multicast user plane network element may be pre-stored in the context of the first PDU session, so that the first session management network element queries the context of the first PDU session to learn of the identification information of the multicast user plane network element. This is simple and easy to implement.

In an exemplary embodiment, the multicast user plane network element is the same as a user plane network element corresponding to the first PDU session, and the method includes: The first session management network element sends the identification information of the multicast data to the multicast user plane network element.

Based on this exemplary embodiment, when the multicast user plane network element selected by the first session management network element is the same as an original unicast user plane network element corresponding to the first PDU session, the identification information of the multicast data may be directly sent to the unicast user plane network element, and the multicast data is transmitted by using the unicast user plane network element. This is simple and easy to implement.

In an exemplary embodiment, there is no connection relationship between the first session management network element and the multicast user plane network element, and the method further includes: The first session management network element sends first information and identification information of the first PDU session to a mobility management network element, where the first information is used to determine a second session management network element, and the second session management network element is a session management network element that manages the multicast user plane network element.

Based on this exemplary embodiment, when the selected multicast user plane network element does not belong to the first session management network element, the second session management network element that manages the multicast user plane network element may be selected, and the mobility management network element is notified of the first information used to determine the second session management network element, so that the mobility management network element sends, to the second session management network element based on the first information, a PDU session establishment request re-initiated by the terminal. This is simple and easy to implement.

In an exemplary embodiment, the first information includes one or more of the identification information of the multicast user plane network element, identification information of the second session management network element, and the identification information of the multicast data.

Based on this exemplary embodiment, the second session management network element may be determined by using a plurality of types of information. Implementations are flexible and diversified.

In an exemplary embodiment, the method further includes: The first session management network element sends second information to the second session management network element, where the second information includes one or both of the identification information of the multicast user plane network element and the identification information of the multicast data.

Based on this exemplary embodiment, after selecting the second session management network element, the first session management network element may notify the second session management network element of the second information used to determine the multicast user plane network element, so that the second session management network element locates, to the multicast user plane network element based on the second information, an anchor used to transmit the multicast data, and transmits the multicast data by using the multicast user plane network element, improving resource utilization.

In an exemplary embodiment, the method further includes: The first session management network element sends the identification information of the multicast data to a first network element; and the first session management network element receives the identification information of the second session management network element from the first network element.

Based on this exemplary embodiment, the first session management network element may obtain the identification information of the second session management network element by interacting with the first network element. This is simple and easy to implement.

In an exemplary embodiment, that the first session management network element obtains the identification information of the multicast user plane network element based on the identification information of the multicast data includes: The first session management network element sends the identification information of the multicast data to the first network element; and the first session management network element receives the identification information of the multicast user plane network element from the first network element.

Based on this exemplary embodiment, the first session management network element may obtain the identification information of the multicast user plane network element by interacting with the first network element. This is simple and easy to implement.

In an exemplary embodiment, the first network element is a unified data management (UDM), a network repository function (NRF), a unified data repository (UDR), or a policy control function (PCF).

Based on this exemplary embodiment, the UDM, the NRF, the UDR, or the PCF has functions of selecting the multicast user plane network element and the second session management network element. Network elements having the functions of selecting the multicast user plane network element and the second session management network element are diversified. Therefore, an application scope of the method is expanded.

According to a second aspect, this application provides a communication apparatus. The communication apparatus may be a first session management network element, a chip or a system on chip in the first session management network element, or may be a module or a unit that is in the first session management network element and that is configured to implement the communication method in embodiments of this application. The communication apparatus may implement functions performed by the first session management network element in the foregoing aspect or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the first aspect. The modules may be implemented by using a hardware circuit, software, or a combination of the hardware circuit and the software. In an exemplary embodiment, the communication apparatus may include a receiving unit and a processing unit.

The receiving unit is configured to receive a first request including identification information of multicast data, where the first request is used to request to use a first PDU session to transmit the multicast data.

The processing unit is configured to obtain identification information of a multicast user plane network element based on the first request, where the multicast user plane network element is an anchor for transmitting the multicast data, and the first session management network element is a session management network element corresponding to the first PDU session.

For a specific implementation of the communication apparatus, refer to behavior functions of the first session management network element in the communication method provided in any one of the first aspect or the exemplary embodiments of the first aspect. Details are not described herein again. Therefore, the provided communication apparatus can achieve same beneficial effects as any one of the first aspect or the exemplary embodiments of the first aspect.

According to a third aspect, a communication apparatus is provided. The communication apparatus may be a first session management network element, or a chip or a system on chip in the first session management network element. The communication apparatus may implement functions performed by the first session management network element in the foregoing aspect or the exemplary embodiments, and the functions may be implemented by hardware. In an exemplary embodiment, the communication apparatus may include a processor and a communication interface. The processor may be configured to support the communication apparatus in implementing the functions in any one of the first aspect or the exemplary embodiments of the first aspect. For example, the processor is configured to: receive, through the communication interface, a first request including identification information of multicast data, where the first request is used to request to use a first PDU session to transmit the multicast data; and obtain identification information of a multicast user plane network element based on the first request, where the multicast user plane network element is an anchor for transmitting the multicast data, and the first session management network element is a session management network element corresponding to the first PDU session. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the first aspect or the exemplary embodiments of the first aspect. In this embodiment of this application, the communication interface may be a transceiver, an interface circuit, a bus interface, a pin, or another apparatus that can implement transceiver functions.

According to a fourth aspect, a computer-readable storage medium is provided. The computer-readable storage medium stores instructions. When the instructions are run on a computer, the computer is enabled to perform the communication method according to any one of the first aspect or the exemplary embodiments of the first aspect.

According to a fifth aspect, a computer program product including instructions is provided. The computer program product may include program instructions. When the computer program product runs on a computer, the computer is enabled to perform the communication method according to any one of the first aspect or the exemplary embodiments of the first aspect.

According to a sixth aspect, a chip system is provided. The chip system includes a processor and a communication interface. The chip system may be configured to implement functions performed by the first session management network element in any one of the first aspect or the exemplary embodiments of the first aspect. For example, the processor is configured to: receive, through the communication interface, a first request including identification information of multicast data, where the first request is used to request to use a first PDU session to transmit the multicast data; and obtain identification information of a multicast user plane network element based on the first request, where the multicast user plane network element is an anchor for transmitting the multicast data, and the first session management network element is a session management network element corresponding to the first PDU session. In an exemplary embodiment, the chip system further includes a memory. The memory is configured to store program instructions and/or data. When the chip system runs, the processor executes the program instructions stored in the memory, so that the chip system performs the communication method according to any one of the first aspect or the exemplary embodiments of the first aspect. The chip system may include a chip, or may include a chip and another discrete component. This is not limited.

According to a seventh aspect, an embodiment of this application further provides a communication method. The communication method may be performed by a second session management network element, a chip, or another apparatus. For example, the communication method is performed by a second session management network element. The method may include: The second session management network element receives second information, and receives a PDU session establishment request for establishing a PDU session from a mobility management network element; and the second session management network element sends identification information of multicast data to a multicast user plane network element based on the PDU session establishment request and the second information, where the multicast user plane network element is an anchor for transmitting the multicast data. The second information includes one or both of identification information of the multicast user plane network element and the identification information of the multicast data.

Based on the method in the seventh aspect, after receiving the PDU session establishment request, the second session management network element is triggered to select the multicast user plane network element based on the second information, and send the identification information of the multicast data to the multicast user plane network element, to indicate the multicast user plane network element to transmit the multicast data. In this way, a same multicast user plane network element may be used to transmit multicast data, improving resource utilization.

In an exemplary embodiment, that the second session management network element receives second information includes: The second session management network element receives the second information from the mobility management network element; or the second session management network element receives the second information from a first session management network element.

Based on this exemplary embodiment, the second session management network element can receive, from the mobility management network element or the first session management network element, the second information used to determine the multicast user plane network element. Receiving manners are flexible and diversified, expanding an application scope of the method.

In an exemplary embodiment, the second information includes the identification information of the multicast data, and the method further includes: The second session management network element sends the identification information of the multicast data to a first network element; and the second session management network element receives the identification information of the multicast user plane network element from the first network element. For the first network element, refer to the descriptions in the first aspect. Details are not described herein again.

Based on this exemplary embodiment, when receiving the identification information of the multicast data, the second session management network element may obtain the identification information of the multicast user plane network element by interacting with the first network element. This is simple and easy to implement.

According to an eighth aspect, this application provides a communication apparatus. The communication apparatus may be a second session management network element, a chip or a system on chip in the second session management network element, or may be a module or a unit that is in the second session management network element and that is configured to implement the communication method in embodiments of this application. The communication apparatus may implement functions performed by the second session management network element in the foregoing aspect or the exemplary embodiments, and the functions may be implemented by hardware, or by hardware executing corresponding software. The hardware or software includes one or more modules corresponding to the functions. In an exemplary embodiment, the apparatus may include modules that are in one-to-one correspondence with the methods/operations/steps/actions described in the seventh aspect. The modules may be implemented by using a hardware circuit, software, or a combination of the hardware circuit and the software. In an exemplary embodiment, the communication apparatus may include a receiving unit and a sending unit.

The receiving unit is configured to: receive second information, and receive a PDU session establishment request for establishing a PDU session from a mobility management network element.

The sending unit is configured to send identification information of multicast data to a multicast user plane network element based on the PDU session establishment request and the second information, where the multicast user plane network element is an anchor for transmitting the multicast data. The second information includes one or both of identification information of the multicast user plane network element and the identification information of the multicast data.

For a specific implementation of the communication apparatus, refer to behavior functions of the second session management network element in the communication method provided in any one of the seventh aspect or the exemplary embodiments of the seventh aspect. Details are not described herein again. Therefore, the provided communication apparatus can achieve same beneficial effects as any one of the seventh aspect or the exemplary embodiments of the seventh aspect.

According to a ninth aspect, a communication apparatus is provided. The communication apparatus may be a second session management network element, or a chip or a system on chip in the second session management network element. The communication apparatus may implement functions performed by the second session management network element in the foregoing aspect or the exemplary embodiments, and the functions may be implemented by hardware. In an exemplary embodiment, the communication apparatus may include a processor and a communication interface. The processor may be configured to support the communication apparatus in implementing the functions in any one of the seventh aspect or the exemplary embodiments of the seventh aspect. For example, the processor is configured to: receive second information through the communication interface; receive a PDU session establishment request for establishing a PDU session from a mobility management network element; and send identification information of multicast data to a multicast user plane network element based on the PDU session establishment request and the second information, where the multicast user plane network element is an anchor for transmitting the multicast data. The second information includes one or both of identification information of the multicast user plane network element and the identification information of the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the seventh aspect or the exemplary embodiments of the seventh aspect.

According to a tenth aspect, a computer-readable storage medium is provided. The computer-readable storage medium stores instructions. When the instructions are run on a computer, the computer is enabled to perform the communication method according to any one of the seventh aspect or the exemplary embodiments of the seventh aspect.

According to an eleventh aspect, a computer program product including instructions is provided. The computer program product may include program instructions. When the computer program product runs on a computer, the computer is enabled to perform the communication method according to any one of the seventh aspect or the exemplary embodiments of the seventh aspect.

According to a twelfth aspect, a chip system is provided. The chip system includes a processor and a communication interface. The chip system may be configured to implement functions performed by the second session management network element in any one of the seventh aspect or the exemplary embodiments of the seventh aspect. For example, the processor is configured to: receive second information through the communication interface; receive a PDU session establishment request for establishing a PDU session from a mobility management network element; and send identification information of multicast data to a multicast user plane network element based on the PDU session establishment request and the second information, where the multicast user plane network element is an anchor for transmitting the multicast data. The second information includes one or both of identification information of the multicast user plane network element and the identification information of the multicast data. In an exemplary embodiment, the chip system further includes a memory. The memory is configured to store program instructions and/or data. When the chip system runs, the processor executes the program instructions stored in the memory, so that the chip system performs the communication method according to any one of the seventh aspect or the exemplary embodiments of the seventh aspect. The chip system may include a chip, or may include a chip and another discrete component. This is not limited.

According to a thirteenth aspect, an embodiment of this application further provides a communication method. The method may be performed by a mobility management network element, a chip, or another apparatus. For example, the method is performed by a mobility management network element. The method includes: The mobility management network element receives first information and identification information of a first PDU session from a first session management network element, where the first information is used to determine a second session management network element, and the second session management network element is a session management network element that manages a multicast user plane network element; the mobility management network element sends a PDU session re-establishment notification to a terminal, where the PDU session re-establishment notification includes the identification information of the first PDU session; the mobility management network element receives a non-access stratum (NAS) message from the terminal, where the NAS message includes a PDU session establishment request and the identification information of the first PDU session, the PDU session establishment request is used to request to establish a PDU session, and the PDU session establishment request includes identification information of a second PDU session; and the mobility management network element sends the PDU session establishment request to the second session management network element based on the NAS message and the first information.

Based on the method in the thirteenth aspect, the mobility management network element may learn of a session management network element corresponding to PDU session update, and send the PDU session re-establishment notification to the terminal. In a PDU session re-establishment process, the mobility management network element receives the PDU session establishment request re-initiated by the terminal, and sends the PDU session establishment request to the second session management network element that manages the multicast user plane network element. In this way, the second session management network element selects a multicast user plane network element configured to transmit multicast data, and transmits the multicast data by using the multicast user plane network element, improving resource utilization.

For related descriptions of the first information, refer to the descriptions in the first aspect. Details are not described again.

In an exemplary embodiment, the method further includes: The mobility management network element sends second information to the second session management network element, where the second information includes one or both of the identification information of the multicast user plane network element and identification information of the multicast data.

Based on this exemplary embodiment, the mobility management network element may send, to the second session management network element in a PDU session re-establishment procedure, the second information used to determine the multicast user plane network element, thereby reducing signaling overheads. In addition, the second session management network element does not need to obtain the second information from another network element, thereby reducing power consumption of determining the multicast user plane network element by the second session management network element.

According to a fourteenth aspect, this application provides a communication apparatus. The communication apparatus may be a mobility management network element, a chip or a system on chip in the mobility management network element, or may be a module or a unit that is in the mobility management network element and that is configured to implement the communication method in embodiments of this application. The communication apparatus may implement functions performed by the mobility management network element in the foregoing aspect or the exemplary embodiments, and the functions may be implemented by hardware, or by hardware executing corresponding software. The hardware or software includes one or more modules corresponding to the functions. In an exemplary embodiment, the apparatus may include modules that are in one-to-one correspondence with the methods/operations/steps/actions described in the thirteenth aspect. The modules may be implemented by using a hardware circuit, software, or a combination of the hardware circuit and the software. In an exemplary embodiment, for example, the communication apparatus may include a receiving unit and a sending unit.

The receiving unit is configured to receive first information and identification information of a first PDU session from a first session management network element, where the first information is used to determine a second session management network element, and the second session management network element is a session management network element that manages a multicast user plane network element.

The sending unit is configured to send a PDU session re-establishment notification to a terminal, where the PDU session re-establishment notification includes the identification information of the first PDU session.

The receiving unit is further configured to receive a NAS message from the terminal, where the NAS message includes a PDU session establishment request and the identification information of the first PDU session, the PDU session establishment request is used to request to establish a PDU session, and the PDU session establishment request includes identification information of a second PDU session.

The sending unit is further configured to send the PDU session establishment request to the second session management network element based on the NAS message and the first information.

For a specific implementation of the communication apparatus, refer to behavior functions of the mobility management network element in the communication method provided in any one of the thirteenth aspect or the exemplary embodiments of the thirteenth aspect. Details are not described herein again. Therefore, the provided communication apparatus can achieve same beneficial effects as the thirteenth aspect or the exemplary embodiments of the thirteenth aspect.

According to a fifteenth aspect, a communication apparatus is provided. The communication apparatus may be a mobility management network element, or a chip or a system on chip in the mobility management network element. The communication apparatus may implement functions performed by the mobility management network element in the foregoing aspect or the exemplary embodiments, and the functions may be implemented by hardware. In an exemplary embodiment, the communication apparatus may include a processor and a communication interface. The processor may be configured to support the communication apparatus in implementing the functions in any one of the thirteenth aspect or the exemplary embodiments of the thirteenth aspect. For example, the processor is configured to: receive first information and identification information of a first protocol data unit PDU session from a first session management network element through the communication interface, where the first information is used to determine a second session management network element; send a PDU session re-establishment notification including the identification information of the first PDU session to a terminal; and receive a NAS message from the terminal, where the NAS message includes a PDU session establishment request and the identification information of the first PDU session, the PDU session establishment request is used to request to establish a PDU session, and the PDU session establishment request includes identification information of a second PDU session; and send the PDU session establishment request to the second session management network element based on the NAS message and the first information. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the thirteenth aspect or the exemplary embodiments of the thirteenth aspect.

According to a sixteenth aspect, a computer-readable storage medium is provided. The computer-readable storage medium stores instructions. When the instructions are run on a computer, the computer is enabled to perform the communication method according to any one of the thirteenth aspect or the exemplary embodiments of the thirteenth aspect.

According to a seventeenth aspect, a computer program product including instructions is provided. The computer program product may include program instructions. When the computer program product runs on a computer, the computer is enabled to perform the communication method according to any one of the thirteenth aspect or the exemplary embodiments of the thirteenth aspect.

According to an eighteenth aspect, a chip system is provided. The chip system includes a processor and a communication interface. The chip system may be configured to implement functions performed by the mobility management network element in any one of the thirteenth aspect or the exemplary embodiments of the thirteenth aspect. For example, the processor is configured to: receive first information and identification information of a first protocol data unit PDU session from a first session management network element through the communication interface, where the first information is used to determine a second session management network element; send a PDU session re-establishment notification including the identification information of the first PDU session to a terminal; and receive a NAS message from the terminal, where the NAS message includes a PDU session establishment request and the identification information of the first PDU session, the PDU session establishment request is used to request to establish a PDU session, and the PDU session establishment request includes identification information of a second PDU session; and send the PDU session establishment request to the second session management network element based on the NAS message and the first information. In an exemplary embodiment, the chip system further includes a memory. The memory is configured to store program instructions and/or data. When the chip system runs, the processor executes the program instructions stored in the memory, so that the chip system performs the communication method according to any one of the thirteenth aspect or the exemplary embodiments of the thirteenth aspect. The chip system may include a chip, or may include a chip and another discrete component.

According to a nineteenth aspect, an embodiment of this application further provides a communication method. The method may be performed by a first network element, a chip, or another apparatus. For example, the method is performed by a first network element. The method includes: The first network element receives identification information of multicast data, and sends identification information of a multicast user plane network element, where the multicast user plane network element is an anchor for transmitting the multicast data.

In an exemplary embodiment, the first network element stores a first correspondence, and the first correspondence includes a correspondence between the identification information of the multicast data and the identification information of the multicast user plane network element. The first network element sends the identification information of the multicast user plane network element includes: The first network element sends the identification information of the multicast user plane network element based on the identification information of the multicast data and the first correspondence.

Based on this exemplary embodiment, the first network element may prestore the correspondence between the identification information of the multicast data and the identification information of the multicast user plane network element, and send the identification information of the multicast user plane network element based on the correspondence. This is simple and easy to implement.

In an exemplary embodiment, the first network element receives the identification information of the multicast data from a first session management network element; and the first network element sends the identification information of the multicast user plane network element to the first session management network element. Alternatively, the first network element receives the identification information of the multicast data from a second session management network element; and the first network element sends the identification information of the multicast user plane network element to the second session management network element.

Based on this exemplary embodiment, the first network element may support a plurality of network elements such as the first session management network element and the second session management network element in querying the identification information of the multicast user plane network element. This is simple and easy to implement.

In an exemplary embodiment, the first network element stores a second correspondence, and the second correspondence includes a correspondence between the identification information of the multicast data and identification information of the second session management network element. The method further includes: The first network element receives the identification information of the multicast data from the first session management network element; and sends the identification information of the second session management network element to the first session management network element based on the identification information of the multicast data and the second correspondence.

Based on this exemplary embodiment, the first network element may further prestore the correspondence between the identification information of the multicast data and the identification information of the second session management network element, and has a function of querying the second session management network element based on the correspondence, thereby expanding a function of the first network element and improving an application scope of the method.

According to a twentieth aspect, this application provides a communication apparatus. The communication apparatus may be a first network element, a chip or a system on chip in the first network element, or may be a module or a unit that is in the first network element and that is configured to implement the communication method in embodiments of this application. The communication apparatus may implement functions performed by the first network element in the foregoing aspects or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the nineteenth aspect. The modules may be implemented by using a hardware circuit, software, or a combination of the hardware circuit and the software. In an exemplary embodiment, for example, the communication apparatus may include a receiving unit and a sending unit.

The receiving unit is configured to receive identification information of multicast data.

The sending unit is configured to send identification information of a multicast user plane network element, where the multicast user plane network element is an anchor for transmitting the multicast data.

For a specific implementation of the communication apparatus, refer to behavior functions of the first network element in the communication method provided in any one of the nineteenth aspect or the exemplary embodiments of the nineteenth aspect. Details are not described herein again. Therefore, the provided communication apparatus can achieve same beneficial effects as any one of the nineteenth aspect or the exemplary embodiments of the nineteenth aspect.

According to a twenty-first aspect, a communication apparatus is provided. The communication apparatus may be a first network element or a chip or a system on chip in the first network element. The communication apparatus may implement functions performed by the first network element in the foregoing aspects or the exemplary embodiments, and the functions may be implemented by hardware. In an exemplary embodiment, the communication apparatus may include a processor and a communication interface. The processor may be configured to support the communication apparatus in implementing the functions in any one of the nineteenth aspect or the exemplary embodiments of the nineteenth aspect. For example, the processor is configured to receive identification information of multicast data and send identification information of a multicast user plane network element through the communication interface, where the multicast user plane network element is an anchor for transmitting the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the nineteenth aspect or the exemplary embodiments of the nineteenth aspect.

According to a twenty-second aspect, a computer-readable storage medium is provided. The computer-readable storage medium stores instructions. When the instructions are run on a computer, the computer is enabled to perform the communication method according to any one of the nineteenth aspect or the exemplary embodiments of the nineteenth aspect.

According to a twenty-third aspect, a computer program product including instructions is provided. The computer program product may include program instructions. When the computer program product runs on a computer, the computer is enabled to perform the communication method according to any one of the nineteenth aspect or the exemplary embodiments of the nineteenth aspect.

According to a twenty-fourth aspect, a chip system is provided. The chip system includes a processor and a communication interface. The chip system may be configured to implement functions performed by the first network element in any one of the nineteenth aspect or the exemplary embodiments of the nineteenth aspect. For example, the processor is configured to receive identification information of multicast data and send identification information of a multicast user plane network element through the communication interface, where the multicast user plane network element is an anchor for transmitting the multicast data. In an exemplary embodiment, the chip system further includes a memory. The memory is configured to store program instructions and/or data. When the chip system runs, the processor executes the program instructions stored in the memory, so that the chip system performs the communication method according to any one of the nineteenth aspect or the exemplary embodiments of the nineteenth aspect. The chip system may include a chip, or may include a chip and another discrete component.

In a second technical solution, when receiving a PDU session establishment request initiated by a terminal to request to establish a multicast PDU session, a mobility management network element selects a multicast session management network element in a PDU session establishment procedure, that is, for the PDU session established by the terminal, triggers the multicast session management network element to select a multicast user plane network element configured to transmit multicast data, and sends the multicast data to the terminal by using the multicast user plane network element. Specifically, related descriptions of the solution are provided in the following twenty-fifth aspect to thirty-sixth aspect.

According to a twenty-fifth aspect, an embodiment of this application further provides a communication method. The communication method may be performed by a mobility management network element, a chip, or another apparatus. For example, the communication method is performed by a mobility management network element. The method may include: The mobility management network element receives a PDU session establishment request from a terminal, where the PDU session establishment request is used to request to establish a PDU session, the PDU session establishment request includes a PDU session type, the PDU session type is used to indicate that the PDU session that the terminal requests to establish is a multicast PDU session, and the multicast PDU session is used to transmit multicast data; and the mobility management network element sends the PDU session establishment request to a multicast session management network element based on the PDU session establishment request, where the multicast session management network element is a session management network element that manages a multicast user plane network element, and the multicast user plane network element is an anchor for transmitting the multicast data.

Based on the method in the twenty-fifth aspect, when the terminal requests to establish the multicast PDU session, the multicast session management network element may be selected for the PDU session established by the terminal, to trigger the multicast user plane network element to select the multicast user plane network element configured to transmit the multicast data. In this way, the multicast data is transmitted to a terminal by using a same user plane network element, improving resource utilization. In addition, the multicast user plane network element is selected at an initial stage of PDU session establishment, reducing signaling overheads.

In an exemplary embodiment, the method further includes: when there is a selection rule and the selection rule is used to indicate the mobility management network element to select a multicast session management network element for the multicast PDU session, the mobility management network element selects the multicast session management network element for the multicast PDU session.

Based on this exemplary embodiment, the selection rule may be preconfigured, to trigger the mobility management network element to select the multicast session management network element for the multicast PDU session according to the selection rule. This is simple and easy to implement.

In an exemplary embodiment, the selection rule is stored in a context of the terminal in the mobility management network element.

Based on this exemplary embodiment, the selection rule may be stored in the context of the terminal, reducing storage overheads.

In an exemplary embodiment, that the mobility management network element selects the multicast session management network element for the multicast PDU session includes: The mobility management network element sends the PDU session type to an NRF; and the mobility management network element receives identification information of the multicast session management network element from the NRF.

Based on this exemplary embodiment, the mobility management network element may obtain the identification information of the multicast session management network element by interacting with the NRF. This is simple and easy to implement.

In an exemplary embodiment, the method further includes: The mobility management network element sends the PDU session type to a network slice selection function NSSF; and the mobility management network element receives identification information of the NRF from the NSSF. That the mobility management network element sends the PDU session type to an NRF includes: The mobility management network element sends the PDU session type to the NRF based on the identification information of the NRF.

Based on this exemplary embodiment, the mobility management network element may interact with the NSSF to obtain the NRF having a function of selecting the multicast session management network element, and send, based on the identification information of the NRF that is returned by the NSSF, the PDU session type to the NRF having the function of selecting the multicast session management network element, avoid power consumption caused by blindly requesting, by the mobility management network element, to query all NRFs for the multicast session management network element.

According to a twenty-sixth aspect, this application provides a communication apparatus. The communication apparatus may be a mobility management network element, a chip or a system on chip in the mobility management network element, or may be a module or a unit that is in the mobility management network element and that is configured to implement the communication method in embodiments of this application. The communication apparatus may implement functions performed by the mobility management network element in the foregoing aspect or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the twenty-fifth aspect. The modules may be implemented by using a hardware circuit, software, or a combination of the hardware circuit and the software. In an exemplary embodiment, for example, the communication apparatus may include a receiving unit and a sending unit.

The receiving unit is configured to receive a PDU session establishment request from a terminal, where the PDU session establishment request is used to request to establish a PDU session, the PDU session establishment request includes a PDU session type, the PDU session type is used to indicate that the PDU session that the terminal requests to establish is a multicast PDU session, and the multicast PDU session is used to transmit multicast data.

The sending unit is configured to send the PDU session establishment request to a multicast session management network element based on the PDU session establishment request, where the multicast session management network element is a session management network element that manages a multicast user plane network element, and the multicast user plane network element is an anchor for transmitting the multicast data.

For a specific implementation of the communication apparatus, refer to behavior functions of the mobility management network element in the communication method provided in any one of the twenty-fifth aspect or the exemplary embodiments of the twenty-fifth aspect. Details are not described herein again. Therefore, the provided communication apparatus can achieve same beneficial effects as any one of the twenty-fifth aspect or the exemplary embodiments of the twenty-fifth aspect.

According to a twenty-seventh aspect, a communication apparatus is provided. The communication apparatus may be a mobility management network element, or a chip or a system on chip in the mobility management network element. The communication apparatus may implement functions performed by the mobility management network element in the foregoing aspect or the exemplary embodiments, and the functions may be implemented by hardware. In an exemplary embodiment, the communication apparatus may include a processor and a communication interface. The processor may be configured to support the communication apparatus in implementing the functions in any one of the twenty-fifth aspect or the exemplary embodiments of the twenty-fifth aspect. For example, the processor is configured to: receive a PDU session establishment request from a terminal through the communication interface, where the PDU session establishment request is used to request to establish a PDU session, the PDU session establishment request includes a PDU session type, the PDU session type is used to indicate that the PDU session that the terminal requests to establish is a multicast PDU session, and the multicast PDU session is used to transmit multicast data; and send the PDU session establishment request to a multicast session management network element based on the PDU session establishment request, where the multicast session management network element is a session management network element that manages a multicast user plane network element, and the multicast user plane network element is an anchor for transmitting the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the twenty-fifth aspect or the exemplary embodiments of the twenty-fifth aspect.

According to a twenty-eighth aspect, a computer-readable storage medium is provided. The computer-readable storage medium stores instructions. When the instructions are run on a computer, the computer is enabled to perform the communication method according to any one of the twenty-fifth aspect or the exemplary embodiments of the twenty-fifth aspect.

According to a twenty-ninth aspect, a computer program product including instructions is provided. The computer program product may include program instructions. When the computer program product runs on a computer, the computer is enabled to perform the communication method according to any one of the twenty-fifth aspect or the exemplary embodiments of the twenty-fifth aspect.

According to a thirtieth aspect, a chip system is provided. The chip system includes a processor and a communication interface. The chip system may be configured to implement functions performed by the mobility management network element in any one of the twenty-fifth aspect or the exemplary embodiments of the twenty-fifth aspect. For example, the processor is configured to: receive a PDU session establishment request from a terminal through the communication interface, where the PDU session establishment request is used to request to establish a PDU session, the PDU session establishment request includes a PDU session type, the PDU session type is used to indicate that the PDU session that the terminal requests to establish is a multicast PDU session, and the multicast PDU session is used to transmit multicast data; and send the PDU session establishment request to a multicast session management network element based on the PDU session establishment request, where the multicast session management network element is a session management network element that manages a multicast user plane network element, and the multicast user plane network element is an anchor for transmitting the multicast data. In an exemplary embodiment, the chip system further includes a memory. The memory is configured to store program instructions and/or data. When the chip system runs, the processor executes the program instructions stored in the memory, so that the chip system performs the communication method according to any one of the twenty-fifth aspect or the exemplary embodiments of the twenty-fifth aspect. The chip system may include a chip, or may include a chip and another discrete component.

According to a thirty-first aspect, an embodiment of this application further provides a communication method. The communication method may be performed by a multicast session management network element, a chip, or another apparatus. For example, the communication method is performed by a multicast session management network element. The method may include: The multicast session management network element receives a PDU session establishment request from a mobility management network element, where the PDU session establishment request is used to request to establish a PDU session, the PDU session establishment request includes a PDU session type, the PDU session type is used to indicate that the PDU session that a terminal requests to establish is a multicast PDU session, and the multicast PDU session is used to transmit multicast data; the multicast session management network element selects a multicast user plane network element based on the PDU session establishment request, where the multicast user plane network element is an anchor for transmitting the multicast data; and the multicast session management network element sends identification information of the multicast data to the multicast user plane network element.

Based on the method in the thirty-first aspect, after receiving the request for establishing the multicast PDU session, the multicast session management network element selects, for the multicast PDU session, the multicast user plane network element configured to transmit the multicast data. In this way, the multicast data is transmitted to a terminal by using a same user plane network element, improving resource utilization.

In an exemplary embodiment, the method includes: The multicast session management network element stores a correspondence between the identification information of the multicast data and the multicast user plane network element.

Based on this exemplary embodiment, after selecting the identification information of the multicast data for the first time, the multicast session management network element may store the correspondence between the identification information of the multicast data and the multicast user plane network element. In this way, after receiving a request for requesting to re-establish a multicast PDU session, the multicast session management network element selects the multicast user plane network element based on the correspondence, thereby reducing signaling overheads caused by selecting the multicast user plane network element.

According to a thirty-second aspect, this application provides a communication apparatus. The communication apparatus may be a multicast session management network element, a chip or a system on chip in the multicast session management network element, or may be a module or a unit that is in the multicast session management network element and that is configured to implement the communication method in embodiments of this application. The communication apparatus may implement functions performed by the multicast session management network element in the foregoing aspect or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the thirty-first aspect. The modules may be implemented by using a hardware circuit, software, or a combination of the hardware circuit and the software. In an exemplary embodiment, for example, the communication apparatus may include a receiving unit, a processing unit, and a sending unit.

The receiving unit is configured to receive, from a mobility management network element, a PDU session establishment request used to request to establish a PDU session, where the PDU session establishment request includes a PDU session type, the PDU session type is used to indicate that the PDU session that a terminal requests to establish is a multicast PDU session, and the multicast PDU session is used to transmit multicast data.

The processing unit is configured to select a multicast user plane network element based on the PDU session establishment request, where the multicast user plane network element is an anchor for transmitting the multicast data.

The sending unit is configured to send identification information of the multicast data to the multicast user plane network element.

For a specific implementation of the communication apparatus, refer to behavior functions of the multicast session management network element in the communication method provided in any one of the thirty-first aspect or the exemplary embodiments of the thirty-first aspect. Details are not described herein again. Therefore, the provided communication apparatus can achieve same beneficial effects as any one of the thirty-first aspect or the exemplary embodiments of the thirty-first aspect.

According to a thirty-third aspect, a communication apparatus is provided. The communication apparatus may be a multicast session management network element, or a chip or a system on chip in the multicast session management network element. The communication apparatus may implement functions performed by the multicast session management network element in the foregoing aspect or the exemplary embodiments, and the functions may be implemented by hardware. In an exemplary embodiment, the communication apparatus may include a processor and a communication interface. The processor may be configured to support the communication apparatus in implementing the functions in any one of the thirty-first aspect or the exemplary embodiments of the thirty-first aspect. For example, the processor is configured to: receive, from a mobility management network element through the communication interface, a PDU session establishment request used to request to establish a PDU session, where the PDU session establishment request includes a PDU session type, the PDU session type is used to indicate that the PDU session that a terminal requests to establish is a multicast PDU session, and the multicast PDU session is used to transmit multicast data; select a multicast user plane network element based on the PDU session establishment request; and send identification information of the multicast data to the multicast user plane network element, where the multicast user plane network element is an anchor for transmitting the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the thirty-first aspect or the exemplary embodiments of the thirty-first aspect.

According to a thirty-fourth aspect, a computer-readable storage medium is provided. The computer-readable storage medium stores instructions. When the instructions are run on a computer, the computer is enabled to perform the communication method according to any one of the thirty-first aspect or the exemplary embodiments of the thirty-first aspect.

According to a thirty-fifth aspect, a computer program product including instructions is provided. The computer program product may include program instructions. When the computer program product runs on a computer, the computer is enabled to perform the communication method according to any one of the thirty-first aspect or the exemplary embodiments of the thirty-first aspect.

According to a thirty-sixth aspect, a chip system is provided. The chip system includes a processor and a communication interface. The chip system may be configured to implement functions performed by the multicast session management network element in any one of the thirty-first aspect or the exemplary embodiments of the thirty-first aspect. For example, the processor is configured to: receive, from a mobility management network element through the communication interface, a PDU session establishment request used to request to establish a PDU session, where the PDU session establishment request includes a PDU session type, the PDU session type is used to indicate that the PDU session that a terminal requests to establish is a multicast PDU session, and the multicast PDU session is used to transmit multicast data; select a multicast user plane network element based on the PDU session establishment request; and send identification information of the multicast data to the multicast user plane network element, where the multicast user plane network element is an anchor for transmitting the multicast data. In an exemplary embodiment, the chip system further includes a memory. The memory is configured to store program instructions and/or data. When the chip system runs, the processor executes the program instructions stored in the memory, so that the chip system performs the communication method according to any one of the thirty-first aspect or the exemplary embodiments of the thirty-first aspect.

In a third technical solution, when a terminal modifies a PDU session, a multicast session management network element locates a user plane network element configured to transmit multicast data to a same multicast user plane network element, and the multicast session management network element notifies a unicast session management network element of identification information of the multicast user plane network element. In this way, the unicast session management network element is triggered to establish a transmission path between the multicast user plane network element and a unicast user plane network element, so that an application server delivers the multicast data to the multicast user plane network element, and the multicast user plane network element sends the multicast data to the terminal on the transmission path between the multicast user plane network element and the unicast user plane network element. Alternatively, a unicast user plane network element sends a PDU session modification request to an access network device, to trigger the access network device to establish a transmission path between the access network device and the multicast user plane network element, so that an application server delivers the multicast data to the multicast user plane network element, and the multicast user plane network element sends the multicast data to the terminal on the transmission path between the multicast user plane network element and the access network device. Specifically, for the technical solution, refer to the descriptions in the following thirty-seventh aspect to sixty-sixth aspect.

According to a thirty-seventh aspect, an embodiment of this application further provides a communication method. The communication method may be performed by a first session management network element, a chip, or another apparatus. For example, the communication method is performed by a first session management network element. The method may include: The first session management network element receives a first request, where the first request is used to request to use a first PDU session to transmit multicast data, the first request includes first identification information of the multicast data, and the first session management network element is configured to manage a user plane network element corresponding to the first PDU session; and the first session management network element obtains forwarding configuration information or first quality of service QoS context information of the multicast data based on the first identification information of the multicast data.

Based on the method in the thirty-seventh aspect, after receiving a request message that includes the first identification information of the multicast data, the first session management network element may obtain the forwarding configuration information or the first quality of service QoS context information of the multicast data. In this way, subsequently, the forwarding configuration information of the multicast data is configured for a unicast user plane network element, to trigger the unicast user plane network element to establish a transmission path between the unicast user plane network element and a multicast user plane network element. Alternatively, second QoS context information corresponding to the first QoS context information is sent to an access network device, to trigger the access network device to establish a transmission path between the access network device and a multicast user plane network element. Therefore, the multicast data is transmitted to the terminal by using the multicast user plane network element, improving resource utilization.

In an exemplary embodiment, the method includes: The first session management network element sends the forwarding configuration information to a unicast user plane network element corresponding to the first PDU session.

Based on this exemplary embodiment, the unicast user plane network element may be used to process the multicast data, and an anchor does not need to be switched through PDU session re-establishment, reducing signaling overheads and design complexity.

In an exemplary embodiment, the method includes: The first session management network element sends first path information to a second session management network element, where the first path information is used to establish a transmission path between a multicast user plane network element and the unicast user plane network element. The second session management network element is a session management network element that manages the multicast user plane network element, and the multicast user plane network element is an anchor for transmitting the multicast data.

Based on this exemplary embodiment, the second session management network element may send the first path information to the multicast user plane network element, to establish the transmission path between the multicast user plane network element and the unicast user plane network element. This is simple and easy to implement.

In an exemplary embodiment, the method includes: The first session management network element sends second QoS context information and third information to an access network device based on the first QoS context information, where the third information is used by the access network device to determine the first QoS context information, and the third information includes the first QoS context information or identification information of a multicast group corresponding to the multicast data.

Based on this exemplary embodiment, the first session management network element may send the second QoS context information and the third information to the access network device, so that the access network device can configure, based on unicast QoS context information or multicast QoS context information, a radio bearer resource used for transmitting the multicast data between the access network device and the terminal, improving resource configuration flexibility.

In an exemplary embodiment, the method includes: The first session management network element receives second path information from the access network device, and sending, by the first session management network element, the second path information to a second session management network element, where the second path information is used to establish a transmission path between a multicast user plane network element and the access network device. The second session management network element is a session management network element that manages the multicast user plane network element, and the multicast user plane network element is an anchor for transmitting the multicast data.

Based on this exemplary embodiment, the second session management network element may send the second path information to the multicast user plane network element, to establish the transmission path between the multicast user plane network element and the access network device. This is simple and easy to implement.

In an exemplary embodiment, that the first session management network element receives a first request includes: The first session management network element receives the first request from a mobility management network element; or the first session management network element receives the first request from the user plane network element corresponding to the first PDU session.

Based on this exemplary embodiment, the first session management network element receives, through control plane signaling transmission or user plane event notification, the request for using the first PDU session to transmit the multicast data. Request manners are flexible and diversified, and an application scope of the method is expanded.

In an exemplary embodiment, that the first session management network element obtains forwarding configuration information or first quality of service QoS context information of the multicast data based on the first identification information of the multicast data includes: The first session management network element obtains identification information of the second session management network element based on the first identification information of the multicast data, where the second session management network element is a session management network element that manages the multicast user plane network element, and the multicast user plane network element is an anchor for transmitting the multicast data; and the first session management network element sends second identification information of the multicast data to the second session management network element based on the identification information of the second session management network element; and the first session management network element receives the forwarding configuration information or first quality of service QoS context information of the multicast data from the second session management network element.

Based on this exemplary embodiment, the first session management network element may receive the forwarding configuration information or the first quality of service QoS context information of the multicast data from the second session management network element. This is simple and easy to implement.

In an exemplary embodiment, that the first session management network element obtains identification information of the second session management network element based on the identification information of the multicast data includes: The first session management network element sends the identification information of the multicast data to a first network element; and the first session management network element receives the identification information of the second session management network element from the first network element.

Based on this exemplary embodiment, the first session management network element may obtain the identification information of the second session management network element by interacting with the first network element. This is simple and easy to implement.

In an exemplary embodiment, that the first session management network element obtains first quality of service QoS context information based on the first identification information of the multicast data includes: The first session management network element sends the first identification information of the multicast data to the first network element; and the first session management network element receives the first QoS context information from the first network element.

Based on this exemplary embodiment, the first session management network element may further receive the first quality of service QoS context information from the first network element. This is simple and easy to implement.

In an exemplary embodiment, the first network element is a UDR, a PCF, a UDM, or an NRF.

Based on this exemplary embodiment, the UDM, the NRF, the UDR, or the PCF has functions of selecting the multicast user plane network element and the second session management network element. Network elements having the functions of selecting the multicast user plane network element and the second session management network element are flexible and diversified. Therefore, an application scope of the method is expanded.

According to a thirty-eighth aspect, this application provides a communication apparatus. The communication apparatus may be a first session management network element, a chip or a system on chip in the first session management network element, or may be a module or a unit that is in the first session management network element and that is configured to implement the communication method in embodiments of this application. The communication apparatus may implement functions performed by the first session management network element in the foregoing aspect or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the thirty-seventh aspect. The modules may be implemented by using a hardware circuit, software, or a combination of the hardware circuit and the software. In an exemplary embodiment, the communication apparatus may include a receiving unit and a processing unit.

The receiving unit is configured to receive a first request, where the first request is used to request to use a first PDU session to transmit multicast data, the first request includes first identification information of the multicast data, and the first session management network element is configured to manage a user plane network element corresponding to the first PDU session.

The processing unit is configured to obtain forwarding configuration information or first quality of service QoS context information of the multicast data based on the first identification information of the multicast data.

For a specific implementation of the communication apparatus, refer to behavior functions of the first session management network element in the communication method provided in any one of the thirty-seventh aspect or the exemplary embodiments of the thirty-seventh aspect. Details are not described herein again. Therefore, the provided communication apparatus can achieve same beneficial effects as any one of the thirty-seventh aspect or the exemplary embodiments of the thirty-seventh aspect.

According to a thirty-ninth aspect, a communication apparatus is provided. The communication apparatus may be a first session management network element, or a chip or a system on chip in the first session management network element. The communication apparatus may implement functions performed by the first session management network element in the foregoing aspect or the exemplary embodiments, and the functions may be implemented by hardware. In an exemplary embodiment, the communication apparatus may include a processor and a communication interface. The processor may be configured to support the communication apparatus in implementing the functions in any one of the thirty-seventh aspect or the exemplary embodiments of the thirty-seventh aspect. For example, the processor is configured to: receive a first request through the communication interface, where the first request is used to request to use a first PDU session to transmit multicast data, the first request includes first identification information of the multicast data, and the first session management network element is configured to manage a user plane network element corresponding to the first PDU session; and obtain forwarding configuration information or first quality of service QoS context information of the multicast data based on the first identification information of the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the thirty-seventh aspect or the exemplary embodiments of the thirty-seventh aspect. In this embodiment of this application, the communication interface may be a transceiver, an interface circuit, a bus interface, a pin, or another apparatus that can implement transceiver functions.

According to a fortieth aspect, a computer-readable storage medium is provided. The computer-readable storage medium stores instructions. When the instructions are run on a computer, the computer is enabled to perform the communication method according to any one of the thirty-seventh aspect or the exemplary embodiments of the thirty-seventh aspect.

According to a forty-first aspect, a computer program product including instructions is provided. The computer program product may include program instructions. When the computer program product runs on a computer, the computer is enabled to perform the communication method according to any one of the thirty-seventh aspect or the exemplary embodiments of the thirty-seventh aspect.

According to a forty-second aspect, a chip system is provided. The chip system includes a processor and a communication interface. The chip system may be configured to implement functions performed by the first session management network element in any one of the thirty-seventh aspect or the exemplary embodiments of the thirty-seventh aspect. For example, the processor is configured to: receive a first request through the communication interface, where the first request is used to request to use a first PDU session to transmit multicast data, the first request includes first identification information of the multicast data, and the first session management network element is configured to manage a user plane network element corresponding to the first PDU session; and obtain forwarding configuration information or first quality of service QoS context information of the multicast data based on the first identification information of the multicast data. In an exemplary embodiment, the chip system further includes a memory. The memory is configured to store program instructions and/or data. When the chip system runs, the processor executes the program instructions stored in the memory, so that the chip system performs the communication method according to any one of the thirty-seventh aspect or the exemplary embodiments of the thirty-seventh aspect. The chip system may include a chip, or may include a chip and another discrete component. This is not limited.

According to a forty-third aspect, an embodiment of this application further provides a communication method. The communication method may be performed by a second session management network element, a chip, or another apparatus. For example, the method is performed by a second session management network element. The method may include: The second session management network element receives second identification information of multicast data from a first session management network element; and the second session management network element sends forwarding configuration information or first quality of service QoS context information of the multicast data or identification information of a multicast user plane network element to the first session management network element based on the second identification information of the multicast data, where the multicast user plane network element is an anchor for transmitting the multicast data, and the second session management network element is a session management network element that manages the multicast user plane network element.

Based on the method in the forty-third aspect, the second session management network element may send the forwarding configuration information or the first quality of service QoS context information of the multicast data to the first session management network element. In this way, subsequently, the forwarding configuration information of the multicast data is configured for a unicast user plane network element, to trigger the unicast user plane network element to establish a transmission path between the unicast user plane network element and a multicast user plane network element. Alternatively, second QoS context information corresponding to the first QoS context information is sent to an access network device, to trigger the access network device to establish a transmission path between the access network device and a multicast user plane network element. Therefore, the multicast data is transmitted to the terminal by using the multicast user plane network element, improving resource utilization.

In an exemplary embodiment, the method further includes: The second session management network element configures the forwarding configuration information for the multicast data. Based on this exemplary embodiment, the second session management network element may configure the forwarding configuration information. This is simple and easy to implement.

In an exemplary embodiment, the method further includes: The second session management network element receives first path information from the first session management network element, where the first path information is used to establish a transmission path between the multicast user plane network element and a unicast user plane network element, and the unicast user plane network element is a user plane network element managed by the first session management network element; and the second session management network element sends the first path information and the identification information of the multicast data to the multicast user plane network element.

Based on this exemplary embodiment, the second session management network element may send the first path information to the multicast user plane network element, to establish the transmission path between the multicast user plane network element and the unicast user plane network element. This is simple and easy to implement.

In an exemplary embodiment, the method further includes: The second session management network element receives second path information from the first session management network element, where the second path information is used to establish a transmission path between the multicast user plane network element and an access network device; and the second session management network element sends the second path information and the identification information of the multicast data to the multicast user plane network element.

Based on this exemplary embodiment, the second session management network element may send the second path information to the multicast user plane network element, to establish the transmission path between the multicast user plane network element and the access network device, and the multicast user plane network element sends the multicast data to the terminal on the transmission path. This is simple and easy to implement.

In an exemplary embodiment, the method further includes: The second session management network element receives the identification information of the multicast data from an application server, a network exposure function NEF, or the first session management network element; and the second session management network element sends a correspondence between the identification information of the multicast data and identification information of the second session management network element to a first network element.

Based on this exemplary embodiment, the second session management network element may configure the correspondence between the identification information of the multicast data and the identification information of the second session management network element on the first network element. This is simple and easy to implement.

In an exemplary embodiment, the first network element is a unified data repository UDR, a policy control function PCF, a unified data management UDM, or a network repository function NRF.

In an exemplary embodiment, the method further includes: The second session management network element sends identification information of the multicast user plane network element to the application server.

Based on this exemplary embodiment, the second session management network element sends the identification information of the multicast user plane network element to the application server, so that the application server sends the multicast data to the multicast user plane network element based on the identification information of the multicast user plane network element. The multicast data is transmitted by using the multicast user plane network element, and the application server does not need to blindly send the multicast data.

According to a forty-fourth aspect, this application provides a communication apparatus. The communication apparatus may be a second session management network element, a chip or a system on chip in the second session management network element, or may be a module or a unit that is in the second session management network element and that is configured to implement the communication method in embodiments of this application. The communication apparatus may implement functions performed by the second session management network element in the foregoing aspect or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the forty-third aspect. The modules may be implemented by using a hardware circuit, software, or a combination of the hardware circuit and the software. In an exemplary embodiment, the communication apparatus may include a receiving unit and a sending unit.

The receiving unit is configured to receive second identification information of multicast data from a first session management network element.

The sending unit is configured to send forwarding configuration information or and/or first quality of service QoS context information of the multicast data and identification information of a multicast user plane network element to the first session management network element based on the second identification information of the multicast data, where a multicast user plane network element is an anchor for transmitting the multicast data, and the second session management network element is a session management network element that manages the multicast user plane network element.

For a specific implementation of the communication apparatus, refer to behavior functions of the second session management network element in the communication method provided in any one of the forty-third aspect or the exemplary embodiments of the forty-third aspect. Details are not described herein again. Therefore, the provided communication apparatus can achieve same beneficial effects as the forty-third aspect or the exemplary embodiments of the forty-third aspect.

According to a forty-fifth aspect, a communication apparatus is provided. The communication apparatus may be a second session management network element, or a chip or a system on chip in the second session management network element. The communication apparatus may implement functions performed by the second session management network element in the foregoing aspect or the exemplary embodiments, and the functions may be implemented by hardware. In an exemplary embodiment, the communication apparatus may include a processor and a communication interface. The processor may be configured to support the communication apparatus in implementing the function in any one of the forty-third aspect or the exemplary embodiments of the forty-third aspect. For example, the processor is configured to: receive second identification information of multicast data from a first session management network element through the communication interface; and send forwarding configuration information or and/or first quality of service QoS context information of the multicast data and identification information of a multicast user plane network element to the first session management network element based on the second identification information of the multicast data, where a multicast user plane network element is an anchor for transmitting the multicast data, and the second session management network element is a session management network element that manages the multicast user plane network element. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the forty-third aspect or the exemplary embodiments of the forty-third aspect. In this embodiment of this application, the communication interface may be a transceiver, an interface circuit, a bus interface, a pin, or another apparatus that can implement transceiver functions.

According to a forty-sixth aspect, a computer-readable storage medium is provided. The computer-readable storage medium stores instructions. When the instructions are run on a computer, the computer is enabled to perform the communication method according to any one of the forty-third aspect or the exemplary embodiments of the forty-third aspect.

According to a forty-seventh aspect, a computer program product including instructions is provided. The computer program product may include program instructions. When the computer program product runs on a computer, the computer is enabled to perform the communication method according to any one of the forty-third aspect or the exemplary embodiments of the forty-third aspect.

According to a forty-eighth aspect, a chip system is provided. The chip system includes a processor and a communication interface. The chip system may be configured to implement functions performed by the second session management network element in any one of the forty-third aspect or the exemplary embodiments of the forty-third aspect. For example, the processor is configured to: receive second identification information of multicast data from a first session management network element through the communication interface; and send forwarding configuration information or and/or first quality of service QoS context information of the multicast data and identification information of a multicast user plane network element to the first session management network element based on the second identification information of the multicast data, where a multicast user plane network element is an anchor for transmitting the multicast data, and the second session management network element is a session management network element that manages the multicast user plane network element. In an exemplary embodiment, the chip system further includes a memory. The memory is configured to store program instructions and/or data. When the chip system runs, the processor executes the program instructions stored in the memory, so that the chip system performs the communication method according to any one of the forty-third aspect or the exemplary embodiments of the forty-third aspect. The chip system may include a chip, or may include a chip and another discrete component. This is not limited.

According to a forty-ninth aspect, an embodiment of this application further provides a communication method. The communication method may be performed by a first network element, a chip, or another apparatus. For example, the method is performed by a first network element. The method may include: The first network element receives identification information of multicast data from a first session management network element; and the first network element sends identification information of a second session management network element to the first session management network element based on a correspondence between the identification information of the multicast data and the identification information of the second session management network element.

Based on the method in the forty-ninth aspect, the first network element may send the identification information of the second session management network element to the first session management network element, so that the first session management network element requests forwarding configuration information or first QoS context information of the multicast data from the second session management network element based on the identification information of the second session management network element, establishes a transmission path for multicast data transmission between a multicast user plane network element and another network element, and transmits the multicast data by using the multicast user plane network element, improving resource utilization.

In an exemplary embodiment, the first network element is a unified data repository UDR, a policy control function PCF, a unified data management UDM, or a network repository function NRF.

In an exemplary embodiment, the method includes: The first network element receives the correspondence from the second session management network element; the first network element receives the correspondence from a second network element; or the first network element receives the identification information of the multicast data from an application server, obtains the identification information of the second session management network element based on the identification information of the multicast data, and stores the correspondence between the identification information of the multicast data and the identification information of the second session management network element.

Based on this exemplary embodiment, the first network element may receive the correspondence between the identification information of the multicast data and the identification information of the second session management network element from another network element or generate the correspondence by itself. Obtaining manners are flexible and diversified and this is simple and easy to implement.

In an exemplary embodiment, the method further includes: The first network element receives identification information of a multicast user plane network element from the second session management network element.

Based on this exemplary embodiment, the first network element may further receive the identification information of the multicast user plane network element, and further store the correspondence between the identification information of the multicast data and the identification information of the multicast user plane network element, so that another network element queries the identification information of the multicast user plane network element. This is simple and easy to implement.

In an exemplary embodiment, the method further includes: The first network element sends the identification information of the multicast user plane network element to the application server.

Based on this exemplary embodiment, the first network element sends the identification information of the multicast user plane network element to the application server, so that the application server sends the multicast data to the multicast user plane network element based on the identification information of the multicast user plane network element. The multicast data is transmitted by using the multicast user plane network element, and the application server does not need to blindly send the multicast data.

According to a fiftieth aspect, this application provides a communication apparatus. The communication apparatus may be a first network element, a chip or a system on chip in the first network element, or may be a module or a unit that is in the first network element and that is configured to implement the communication method in embodiments of this application. The communication apparatus may implement functions performed by the first network element in the foregoing aspects or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the forty-ninth aspect. The modules may be implemented by using a hardware circuit, software, or a combination of the hardware circuit and the software. In an exemplary embodiment, the communication apparatus may include a receiving unit and a sending unit.

The receiving unit is configured to receive identification information of multicast data from a first session management network element.

The sending unit is configured to send identification information of a second session management network element to the first session management network element based on a correspondence between the identification information of the multicast data and the identification information of the second session management network element.

For a specific implementation of the communication apparatus, refer to behavior functions of the first network element in the communication method provided in any one of the forty-ninth aspect or the exemplary embodiments of the forty-ninth aspect. Details are not described herein again. Therefore, the provided communication apparatus can achieve same beneficial effects as the forty-ninth aspect or the exemplary embodiments of the forty-ninth aspect.

According to a fifty-first aspect, a communication apparatus is provided. The communication apparatus may be a first network element or a chip or a system on chip in the first network element. The communication apparatus may implement functions performed by the first network element in the foregoing aspects or the exemplary embodiments, and the functions may be implemented by hardware. In an exemplary embodiment, the communication apparatus may include a processor and a communication interface. The processor may be configured to support the communication apparatus in implementing the functions in any one of the forty-ninth aspect or the exemplary embodiments of the forty-ninth aspect. For example, the processor is configured to receive: identification information of multicast data from a first session management network element through the communication interface; and send identification information of a second session management network element to the first session management network element based on a correspondence between the identification information of the multicast data and the identification information of the second session management network element. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the forty-ninth aspect or the exemplary embodiments of the forty-ninth aspect. In this embodiment of this application, the communication interface may be a transceiver, an interface circuit, a bus interface, a pin, or another apparatus that can implement transceiver functions.

According to a fifty-second aspect, a computer-readable storage medium is provided. The computer-readable storage medium stores instructions. When the instructions are run on a computer, the computer is enabled to perform the communication method according to any one of the forty-ninth aspect or the exemplary embodiments of the forty-ninth aspect.

According to a fifty-third aspect, a computer program product including instructions is provided. The computer program product may include program instructions. When the computer program product runs on a computer, the computer is enabled to perform the communication method according to any one of the forty-ninth aspect or the exemplary embodiments of the forty-ninth aspect.

According to a fifty-fourth aspect, a chip system is provided. The chip system includes a processor and a communication interface. The chip system may be configured to implement functions performed by the first network element in any one of the forty-ninth aspect or the exemplary embodiments of the forty-ninth aspect. For example, the processor is configured to receive: identification information of multicast data from a first session management network element through the communication interface; and send identification information of a second session management network element to the first session management network element based on a correspondence between the identification information of the multicast data and the identification information of the second session management network element. In an exemplary embodiment, the chip system further includes a memory. The memory is configured to store program instructions and/or data. When the chip system runs, the processor executes the program instructions stored in the memory, so that the chip system performs the communication method according to any one of the forty-ninth aspect or the exemplary embodiments of the forty-ninth aspect. The chip system may include a chip, or may include a chip and another discrete component. This is not limited.

According to a fifty-fifth aspect, an embodiment of this application further provides a communication method. The communication method may be performed by an application server, a chip, or another apparatus. For example, the communication method is performed by an application server. The method may include: The application server sends identification information of multicast data; and the application server receives identification information of a multicast user plane network element, where the multicast user plane network element is an anchor for transmitting the multicast data.

Based on the method in the fifty-fifth aspect, the application server may actively obtain the identification information of the multicast user plane network element, and subsequently transmit the multicast data by using the multicast user plane network element, improving resource utilization.

In an exemplary embodiment, that the application server sends identification information of multicast data includes: The application server sends the identification information of the multicast data to a second network element; the application server sends the identification information of the multicast data to a second session management network element, where the second session management network element is a session management network element that manages the multicast user plane network element; or the application server sends the identification information of the multicast data to a first network element.

Based on this exemplary embodiment, the application server may send the identification information of the multicast data to any one of a plurality of network elements. Therefore, an application scope of the method is expanded.

In an exemplary embodiment, the first network element is a UDR, a PCF, or a UDM.

In an exemplary embodiment, the second network element is a network exposure function NEF, a network repository function NRF, or another network element that has a function of selecting a multicast session management network element.

According to a fifty-sixth aspect, this application provides a communication apparatus. The communication apparatus may be an application server, a chip or a system on chip in the application server, or may be a module or a unit that is in the application server and that is configured to implement the communication method in embodiments of this application. The communication apparatus may implement functions performed by the application server in the foregoing aspects or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the fifty-fifth aspect. The modules may be implemented by using a hardware circuit, software, or a combination of the hardware circuit and the software. In an exemplary embodiment, the communication apparatus may include a sending unit and a receiving unit.

The sending unit is configured to send identification information of multicast data.

The receiving unit is configured to receive identification information of a multicast user plane network element, where the multicast user plane network element is an anchor for transmitting the multicast data.

For a specific implementation of the communication apparatus, refer to behavior functions of the application server in the communication method provided in any one of the fifty-fifth aspect or the exemplary embodiments of the fifty-fifth aspect. Details are not described herein again. Therefore, the provided communication apparatus can achieve same beneficial effects as any one of the fifty-fifth aspect or the exemplary embodiments of the fifty-fifth aspect.

According to a fifty-seventh aspect, a communication apparatus is provided. The communication apparatus may be an application server, or a chip or a system on chip in the application server. The communication apparatus may implement functions performed by the application server in the foregoing aspects or the exemplary embodiments, and the functions may be implemented by hardware. In an exemplary embodiment, the communication apparatus may include a processor and a communication interface. The processor may be configured to support the communication apparatus in implementing the functions in any one of the fifty-fifth aspect or the exemplary embodiments of the fifty-fifth aspect. For example, the processor is configured to send identification information of multicast data and receive identification information of a multicast user plane network element through the communication interface, where the multicast user plane network element is an anchor for transmitting the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the fifty-fifth aspect or the exemplary embodiments of the fifty-fifth aspect. In this embodiment of this application, the communication interface may be a transceiver, an interface circuit, a bus interface, a pin, or another apparatus that can implement transceiver functions.

According to a fifty-eighth aspect, a computer-readable storage medium is provided. The computer-readable storage medium stores instructions. When the instructions are run on a computer, the computer is enabled to perform the communication method according to any one of the fifty-fifth aspect or the exemplary embodiments of the fifty-fifth aspect.

According to a fifty-ninth aspect, a computer program product including instructions is provided. The computer program product may include program instructions. When the computer program product runs on a computer, the computer is enabled to perform the communication method according to any one of the fifty-fifth aspect or the exemplary embodiments of the fifty-fifth aspect.

According to a sixtieth aspect, a chip system is provided. The chip system includes a processor and a communication interface. The chip system may be configured to implement functions performed by the application server in any one of the fifty-fifth aspect or the exemplary embodiments of the fifty-fifth aspect. For example, the processor is configured to send identification information of multicast data and receive identification information of a multicast user plane network element through the communication interface, where the multicast user plane network element is an anchor for transmitting the multicast data. In an exemplary embodiment, the chip system further includes a memory. The memory is configured to store program instructions and/or data. When the chip system runs, the processor executes the program instructions stored in the memory, so that the chip system performs the communication method according to any one of the fifty-fifth aspect or the exemplary embodiments of the fifty-fifth aspect. The chip system may include a chip, or may include a chip and another discrete component. This is not limited.

According to a sixty-first aspect, an embodiment of this application further provides a communication method. The communication method may be performed by a second network element, a chip, or another apparatus. For example, the method is performed by a second network element. The method may include: The second network element receives identification information of multicast data from an application server; and the second network element sends the identification information of the multicast data to a second session management network element based on the identification information of the multicast data.

Based on the method in the sixty-first aspect, the application server may send the identification information of the multicast data to the second session management network element by using the second network element, so that the second session management network element stores a correspondence between the identification information of the multicast data and identification information of the second session management network element for another network element. This is simple and easy to implement.

In an exemplary embodiment, the method further includes: The second network element sends the identification information of the multicast data to a first network element; and the second network element receives identification information of the second session management network element from the first network element.

Based on this exemplary embodiment, the second network element may obtain the identification information of the second session management network element by interacting with the first network element. This is simple and easy to implement.

In an exemplary embodiment, the method includes: the first network element is a UDR, a PCF, or a UDM.

In an exemplary embodiment, the second network element is a network exposure function NEF, a network repository function NRF, or another network element that has a function of selecting a multicast session management network element.

According to a sixty-second aspect, this application provides a communication apparatus. The communication apparatus may be a second network element, a chip or a system on chip in the second network element, or may be a module or a unit that is in the second network element and that is configured to implement the communication method in embodiments of this application. The communication apparatus may implement functions performed by the second network element in the foregoing aspects or the exemplary embodiments, and the functions may be implemented by hardware, or by hardware executing corresponding software. The hardware or the software includes one or more modules corresponding to the functions. In an exemplary embodiment, the apparatus may include modules that are in one-to-one correspondence with the methods/operations/steps/actions described in the sixty-first aspect. The modules may be implemented by using a hardware circuit, software, or a combination of the hardware circuit and the software. In an exemplary embodiment, the communication apparatus may include a receiving unit and a sending unit.

The receiving unit is configured to receive identification information of multicast data from an application server.

The sending unit is configured to send the identification information of the multicast data to a second session management network element based on the identification information of the multicast data.

For a specific implementation of the communication apparatus, refer to behavior functions of the second network element in the communication method provided in any one of the sixty-first aspect or the exemplary embodiments of the sixty-first aspect. Details are not described herein again. Therefore, the provided communication apparatus can achieve same beneficial effects as any one of the sixty-first aspect or the exemplary embodiments of the sixty-first aspect.

According to a sixty-third aspect, a communication apparatus is provided. The communication apparatus may be a second network element or a chip or a system on chip in the second network element. The communication apparatus may implement functions performed by the second network element in the foregoing aspects or the exemplary embodiments, and the functions may be implemented by hardware. In an exemplary embodiment, the communication apparatus may include a processor and a communication interface. The processor may be configured to support the communication apparatus in implementing the functions in any one of the sixty-first aspect or the exemplary embodiments of the sixty-first aspect. For example, the processor is configured to: identification information of multicast data from an application server; and send the identification information of the multicast data to a second session management network element based on the identification information of the multicast data. In another exemplary embodiment, the communication apparatus may further include a memory, and the memory is configured to store computer instructions and/or data. When the communication apparatus runs, the processor executes the computer instructions stored in the memory, so that the communication apparatus performs the communication method according to any one of the sixty-first aspect or the exemplary embodiments of the sixty-first aspect. In this embodiment of this application, the communication interface may be a transceiver, an interface circuit, a bus interface, a pin, or another apparatus that can implement transceiver functions.

According to a sixty-fourth aspect, a computer-readable storage medium is provided. The computer-readable storage medium stores instructions. When the instructions are run on a computer, the computer is enabled to perform the communication method according to any one of the sixty-first aspect or the exemplary embodiments of the sixty-first aspect.

According to a sixty-fifth aspect, a computer program product including instructions is provided. The computer program product may include program instructions. When the computer program product runs on a computer, the computer is enabled to perform the communication method according to any one of the sixty-first aspect or the exemplary embodiments of the sixty-first aspect.

According to a sixty-sixth aspect, a chip system is provided. The chip system includes a processor and a communication interface. The chip system may be configured to implement functions performed by the second network element in any one of the sixty-first aspect or the exemplary embodiments of the sixty-first aspect. For example, the processor is configured to: identification information of multicast data from an application server; and send the identification information of the multicast data to a second session management network element based on the identification information of the multicast data. In an exemplary embodiment, the chip system further includes a memory. The memory is configured to store program instructions and/or data. When the chip system runs, the processor executes the program instructions stored in the memory, so that the chip system performs the communication method according to any one of the sixty-first aspect or the exemplary embodiments of the sixty-first aspect. The chip system may include a chip, or may include a chip and another discrete component. This is not limited.

According to a sixty-seventh aspect, an embodiment of this application further provides a communication system. The communication system includes the communication apparatus according to any one of the second aspect to the sixth aspect, the communication apparatus according to any one of the eighth aspect to the twelfth aspect, the communication apparatus according to any one of the fourteenth aspect to the eighteenth aspect, and the communication apparatus according to any one of the twentieth aspect to the twenty-fourth aspect.

Alternatively, the communication system includes the communication apparatus according to any one of the twenty-sixth aspect to the thirtieth aspect and the communication apparatus according to any one of the thirty-second aspect to the thirty-sixth aspect.

Alternatively, the communication system includes the communication apparatus according to any one of the thirty-eighth aspect to the forty-second aspect, the communication apparatus according to any one of the forty-fourth aspect to the forty-eighth aspect, the communication apparatus according to any one of the fiftieth aspect to the fifty-fourth aspect, the communication apparatus according to any one of the fifty-sixth aspect to the sixtieth aspect, and the communication apparatus according to any one of the sixty-second aspect to the sixty-sixth aspect.

BRIEF DESCRIPTION OF DRAWINGS

FIG. 5A and FIG. 5B are a flowchart of a communication method according to an embodiment of this application;

FIG. 8A and FIG. 8B are a flowchart of another communication method according to an embodiment of this application;

FIG. 10A to FIG. 10C are a flowchart of still another communication method according to an embodiment of this application;

FIG. 12A to FIG. 12C are a flowchart of still another communication method according to an embodiment of this application;

DESCRIPTION OF EMBODIMENTS

The following describes technical solutions in embodiments of this application with reference to the accompanying drawings.

Figure 1:
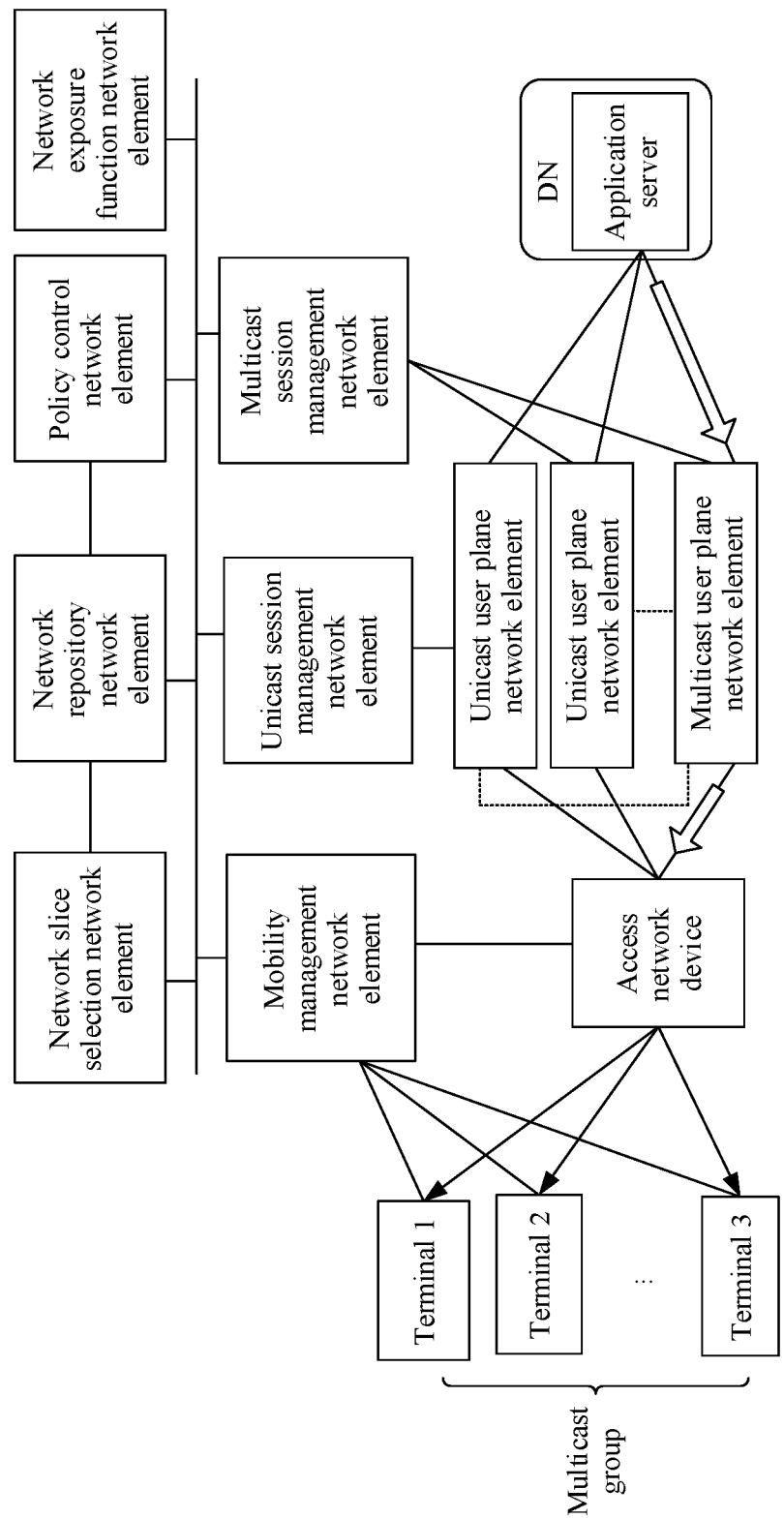
FIG. 1 is a schematic diagram of an architecture of a communication system according to an embodiment of this application.

The communication method provided in embodiments of this application may be applied to a communication system shown in FIG. 1. As shown in FIG. 1, the communication system may include a plurality of terminals, an access network device, a mobility management network element, a plurality of session management network elements, a plurality of user plane network elements, a network exposure function network element, a policy control network element, a network repository network element, a network slice selection network element, a data network (DN), and the like. The plurality of terminals may form a multicast group, and the plurality of terminals may receive same data, for example, multicast data. The user plane network elements may be classified into a unicast user plane network element and a multicast user plane network element based on types of data transmitted on the user plane network elements. The unicast user plane network element is configured to transmit unicast data, and the multicast user plane network element may be configured to transmit multicast data. The unicast data may be data sent to a specific terminal or user. The multicast data may be data sent to a multicast group or a plurality of terminals. A receiving object of the multicast data may be a group of terminals, and these terminals are authorized to receive the data. The plurality of session management network elements may be classified into a multicast session management network element and a unicast session management network element based on types of user plane network elements managed by the plurality of session management network elements. The unicast session management network element may be a session management network element that manages a unicast user plane network element, and the multicast session management network element may be a session management network element that manages a multicast user plane network element.

The terminal may be referred to as terminal equipment, user equipment (UE), a mobile station (MS), a mobile terminal (MT), or the like. Specifically, the terminal in FIG. 1 may be a mobile phone, a tablet computer, or a computer with a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like.

The access network device is mainly configured to implement functions such as a physical layer function, resource scheduling and management, terminal access control, and mobility management. The access network device may be a device supporting wired access, or may be a device supporting wireless access. For example, the access network device may be an access network (AN)/a radio access network (RAN), and include a plurality of 5G-AN/5G-RAN nodes. The 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The mobility management network element is mainly responsible for access authentication of a terminal, mobility management, signaling exchange between functional network elements, and the like, such as managing a registration status of a user, a connection status of a user, user registration and network access, tracking area update, user authentication during cell handover, and key security.

The session management network element is mainly configured to implement a user plane transmission logical channel, for example, a session management function such as establishment, release, and change of a packet data unit (PDU) session.

The user plane network element may be used as an anchor on the user plane transmission logical channel, and is configured to complete functions such as routing and forwarding of user plane data. For example, the PGW establishes a channel (that is, the user plane transmission logical channel) between the PGW and the terminal, forwards a data packet between the terminal and the DN on the channel, and is responsible for data packet filtering, data forwarding, rate control, and generation of charging information for the terminal.

The network exposure function network element may be configured to functions such as exposing an event and a capability of a core network, mutual translation between an external parameter of the core network and an internal parameter of the core network, receiving and storing information provided by an external network element of the core network, and selecting a core network element. The external network element of the core network may include an application server and the like.

The policy control network element may be configured to provide a policy, such as a quality of service policy or a slice selection policy, for the mobility management network element and the session management network element.

The network repository network element may be configured to store user data, such as subscription information and authentication or authorization data of a user. Specifically, the network repository network element may be a unified data management (UDM), a network repository function (NRF), a unified data repository (UDR), or the like.

The network slice selection network element may be configured to: select a network slice (NS), select a set of mobility management network elements, select a set of network repository functions (NRFs), or the like.

The DN may be an operator network that provides a data transmission service for a user, for example, may be an operator network that provides an IP multimedia service (IMS) for the user. An application server may be deployed in the DN, and the application server may provide a data transmission service for a user.

It should be noted that FIG. 1 is merely an example diagram of the architecture. In addition to the functional units shown in FIG. 1, the system may further include another functional network element, for example, an operation and management (O&M) network element. This is not limited in embodiments of this application. In addition, names of the devices in FIG. 1 are not limited. In addition to the names shown in FIG. 1, the devices may also have other names. For example, the names are replaced with names of network elements having same or similar functions. This is not limited.

Based on the system shown in FIG. 1, an embodiment of this application provides a communication method, to send multicast data to two or more terminals by using a same multicast user plane network element. The method may include: A terminal initiates a PDU session modification procedure. A unicast session management network element is triggered to select a multicast user plane network element, notify the terminal to initiate a PDU session re-establishment procedure to switch an anchor of the PDU session to the multicast user plane network element, and send multicast data to the terminal by using the multicast user plane network element. Specifically, for this process, refer to descriptions in embodiments corresponding to FIG. 4A to FIG. 6B. Alternatively, when the terminal requests to establish a multicast PDU session, a multicast session management network element and a multicast user plane network element are selected for the multicast PDU session, and multicast data is sent, by using the multicast user plane network element, to all terminals that request to establish the multicast PDU session. Specifically, for this process, refer to descriptions in embodiments corresponding to FIG. 7 and FIG. 8A and FIG. 8B. Alternatively, a terminal initiates a PDU session modification procedure, to trigger a unicast session management network element to select a multicast session management network element. The multicast session management network element selects a multicast user plane network element, establishes a transmission path between the unicast user plane network element and the multicast user plane network element or an IP multicast transmission path between the multicast user plane network element and an access network device, and sends the multicast data to the terminal on the transmission path between the multicast user plane network element and the unicast user plane network element or the IP multicast transmission path between the multicast user plane network element and the access network device. Specifically, for this process, refer to descriptions in embodiments corresponding to FIG. 9 to FIG. 11.

Specifically, the communication system shown in FIG. 1 may be a 3rd generation partnership project (3GPP) communication system such as a long term evolution (LTE) communication system, a 4th generation (4G) communication system, a 5th generation (5G) communication system or a new radio (NR) communication system, or may be a non-3GPP communication system. This is not limited.

Figure 2:
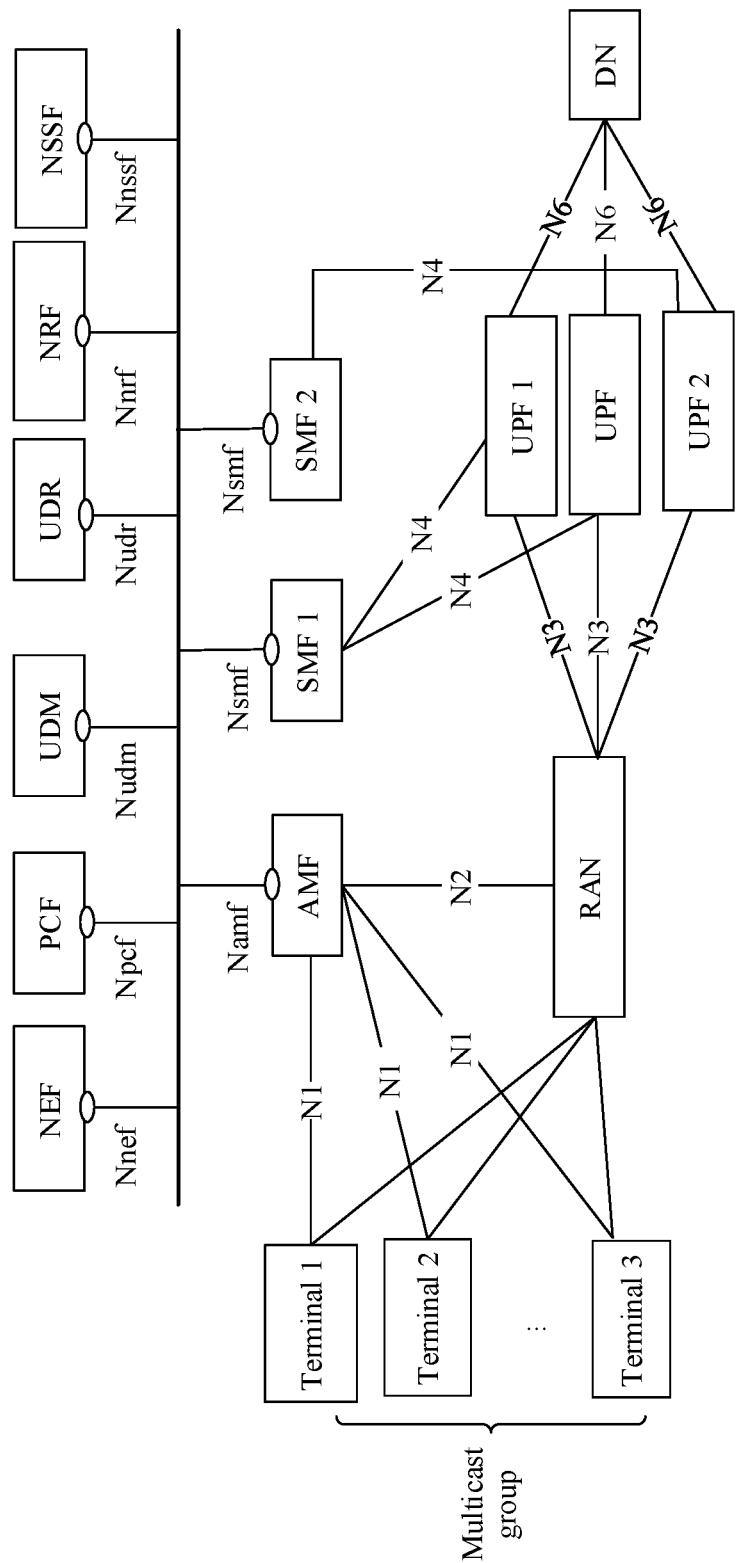
FIG. 2 is a diagram of an architecture of a 5G communication system according to an embodiment of this application.

For example, the communication system shown in FIG. 1 is a 5G communication system. As shown in FIG. 2, a network element or an entity corresponding to the multicast session management network element may be a session management function (SMF) in the 5G communication system, the multicast session management network element may be a multicast session management function (M-SMF) in the 5G communication system, a network element or an entity corresponding to the user plane network element may be a user plane function (UPF) in the 5G communication system, and the multicast user plane network element may be a multicast user plane function (M-UPF) in the 5G communication system. A network element or an entity corresponding to the access network device may be a radio access network (radio access network, RAN) in the 5G communication system, a network element or an entity corresponding to the mobility management network element may be an access and mobility management function (AMF) in the 5G communication system, a network element or an entity corresponding to the policy control network element may be a policy control function (PCF) in the 5G communication system, a network element or an entity corresponding to the network exposure function network element may be a network exposure function (NEF) in the 5G communication system, a network element or an entity corresponding to the network slice selection network element may be a network slice selection function in the 5G communication system, and a network element or an entity corresponding to the network repository network element may be an NRF, a unified data repository (UDR), or a unified data management (UDM) in the 5G communication system.

As shown in FIG. 2, a terminal communicates with the AMF through a next generation (N) 1 interface (N1 for short), the RAN device communicates with the AMF through an N2 interface (N2 for short), the RAN device communicates with the UPF through an N3 interface (N3 for short), and the UPF communicates with the application server in the DN through an N6 interface. Core network elements can communicate with each other through service-based interfaces. For example, the AMF can communicate with another core network element through an Namf interface, the SMF can communicate with another core network element through an Nsmf interface, the NEF can communicate with another core network element through an Nnef interface, the PCF can communicate with another core network element through an Npcf interface, the UDM can communicate with another core network element through an Nudm interface, the UDR can communicate with another core network element through an Nudr interface, the NRF can communicate with another core network element through an Nnrf interface, and the NSSF can communicate with another core network element through an Nnssf interface.

Figure 3:
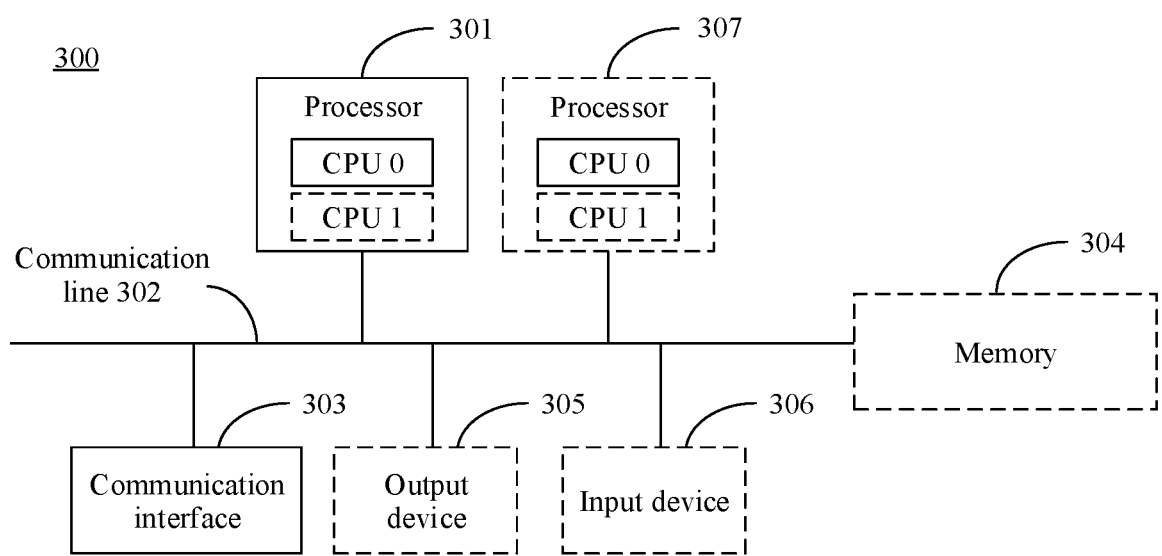
FIG. 3 is a schematic diagram of a hardware structure of a communication apparatus according to an embodiment of this application.

During specific implementation, all devices in the communication system shown in FIG. 1, such as the mobility management network element, the session management network element, and the user plane network element, each may use a composition structure shown in FIG. 3, or include components shown in FIG. 3. FIG. 3 is a schematic diagram of composition of a communication apparatus 300 according to an embodiment of this application. The communication apparatus 300 may include a processor 301, a communication line 302, and a communication interface 303. Further, the communication apparatus 300 may include a memory 304. The processor 301, the memory 304, and the communication interface 303 may be connected to each other through the communication line 302.

The processor 301 may be a central processing unit (CPU), a general-purpose processor, a network processor (NP), a digital signal processor (DSP), a microprocessor, a microcontroller, a programmable logic device (PLD), or any combination thereof. Alternatively, the processor 301 may be another apparatus having a processing function, for example, a circuit, a component, or a software module. This is not limited.

The communication line 302 is configured to transmit information between components included in the communication apparatus 300.

The communication interface 303 is configured to communicate with another device or another communication network. The another communication network may be an Ethernet network, a radio access network (RAN), a wireless local area network (WLAN), or the like. The communication interface 303 may be a module, a circuit, a transceiver, or any apparatus that can implement communication.

The memory 304 is configured to store instructions. The instructions may be a computer program.

The memory 304 may be a read-only memory (ROM) or another type of static storage device that can store static information and/or instructions, may be a random access memory (RAM) or another type of dynamic storage device that can store information and/or instructions, or may be an electrically erasable programmable read-only memory (EEPROM), a compact disc read-only memory (CD-ROM), or another compact disc storage, optical disc storage (including a compressed optical disc, a laser disc, an optical disc, a digital universal optical disc, and a Blu-ray optical disc), magnetic disk storage medium or another magnetic storage device. This is not limited.

It should be noted that the memory 304 may exist independently of the processor 301, or may be integrated with the processor 301. The memory 304 may be configured to store instructions, program code, some data, or the like. The memory 304 may be located inside the communication apparatus 300, or may be located outside the communication apparatus 300. This is not limited.

The processor 301 is configured to execute the instructions stored in the memory 304, to implement the communication methods provided in the following embodiments of this application. For example, when the communication apparatus 300 is a session management network element, or a chip or a system on chip in the session management network element, the processor 301 executes the instructions stored in the memory 304, to implement steps performed by a session management network element in the following embodiments of this application. For another example, when the communication apparatus 300 is a mobility management network element, or a chip or a system on chip in the mobility management network element, the processor 301 may execute the instructions stored in the memory 304, to implement steps performed by a mobility management network element in the following embodiments of this application.

In an example, the processor 301 may include one or more CPUs, for example, a CPU 0 and a CPU 1 in FIG. 3.

In an optional implementation, the communication apparatus 300 includes a plurality of processors. For example, in addition to the processor 301 in FIG. 3, the communication apparatus 300 may further include a processor 307.

In an optional implementation, the communication apparatus 300 further includes an output device 305 and an input device 306. For example, the input device 306 is a device such as a keyboard, a mouse, a microphone, or a joystick, and the output device 305 is a device such as a display or a speaker.

It should be noted that the communication apparatus 300 may be a desktop computer, a portable computer, a network server, a mobile phone, a tablet computer, a wireless terminal, an embedded device, a chip system, or a device having a structure similar to that in FIG. 3. In addition, the composition structure shown in FIG. 3 does not constitute a limitation on the communication apparatus. In addition to the components shown in FIG. 3, the communication apparatus may include more or fewer components than those shown in the figure, or some components may be combined, or different component arrangements may be used.

In this embodiment of this application, the chip system may include a chip, or may include a chip and another discrete component.

The following describes the communication method provided in embodiments of this application with reference to the communication system shown in FIG. 1. Network elements in the following embodiments may have components shown in FIG. 3. Details are not described again. It should be noted that actions, terms, and the like in embodiments of this application may be mutually referenced. This is not limited. In embodiments of this application, a name of a message exchanged between devices, a name of a parameter in a message, or the like is merely an example. In a specific implementation, another name may alternatively be used. This is not limited. For example, multicast in embodiments of this application may be replaced with terms such as broadcast, multicast communication, and multicast/broadcast. "Determining" in embodiments of this application may also be understood as creating or generating, and "including" in embodiments of this application may also be understood as "carrying". Unified descriptions are provided herein. Details are not specifically limited in embodiments of this application.

Figure 4A:
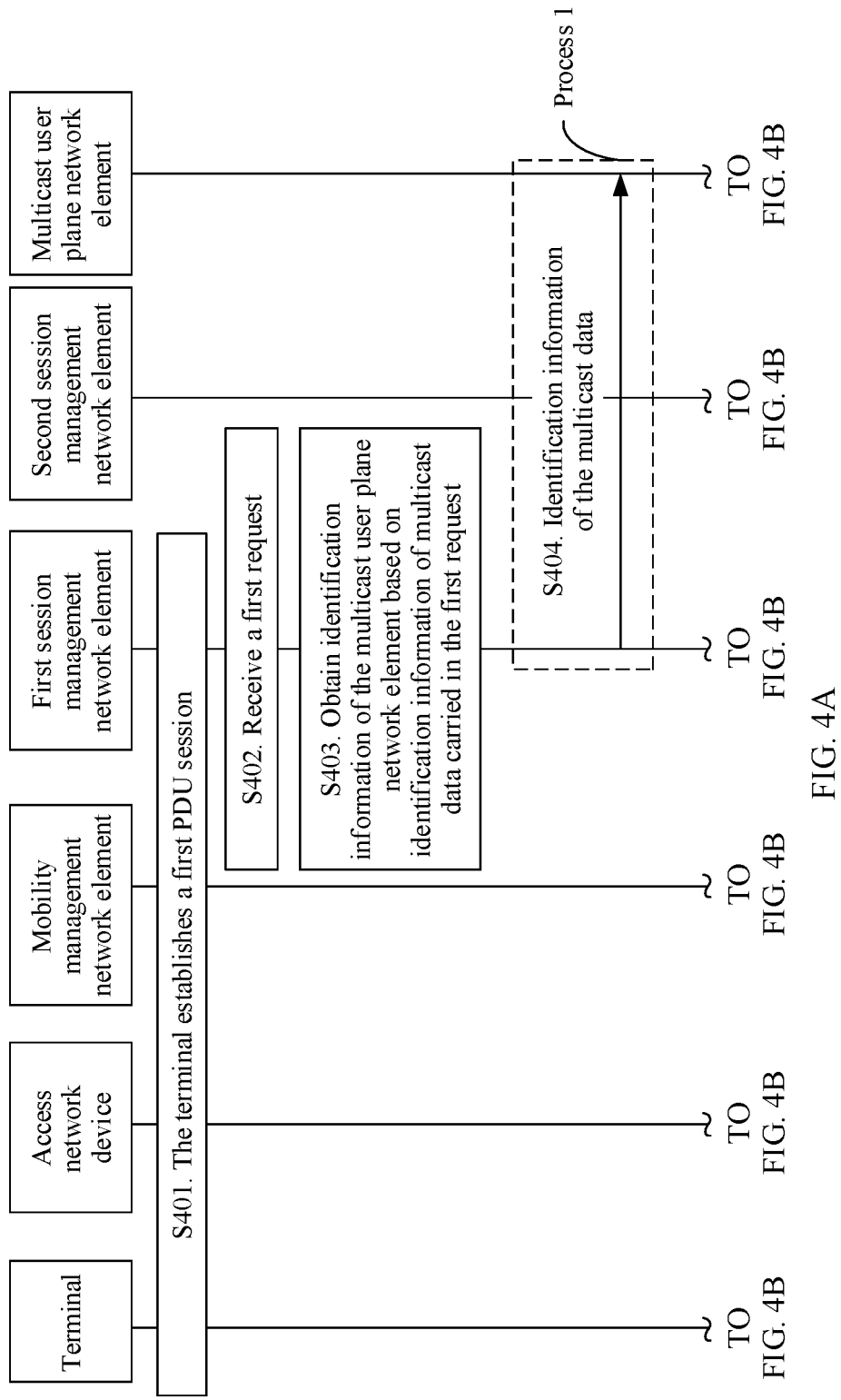
FIG. 4A and FIG. 4B are a flowchart of a communication method according to an embodiment of this application.
Figure 4B:
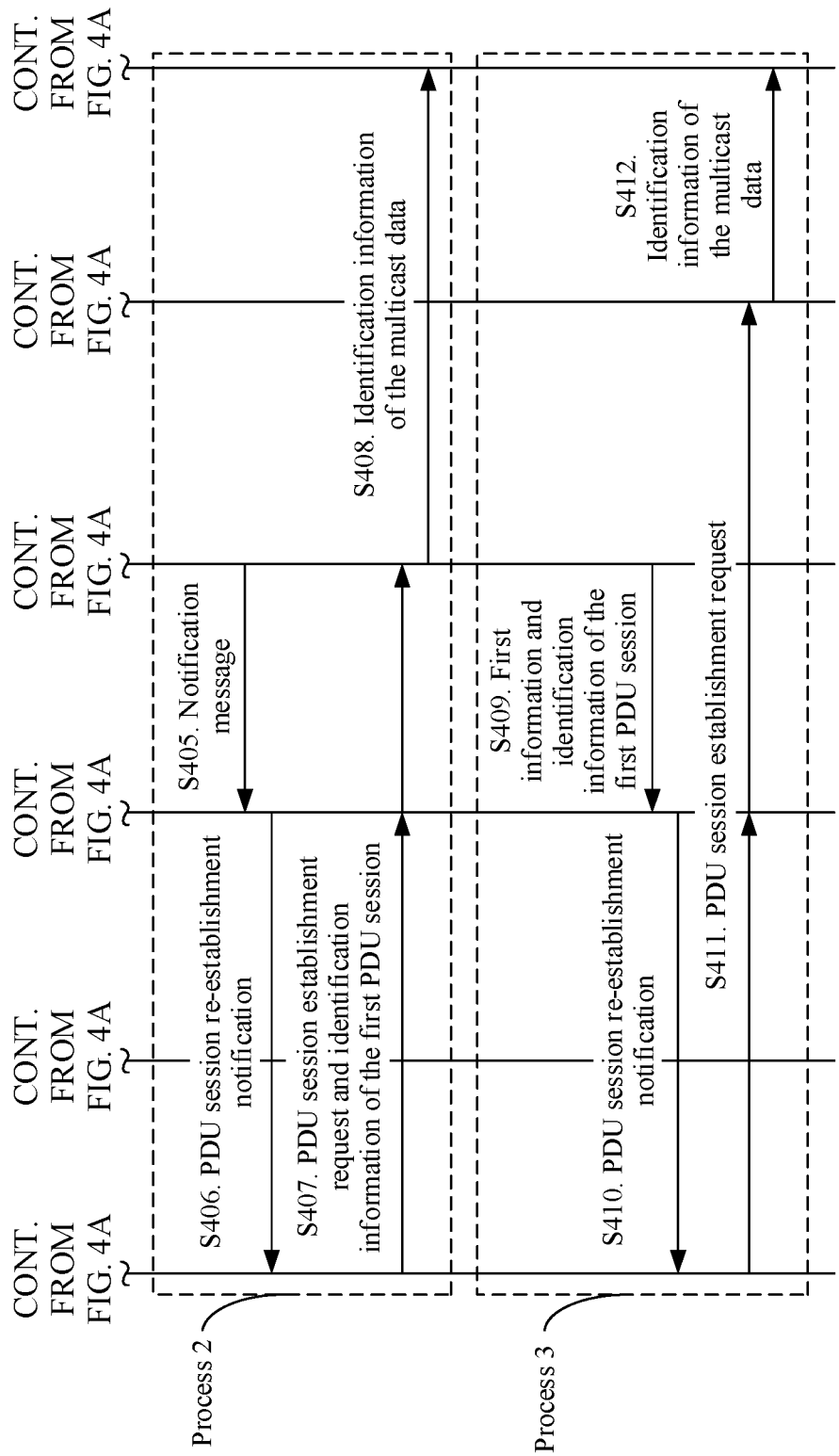

FIG. 4A and FIG. 4B are a flowchart of a communication method according to an embodiment of this application. In the method, a multicast user plane network element configured to transmit multicast data is selected in a PDU session modification process, and an anchor (anchor) of a PDU session is switched from a unicast user plane network element to the multicast user plane network element in a PDU session establishment process. The multicast user plane network element receives multicast data sent by an application server, and sends the multicast data to a terminal. As shown in FIG. 4A and FIG. 4B, the method includes the following steps.

S401. A terminal establishes a first PDU session.

The terminal may be any one of the terminals in FIG. 1, for example, may be a terminal 1, a terminal 2, or a terminal 3 in the multicast group shown in FIG. 1. The first PDU session may be a unicast PDU session.

In this embodiment of this application, the communication method is described by using an example in which an anchor of the first PDU session or a user plane network element corresponding to the first PDU session is a unicast user plane network element and a session management network element that manages the unicast user plane network element is a first session management network element.

After the terminal successfully establishes the first PDU session, a mobility management network element may store a correspondence between identification information of the first PDU session and identification information of the first session management network element. The first session management network element may store a correspondence between the identification information of the first PDU session and identification information of the unicast user plane network element, for example, store the correspondence between the identification information of the first PDU session and the identification information of the unicast user plane network element in a context of the first PDU session.

The identification information of the first PDU session may be used to identify the first PDU session, and the identification information of the first PDU session may be an identifier (ID) of the first PDU session. The identification information of the first PDU session may be configured by the terminal, and the identification information of the first PDU session is carried in a PDU session establishment request and sent to the mobility management network element and another core network element.

The identification information of the first session management network element may be used to identify the first session management network element. For example, the identification information of the first session management network element may be an internet protocol (IP) address of the first session management network element, a media access control (MAC) address of the first session management network element, a fully qualified domain name (FQDN) of the first session management network element, or another identifier that can identify the first session management network element. This is not limited.

The unicast user plane network element may be a user plane network element corresponding to the first PDU session. Alternatively, the unicast user plane network element is a UPF that is directly connected to a DN and that transmits unicast data, a UPF that receives unicast data sent by an application server, a UPF that serves as an N6 interface termination point for unicast data transmission, or an ingress network element that receives multicast data on a core network user plane. The identification information of the unicast user plane network element may be used to identify the unicast user plane network element. For example, the identification information of the unicast user plane network element may be an IP address of the unicast user plane network element, a MAC address of the unicast user plane network element, an FQDN of the unicast user plane network element, or another identifier that can identify the unicast user plane network element. This is not limited.

S402. The first session management network element receives a first request.

The first request may be used to request to use the first PDU session to transmit multicast data. The PDU session modification request may include identification information of the multicast data and the identification information of the first PDU session, and may further include other information, for example, identification information of the terminal.

The multicast data may be data sent to one multicast group or a plurality of terminals. A receiving object of the multicast data may be a group of terminals, and these terminals are authorized to receive the data. The multicast group may be a vehicle platoon that receives a command sent by a same command center or a group that receives a same television program. The identification information of the multicast data may be used to uniquely identify the multicast data, and the identification information of the multicast data may be configured by an application layer of the terminal. The identification information of the multicast data may be a temporary mobile group identity (TMGI) of a multicast group corresponding to the multicast data, an IP address of an application server providing the multicast data, a service identifier (service ID) of the multicast data, packet filter information of the multicast data, a service data flow (SDF) identification rule of the multicast data, or an ID of a multicast PDU session used to transmit the multicast data.

The identification information of the first PDU session is described in S401. Details are not described again.

The identification information of the terminal may be used to identify the terminal. For example, the identification information of the terminal may be an IP address of the terminal, a MAC address of the terminal, an international mobile subscriber identity (IMSI) of the terminal, or the like.

In an example, that the first session management network element receives a first request may include: The terminal sends the first request to the mobility management network element; and the mobility management network element receives the first request, and sends the first request to the first session management network element.

In this example, the first request may be a PDU session modification request or other control plane signaling. For example, the terminal sends a PDU session modification request to the mobility management network element, and the mobility management network element receives the PDU session modification request, and sends the PDU session modification request to the first session management network element.

For example, when a user using the terminal has a multicast data requirement, the user triggers the application layer of the terminal to configure the identification information of the multicast data, to send, to the mobility management network element, the PDU session modification request that carries the identification information of the multicast data.

For example, it is assumed that the multicast data is a specific television program, for example, on CCTV1 or CCTV2, and the terminal is a set top box (STB) 1. The STB 1 may display related information of the television program to a user. The user may manually select a television program, for example, on CCTV1, that the user wants to watch, and send a selection result to the STB 1. The STB 1 sends, to the mobility management network element based on the selection result, a PDU session modification request that carries CCTV1.

For example, after receiving the PDU session modification request, the mobility management network element may query the context of the first PDU session by using the identification information of the first PDU session carried in the PDU session modification request as an index, obtain the identification information of the first session management network element from the context of the first PDU session, and learn, through identification based on the identification information of the first session management network element, that the PDU session modification request is to be sent to the first session management network element.

During specific implementation, for a sending process of S402, refer to an existing process. For example, the terminal sends a NAS message to the mobility management network element, where the NAS message includes an N1 session management container (N1 SM container), and the N1 SM container includes the PDU session modification request. After receiving the NAS message, the mobility management network element obtains the PDU session establishment request from the N1 SM container in the NAS message, and sends the PDU session establishment request to the first session management network element.

In another example, that the first session management network element receives a first request may include: The terminal sends, by using the first session management network element, the first request to the user plane network element (for example, the unicast user plane network element) corresponding to the first PDU session; the unicast user plane network element receives the first request, and sends the first request to the first session management network element; and the first session management network element receives the first request from the unicast user plane network element.

In this example, the first request may be a user plane event notification message.

S403. The first session management network element obtains identification information of a multicast user plane network element based on the identification information that is of the multicast data and that is carried in the first request.

The multicast user plane network element may be an anchor for transmitting multicast data. Alternatively, the multicast user plane network element is a UPF that is directly connected to the DN and that transmits multicast data, a UPF that receives multicast data sent by the application server, a UPF that serves as an N6 interface termination point for multicast data transmission, or an ingress network element that receives multicast data on the core network user plane. The multicast user plane network element may be the same as or different from the user plane network element, for example, the unicast user plane network element, corresponding to the first PDU session. This is not limited.

The identification information of the multicast user plane network element may be used to uniquely identify the multicast user plane network element. For example, the identification information of the multicast user plane network element may be an IP address or a MAC address of the multicast user plane network element, an FQDN of the multicast user plane network element, or another identifier that can identify the multicast user plane network element. This is not limited.

For example, that the first session management network element obtains identification information of a multicast user plane network element based on the identification information that is of the multicast data and that is carried in the PDU session modification request may include:

The first session management network element sends the identification information of the multicast data to a first network element. The first network element receives the identification information of the multicast data, queries a first correspondence by using the identification information of the multicast data as an index, finds the identification information of the multicast user plane network element that corresponds to the identification information of the multicast data, and sends the identification information of the multicast user plane network element to the first session management network element. That is, the first session management network element obtains the identification information of the multicast user plane network element by interacting with the first network element.

The first network element may be an NRF, a UDM, a UDR, or a PCF, or may be another network element that has a function of selecting a multicast user plane network element. This is not limited.

The first correspondence may include a correspondence between the identification information of the multicast data and the multicast user plane network element, and the first correspondence may be prestored in the first network element.

Further, optionally, the first session management network element sends the identification information of the multicast user plane network element to the application server.

In this way, the multicast user plane network element configured to transmit the multicast data may be determined in a PDU session modification process triggered by the terminal, so that multicast data to be sent to a plurality of terminals can be transmitted by using a same multicast user plane network element. This avoids a case in which multicast data is replicated into a plurality of copies and sent to terminals through a plurality of transmission channels, improving resource utilization.

Further, optionally, based on a relationship between the multicast user plane network element and the user plane network element corresponding to the first PDU session, the method shown in FIG. 4A and FIG. 4B further includes any one of the following three processes: In a process 1, the multicast user plane network element is the same as the user plane network element corresponding to the first PDU session. S404 is performed, and the procedure ends. In a process 2, the multicast user plane network element is different from the user plane network element corresponding to the first PDU session, and there is a connection relationship between the first session management network element and the multicast user plane network element. After S403, S405 to S408 are performed, and the procedure ends. In a process 3, the multicast user plane network element is different from the user plane network element corresponding to the first PDU session, and there is no connection relationship between the first session management network element and the multicast user plane network element. After S404, S409 to S412 are performed, and the procedure ends.

It should be noted that, in embodiments of this application, that there is a connection relationship between the first session management network element and the multicast user plane network element may mean: An N4 link is established between the first session management network element and the multicast user plane network element, the first session management network element may send N4 configuration information to the multicast user plane network element through the N4 link, the first session management network element may manage the multicast user plane network element, and an area (that is, an area in which a service is provided) controlled by the first session management network element may cover the corresponding multicast user plane network element, or the corresponding multicast user plane network element falls within a control range of the first session management network element. That there is no connection relationship between the first session management network element and the multicast user plane network element may mean: No N4 connection is established between the first session management network element and the multicast user plane network element, the first session management network element cannot manage the multicast user plane network element, an area controlled by the first session management network element does not cover the multicast user plane network element, or the multicast user plane network element does not fall within a control range of the first session management network element.

S404. The first session management network element sends the identification information of the multicast data to the multicast user plane network element, and correspondingly, the multicast user plane network element receives the identification information of the multicast data.

For example, the first session management network element may send, to the multicast user plane network element through an N4 link between the first session management network element and the multicast user plane network element, N4 configuration information that carries the identification information of the multicast data.

In addition to sending the identification information of the multicast data to the multicast user plane network element, the first session management network element may further send some other existing information to the multicast user plane network element, such as a processing policy corresponding to the multicast data, a packet detection rule (PDR), a forwarding action rule (FAR) associated with the PDR, and a quality of service flow (QoS flow, QF) mapping rule. This is not limited.

In this case, the procedure shown in FIG. 4A and FIG. 4B ends. Subsequently, the application server sends multicast data to the multicast user plane network element based on the identification information of the multicast user plane network element. The multicast user plane network element receives and identifies the multicast data sent by the application server, and sends the multicast data to the terminal by using an access network device.

S405. The first session management network element sends a notification message to the mobility management network element.

The notification message may be an Namf interface communication service operation for N1N2 message transfer (Namf_communication_N1N2 message transfer). The notification message may be used to notify the terminal to establish the second PDU session. Alternatively, the notification message is used to notify the terminal that the originally established first PDU session is not applicable to multicast data transmission and a new PDU session, for example, the second PDU session, needs to be established. The notification message may include the identification information of the first PDU session, and may further include other information such as the identification information of the terminal. The identification information of the terminal may be carried in the PDU session modification request and sent by the terminal to the mobility management network element. The mobility management network element sends the PDU session modification request to the first session management network element.

The second PDU session may be used to transmit the multicast data, and the second PDU session may be alternatively named a multicast PDU session, a multicast session, or the like. This is not limited.

S406. The mobility management network element receives the notification message, and sends a PDU session re-establishment notification to the terminal.

The PDU session re-establishment notification may be used to notify the terminal to establish the second PDU session. The PDU session re-establishment notification may include the identification information of the first PDU session. For example, the PDU session re-establishment notification may be a PDU session modification command.

Further, optionally, the mobility management network element sends a response message to the first session management network element, where the response message is used to indicate that the mobility management network element has received the notification message sent by the first session management network element.

S407. The terminal receives the PDU session re-establishment notification, and triggers the following PDU session re-establishment procedure: The terminal sends a PDU session establishment request and the identification information of the first PDU session to the mobility management network element, and the mobility management network element receives the PDU session establishment request and the identification information of the first PDU session, and sends the PDU session establishment request and the identification information of the first PDU session to the first session management network element.

The PDU session establishment request may be used to request to establish the second PDU session. The PDU session establishment request may include identification information of the second PDU session, and may further include other information such as the identification information of the terminal. This is not limited. For example, the terminal may add the PDU session establishment request and the identification information of the first PDU session to a non-access stratum (NAS) message, and send the NAS message to the mobility management network element. The mobility management network element may add the PDU session establishment request and the identification information of the first PDU session to another message, for example, a first message, and send the message to the first session management network element.

It should be noted that, in this embodiment of this application, the identification information of the first PDU session may alternatively be carried in the PDU session establishment request. This is not limited.

Further, optionally, the terminal releases the first PDU session. For example, the terminal deletes locally stored information related to the first PDU session, for example, the identification information of the first PDU session.

Further, optionally, before the terminal sends the PDU session establishment request to the mobility management network element, the terminal further triggers the following procedure: The terminal sends a PDU session re-establishment response to the mobility management network element, where the PDU session re-establishment response may be PDU session modification command acknowledgment (PDU session modification command ACK), and the PDU session re-establishment response is used to indicate that the terminal has received the PDU session re-establishment notification sent by the mobility management network element.

After receiving the PDU session re-establishment response, the mobility management network element sends an update request to the first session management network element. The update request may be an Nsmf-based PDU session service_session management context update request (Nsmf_PDU session_update SM context request).

After receiving the update request, the first session management network element updates the context of the first PDU session, for example, replaces the identification information of the unicast user plane network element in the context of the first PDU session with an identifier of the multicast user plane network element, and sends an update response to the mobility management network element. The update response may be an Nsmf-based PDU session service_session management context update response (Nsmf_PDU session_update SM context response). An updated context of the first PDU session includes the identification information of the first PDU session and the identification information of the multicast user plane network element, and may further include other information.

S408. The first session management network element receives the PDU session establishment request and the identification information of the first PDU session, and sends the identification information of the multicast data to the multicast user plane network element.

For example, the first session management network element may determine, based on the PDU session establishment request, to establish the second PDU session, and select a multicast user plane network element corresponding to the second PDU session. For example, the first session management network element finds, by using the identification information of the first PDU session as an index, the locally stored updated context of the first PDU session, obtains the identification information of the multicast user plane network element from the updated context of the first PDU session, and sends the identification information of the multicast data to the multicast user plane network element identified by the identification information of the multicast user plane network element.

For example, the first session management network element may send, to the multicast user plane network element through an N4 link between the first session management network element and the multicast user plane network element, N4 configuration information that carries the identification information of the multicast data. In addition to sending the identification information of the multicast data to the multicast user plane network element, the first session management network element may further send some other existing information to the multicast user plane network element, for example, a processing policy corresponding to the multicast data, an FDR, an FAR associated with the FDR, and a QF mapping rule.

Further, optionally, the first session management network element deletes the updated context of the first PDU session, and stores a context of the second PDU session. The context of the second PDU session may include but is not limited to the identification information of the second PDU session, the identification information of the multicast user plane network element, and the like, and may further include other information such as the identification information of the multicast data.

In this case, the procedure shown in FIG. 4A and FIG. 4B ends. Subsequently, the application server sends multicast data to the multicast user plane network element based on the identification information of the multicast user plane network element. The multicast user plane network element receives and identifies the multicast data sent by the application server, and sends the multicast data to the terminal by using an access network device.

S409. The first session management network element sends first information and the identification information of the first PDU session to the mobility management network element.

The first information may be used to determine a second session management network element, the second session management network element is a session management network element that manages the multicast user plane network element, and the second session management network element may be referred to as a multicast session management network element. The first information may include one or more of the identification information of the multicast user plane network element, identification information of the second session management network element, and the identification information of the multicast data.

The identification information of the multicast user plane network element and the identification information of the multicast data are described above. Details are not described again. The identification information of the second session management network element may be used to identify the second session management network element. The identification information of the second session management network element may be an IP address of the second session management network element, a MAC address of the second session management network element, or another identifier that can identify the second session management network element. This is not limited.

For example, the first session management network element sends the identification information of the multicast data to the first network element. The first network element receives the identification information of the multicast data, queries a second correspondence by using the identification information of the multicast data as an index, finds the identification information of the multicast session management network element that corresponds to the identification information of the multicast data, and sends the identification information of the multicast session management network element to the first session management network element. That is, the first session management network element obtains the identification information of the multicast session management network element by interacting with the first network element.

Related descriptions of the first network element are provided in S403. Details are not described again.

The second correspondence may include a correspondence between the identification information of the multicast data and the identification information of the multicast session management network element, and the second correspondence may be prestored in the first network element.

For example, the first session management network element may add the first information and the identification information of the first PDU session to Namf_communication_NTN2 message transfer, and send Namf_communication_NTN2 message transfer to the mobility management network element. Namf_communication_NTN2 message transfer may be used to notify the terminal to establish a second PDU session. Alternatively, the first information and the identification information of the first PDU session may be carried in different information and sent to the mobility management network element. For example, the identification information of the first PDU session is carried in Namf_communication_NTN2 message transfer and sent to the mobility management network element, and the first information is carried in another message and sent to the mobility management network element. This is not limited.

Further, optionally, the first session management network element sends second information to the second session management network element; or the first session management network element sends second information to the mobility management network element. The second information may be used to determine a multicast user plane network element, and the second information may include one or both of the identification information of the multicast user plane network element and the identification information of the multicast data.

S410. The mobility management network element receives the first information and the identification information of the first PDU session, and sends a PDU session re-establishment notification to the terminal.

Related descriptions of the PDU session re-establishment notification are provided in S406. Details are not described again.

Further, optionally, the mobility management network element stores a correspondence between the identification information of the first PDU session and the first information, so that when subsequently receiving the identification information of the first PDU session and the PDU session establishment request that are sent by the terminal, the mobility management network element obtains the first information based on the correspondence between the identification information of the first PDU session and the first information, determines the second session management network element based on the first information, and sends the PDU session establishment request to the second session management network element.

S411. The terminal receives the PDU session re-establishment notification, and triggers a PDU session re-establishment procedure: The terminal sends a PDU session establishment request and the identification information of the first PDU session to the mobility management network element, and the mobility management network element receives the PDU session establishment request and the identification information of the first PDU session, and sends the PDU session establishment request to the second session management network element.

For example, the terminal may add the PDU session establishment request and the identification information of the first PDU session to a NAS message, and send the NAS message to the mobility management network element. The mobility management network element receives the NAS message, learns, based on an indication of the PDU session establishment request in the NAS message, that the terminal requests to establish the second PDU session, triggers the mobility management network element to select the second session management network element, and sends the PDU session establishment request to the second session management network element.

That the mobility management network element selects the second session management network element may include: The mobility management network element obtains the correspondence between the identification information of the first PDU session and the first information by using the identification information of the first PDU session as an index; obtains the first information based on the correspondence between the identification information of the first PDU session and the first information; and determines the second session management network element based on the first information.

For example, that the mobility management network element determines the second session management network element based on the first information may include:

When the first information includes the identification information of the multicast user plane network element, the mobility management network element selects the second session management network element from a session management network element set, where the session management network element set may include one or more session management network elements that manage a multicast user plane network element, and the mobility management network element may send the identification information of the multicast user plane network element to the first network element, to obtain the multicast session management network element set returned by the first network element.

Alternatively, when the first information includes the identification information of the second session management network element, the mobility management network element determines the second session management network element based on an indication of the identification information of the second session management network element.

Alternatively, when the first information includes the identification information of the multicast data, the mobility management network element may send the identification information of the multicast data to the first network element, receive the identification information of the second session management network element sent by the first network element, and determine the second session management network element based on an indication of the identification information of the second session management network element sent by the first network element.

Alternatively, when the first information includes the identification information of the multicast user plane network element and the identification information of the second session management network element, the mobility management network element determines the second session management network element based on an indication of the identification information of the second session management network element.

Alternatively, when the first information includes the identification information of the second session management network element and the identification information of the multicast data, the mobility management network element determines the second session management network element based on an indication of the identification information of the second session management network element.

Alternatively, when the first information includes the identification information of the multicast user plane network element, the identification information of the second session management network element, and the identification information of the multicast data, the mobility management network element determines the second session management network element based on an indication of the identification information of the second session management network element.

Further, optionally, the terminal releases the first PDU session. For example, the terminal deletes locally stored information related to the first PDU session, for example, the identification information of the first PDU session.

Further, optionally, the mobility management network element deletes the stored correspondence between the identification information of the first PDU session and the identification information of the first session management network element.

Further, optionally, when the mobility management network element receives the second information from the first session management network element, in addition to sending the PDU session establishment request to the second session management network element, the mobility management network element further sends the second information to the second session management network element.

S412. The second session management network element receives the PDU session establishment request, and sends the identification information of the multicast data to the multicast user plane network element.

For example, the second session management network element may determine the multicast user plane network element based on the second information, and send the identification information of the multicast data to the multicast user plane network element.

That the second session management network element determines the multicast user plane network element based on the second information may include: When the second information includes the identification information of the multicast user plane network element, the second session management network element determines the multicast user plane network element based on an indication of the identification information of the multicast user plane network element.

Alternatively, when the second information includes the identification information of the multicast data, the second session management network element sends the identification information of the multicast data to the first network element, receives the identification information of the multicast user plane network element sent by the first network element, and determines the multicast user plane network element based on an indication of the identification information of the multicast user plane network element sent by the first network element.

Alternatively, when the second information includes the identification information of the multicast user plane network element and the identification information of the multicast data, the second session management network element determines the multicast user plane network element based on an indication of the identification information of the multicast user plane network element.

For example, the second session management network element may send, to the multicast user plane network element through an N4 link between the second session management network element and the multicast user plane network element, N4 configuration information that carries the identification information of the multicast data. In addition to sending the identification information of the multicast data to the multicast user plane network element, the second session management network element may further send other information to the multicast user plane network element, for example, a processing policy corresponding to the multicast data, where the processing policy may be used to determine a QF for transmitting the multicast data.

In this case, the procedure shown in FIG. 4A and FIG. 4B ends. Subsequently, the application server sends multicast data to the multicast user plane network element based on the identification information of the multicast user plane network element. The multicast user plane network element receives and identifies the multicast data sent by the application server, and sends the multicast data to the terminal by using an access network device.

With reference to the 5G communication system shown in FIG. 2, the following describes the method shown in FIG. 4A and FIG. 4B by using an example in which the access network device is the RAN, the mobility management network element is the AMF, the first session management network element corresponding to the first PDU session is the SMF 1, a user plane network element corresponding to the first PDU session is the UPF 1, the multicast user plane network element is the UPF 2, the UPF 2 has a connection relationship with the SMF 1, the SMF 1 manages the UPF 2, the first network element is the NRF, and the SMF 1 receives a PDU session modification request by using the AMF.

Figure 5B:
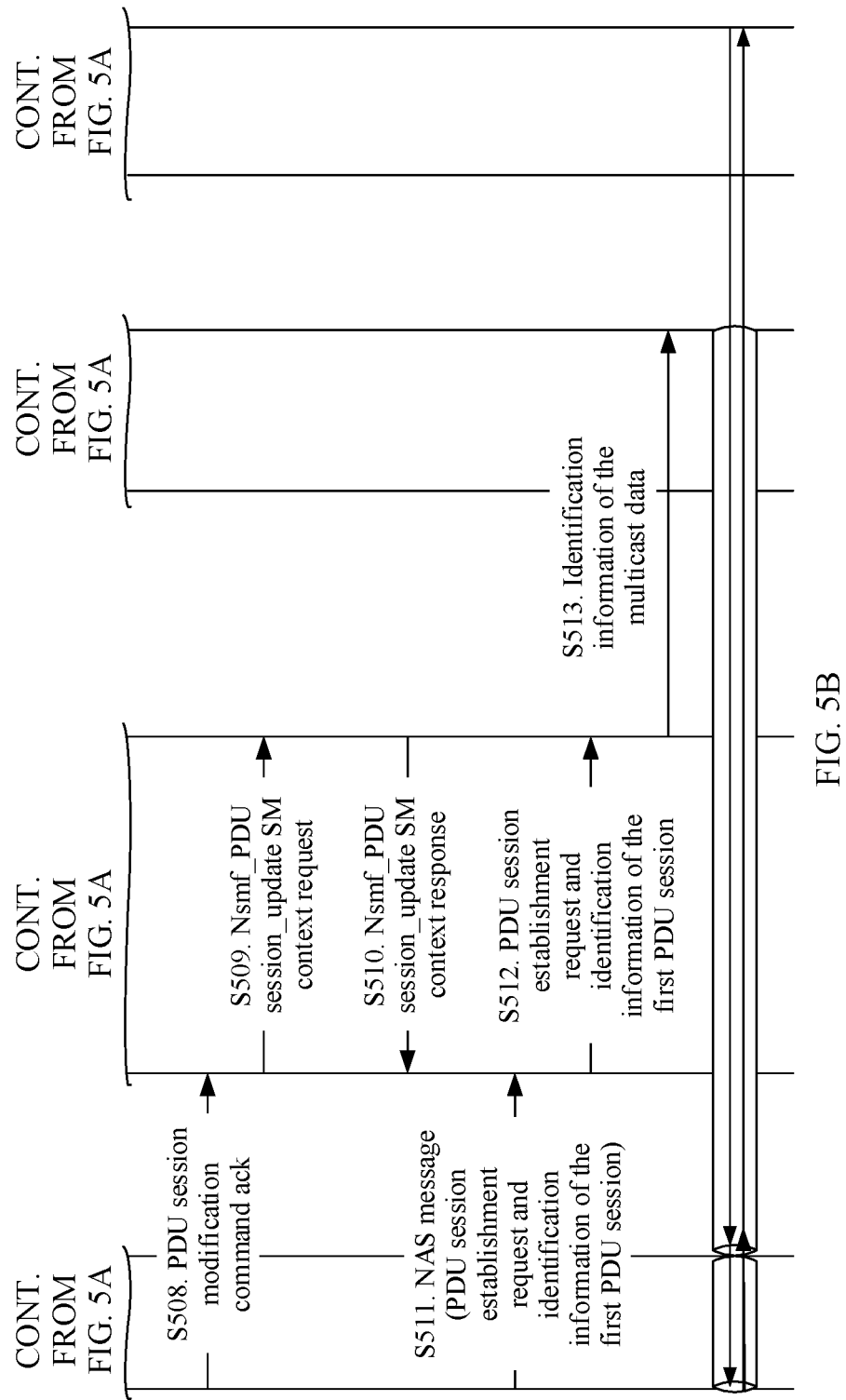

FIG. 5A and FIG. 5B show a communication method according to an embodiment of this application. As shown in FIG. 5A and FIG. 5B, the method includes the following steps.

S501. A terminal establishes a first PDU session.

S502. The terminal sends a PDU session modification request to an AMF, and the AMF receives the PDU session modification request, and sends the PDU session modification request to an SMF 1.

The PDU session modification request may include identification information of multicast data and identification information of the first PDU session. For related descriptions of the identification information of the multicast data, the identification information of the first PDU session, and a specific execution process of S502, refer to S402. Details are not described again.

S503. The SMF 1 receives the PDU session modification request, and sends a first query request to an NRF.

The first query request may include the identification information of the multicast data. The first query request may be used to query a user plane network element that transmits the multicast data. Alternatively, the first query request is used to query a multicast user plane network element.

S504. The NRF receives the first query request, queries a first correspondence to obtain identification information of a UPF 2, and sends a response to the first query request to the SMF 1.

The response to the first query request may include the identification information of the UPF 2, and the response to the first query request may be used to indicate that the multicast user plane network element found by the NRF through query is the UPF 2.

For related descriptions of the first correspondence, refer to the descriptions in FIG. 4A and FIG. 4B. Details are not described again.

For example, Table 1 shows a correspondence between the identification information of the multicast data and identification information of the multicast user plane network element. As listed in Table 1, multicast service_1 corresponds to the identification information of the UPF 2, and multicast service_2 corresponds to the identification information of a UPF 3. When the first query request includes multicast service_1, the NRF may query Table 1 by using multicast service 1 as an index, to obtain the identification information of the UPF 2 corresponding to multicast service_1. When the first query request includes multicast service_2, the NRF may query Table 1 by using multicast service_2 as an index, to obtain the identification information of the UPF 3 corresponding to multicast service_2.

TABLE 1

| Identification information of multicast data | Identification information of a multicast user plane network element |
|---|---|
| multicast service_1 | Identification information of a UPF 2 |
| multicast service_2 | Identification information of a UPF 3 |

S505. If the SMF 1 receives the response to the first query request, and finds that the UPF 2 used to transmit the multicast data is different from a UPF 1, and there is a connection relationship between the UPF 2 and the SMF 1, the SMF 1 determines to change an anchor of the first PDU session to the UPF 2, and stores the identification information of the UPF 2.

Further, optionally, the SMF 1 may send the identification information of the UPF 2 to an application server that provides the multicast data.

S506. The SMF 1 sends Namf_communication_N1N2 message transfer to the AMF.

Namf_communication_N1N2 message transfer may be used to notify the terminal to establish a second PDU session, and Namf_communication_N1N2 message transfer may include the identification information of the first PDU session.

S507. The AMF receives Namf_communication_N1N2 message transfer, and sends a PDU session modification command to the terminal.

The PDU session modification command may be used to notify the terminal to establish the second PDU session, and the PDU session modification command may include the identification information of the first PDU session.

Further, optionally, the AMF sends a response message corresponding to Namf_communication_N1N2 message transfer to the SMF 1. The response message may be used to indicate that the AMF has received Namf_communication_N1N2 message transfer sent by the SMF 1.

S508. The terminal receives the PDU session modification command, and sends a PDU session modification command ack to the AMF.

The PDU session modification command ack may be used to indicate that the terminal has received the PDU session modification command sent by the AMF.

S509. The AMF receives the PDU session modification command ack, and sends an Nsmf_PDU session_update SM context request to the SMF 1.

The Nsmf_PDU session_update SM context request may be used to request the SMF 1 to modify a context of the first PDU session, and the Nsmf_PDU session_update SM context request includes the identification information of the first PDU session.

S510. The SMF 1 receives the Nsmf_PDU session_update SM context request, updates the context of the first PDU session, and sends an Nsmf_PDU session_update SM context response to the AMF.

An updated context of the first PDU session may include the identification information of the first PDU session and the identification information of the UPF 2.

S511. The terminal sends, to the AMF, a NAS message carrying a PDU session establishment request and the identification information of the first PDU session.

The PDU session establishment request may be used to request to establish the second PDU session, and the PDU session establishment request may include identification information of the second PDU session.

Further, optionally, the terminal releases the first PDU session. The terminal deletes locally stored information related to the first PDU session, for example, the identification information of the first PDU session. This is not limited.

S512. The AMF receives the NAS message, and sends the PDU session establishment request and the identification information of the first PDU session to the SMF 1.

S513. The SMF 1 receives the PDU session establishment request and the identification information of the first PDU session, determines that the second PDU session corresponds to the UPF 2, and sends the identification information of multicast data to the UPF 2.

For example, the SMF 1 determines, based on an indication of the PDU session establishment request, that the terminal requests to establish the second PDU session, and determines that the second PDU session corresponds to the UPF 2. For example, the SMF 1 obtains a locally stored updated context of the first PDU session through query by using the identification information of the first PDU session as an index, obtains the identification information of the UPF 2 from the updated context of the first PDU session, determines, based on the identification information of the UPF 2, that the second PDU session corresponds to the UPF 2, and sends the identification information of the multicast data to the UPF 2.

For example, the SMF 1 may send N4 configuration information to the UPF 2, where the N4 configuration information may carry the identification information of the multicast data. Alternatively, the SMF 1 sends an N4 session modification request message or an N4 session establishment request message to the UPF 2, where the N4 session modification request message or the N4 session establishment request message carries the identification information of the multicast data.

Further, optionally, the SMF 1 releases the first PDU session, for example, deletes the updated context of the first PDU session, and creates a context of the second PDU session, where the context of the second PDU session includes the identification information of the second PDU session and the identification information of the UPF 2.

Subsequently, the application server sends the multicast data to the UPF 2 based on the identification information of the UPF 2, and the UPF 2 receives and identifies the multicast data sent by the application server, and sends the multicast data to the terminal by using an access network device.

In the method shown in FIG. 5A and FIG. 5B, S502 to S510 are a PDU session modification process, and S511 to S513 are a PDU session re-establishment process. It should be noted that FIG. 5A and FIG. 5B are described by using an example in which one terminal requests multicast data. It may be understood that when two or more other terminals request the multicast data, refer to the method shown in FIG. 5A and FIG. 5B. Details are not described again. For example, a terminal 1, a terminal 2, and a terminal 3 all request multicast data 1, the multicast data 1 corresponds to the UPF 2, and a correspondence between the multicast data 1 and the UPF 2 is preconfigured in a first network element. The terminal 1, the terminal 2, and the terminal 3 each may switch a PDU session to the UPF 2 corresponding to the multicast data 1 by using a PDU session modification process and a PDU session re-establishment process. The multicast data 1 is sent to the terminal 1, the terminal 2, and the terminal 3 by using the UPF 2. This prevents an application server from making three copies of the multicast data 1 and separately transmitting the three copies to the three terminals by using different UPFs, improving resource utilization.

With reference to the 5G communication system shown in FIG. 2, the following describes the method shown in FIG. 4A and FIG. 4B by using an example in which the access network device is the RAN, the mobility management network element is the AMF, the first session management network element corresponding to the first PDU session is the SMF 1, a user plane network element corresponding to the first PDU session is the UPF 1, the multicast user plane network element is the UPF 2, the UPF 2 has no connection relationship with the SMF 1, the UPF 2 has a connection relationship with an SMF 2, the SMF 2 manages the UPF 2, the first network element is the NRF, and the SMF 1 receives a PDU session modification request by using the AMF.

Figure 6A:
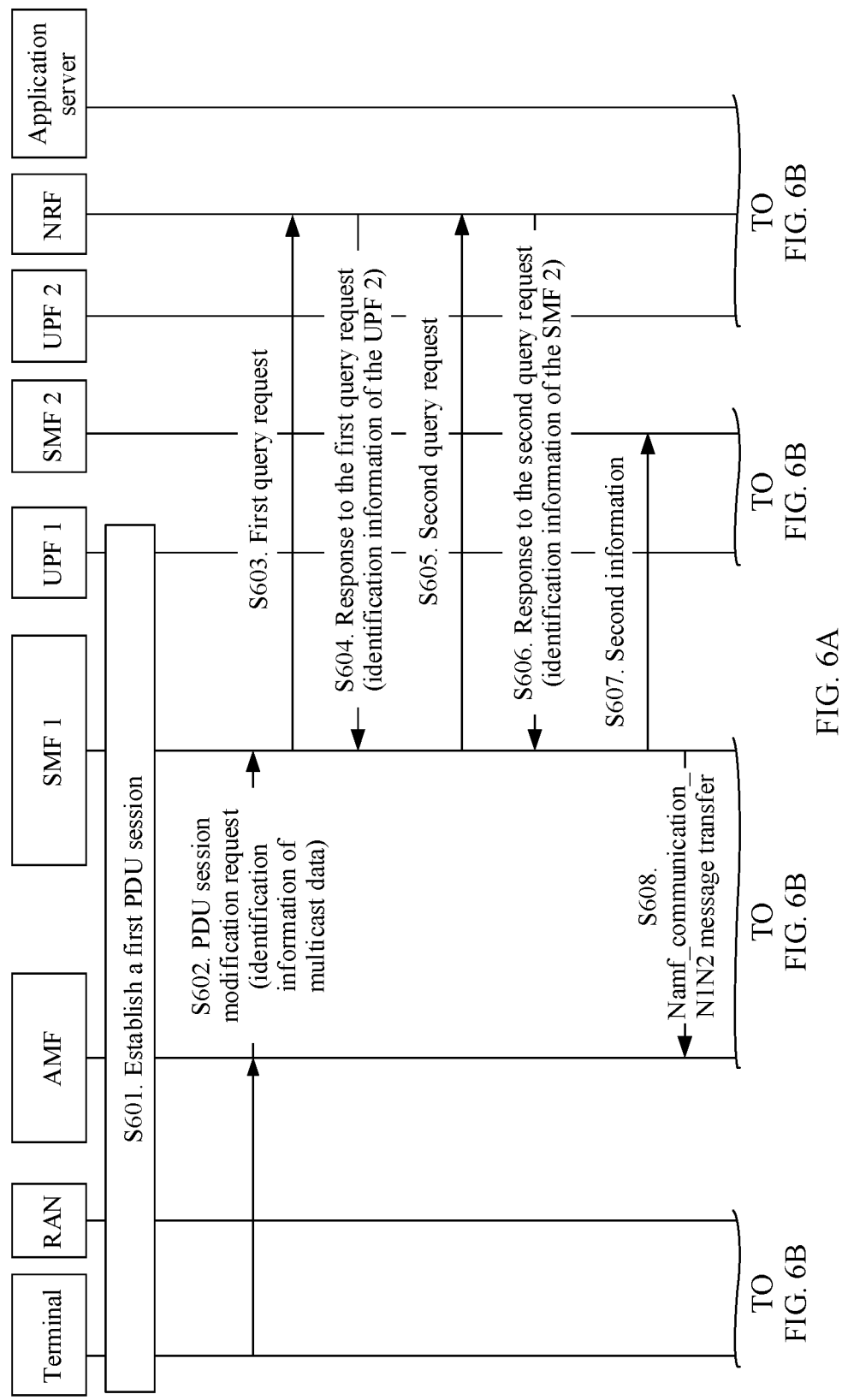
FIG. 6A and FIG. 6B are a flowchart of a communication method according to an embodiment of this application.
Figure 6B:
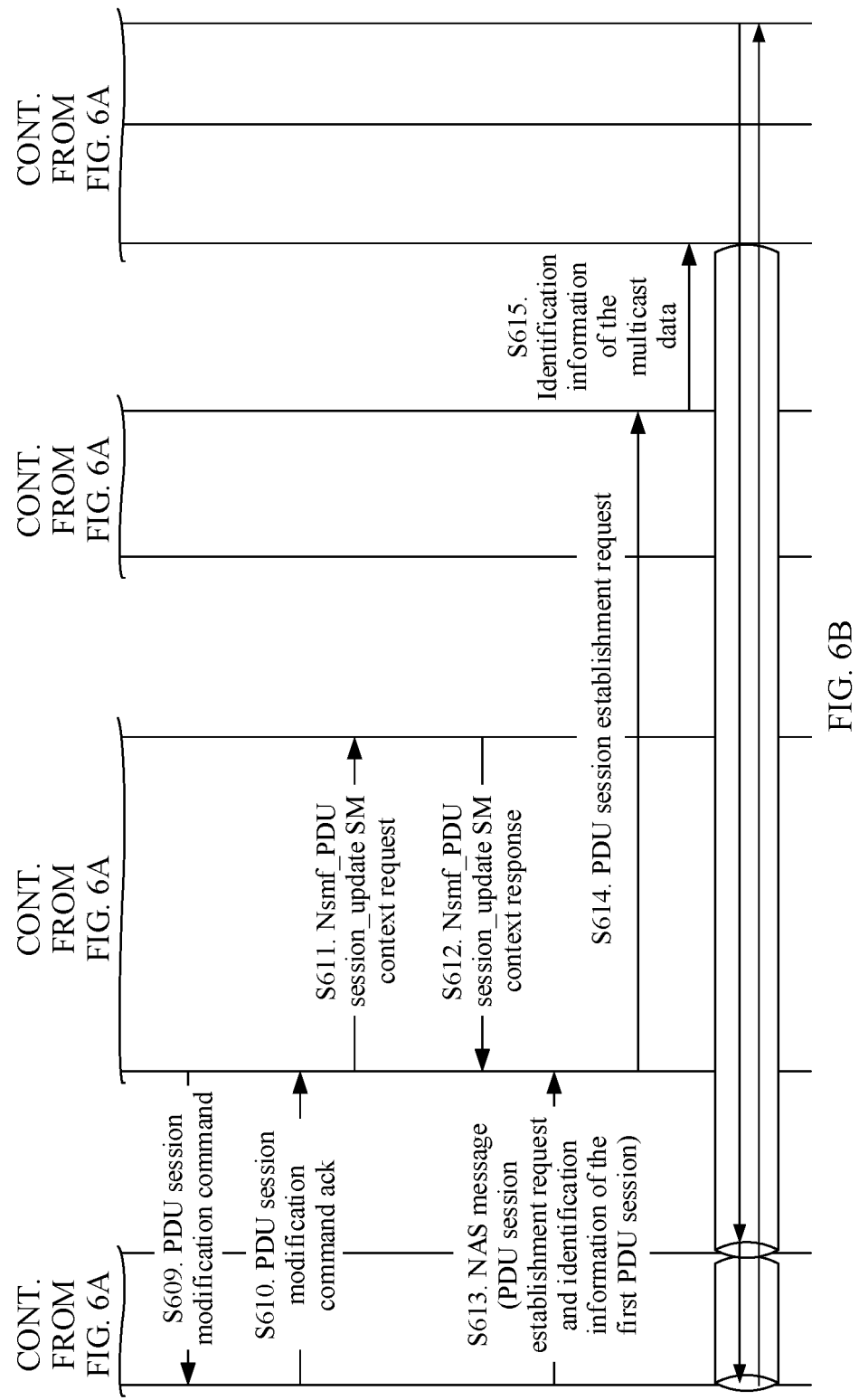

FIG. 6A and FIG. 6B show a communication method according to an embodiment of this application. As shown in FIG. 6A and FIG. 6B, the method includes the following steps.

S601. A terminal establishes a first PDU session.

S602. The terminal sends a PDU session modification request to an AMF, and the AMF receives the PDU session modification request, and sends the PDU session modification request to an SMF 1.

For S602, refer to S502. Details are not described again.

S603. The SMF 1 receives the PDU session modification request, and sends a first query request to an NRF.

For S603, refer to S503. Details are not described again.

S604. The NRF receives the first query request, queries a first correspondence to obtain identification information of a UPF 2, and sends a response to the first query request to the SMF 1.

For S604, refer to S504. Details are not described again.

S605. The SMF 1 receives the response to the first query request; and if finding that an SMF 2 used to transmit multicast data is different from the SMF 1, and there is no connection relationship between the SMF 2 and the SMF 1, the SMF 1 sends a second query request to the NRF.

The second query request may include identification information of the multicast data, and the second query request may be used to query a multicast session management network element that manages the UPF 2.

S606. The NRF receives the second query request, queries a second correspondence to obtain identification information of the SMF 2, and sends a response to the second query request to the SMF 1.

The response to the second query request may include the identification information of the SMF 2, and the response to the second query request may be used to indicate that the multicast session management network element found by the NRF through query is the SMF 2.

The second correspondence may include a correspondence between the identification information of the multicast data and the identification information of the multicast session management network element, and the second correspondence may be preconfigured in the NRF. Specifically, for related descriptions of the second correspondence, refer to the descriptions in FIG. 4A and FIG. 4B. Details are not described again.

For example, Table 2 shows a correspondence between the identification information of the multicast data and identification information of the multicast user plane network element. As listed in Table 2, multicast service_1 corresponds to the identification information of the SMF 2, and multicast service_2 corresponds to identification information of an SMF 3. When the second query request includes multicast service_1, the NRF may query Table 2 by using multicast service_1 as an index, to obtain the identification information of the SMF 2 corresponding to multicast service_1. When the second query request includes multicast service_2, the NRF may query Table 2 by using multicast service_2 as an index, to obtain the identification information of the SMF 3 corresponding to multicast service_2.

TABLE 2

| Identification information of multicast data | Identification information of a multicast user plane network element |
|---|---|
| multicast service_1 | Identification information of an SMF 2 |
| multicast service_2 | Identification information of an SMF 3 |

S607. The SMF 1 sends second information to the SMF 2, and correspondingly, the SMF 2 receives the second information.

The second information may be used to determine the UPF 2. The second information may include one or both of the identification information of the multicast data and the identification information of the UPF 2.

S608. The SMF 1 sends Namf_communication_N1N2 message transfer to the AMF.

Namf_communication_N1N2 message transfer may be used to notify the terminal to establish a second PDU session, and Namf_communication_N1N2 message transfer may include identification information of the first PDU session and first information. It should be noted that the SMF 1 may further add the identification information of the first PDU session and the first information to different messages, and send the different messages to the AMF. For example, the SMF 1 adds the identification information of the first PDU session to Namf_communication_N1N2 message transfer, and sends Namf_communication_N1N2 message transfer to the AMF; and adds the first information to another piece of information, and sends the information to the AMF. This is not limited.

The first information may be used to determine the SMF 2, and the first information may include one or more of the identification information of the SMF 2, the identification information of the multicast data, and the identification information of the UPF 2.

S609. The AMF receives Namf_communication_N1N2 message transfer, and sends a PDU session modification command to the terminal.

The PDU session modification command may be used to notify the terminal to establish the second PDU session, and the PDU session modification command may include the identification information of the first PDU session.

Further, optionally, the AMF stores a correspondence between the identification information of the first PDU session and the first information.

Further, optionally, the AMF sends a response message corresponding to Namf_communication_N1N2 message transfer to the SMF 1. The response message may be used to indicate that the AMF has received Namf_communication_N1N2 message transfer sent by the SMF 1.

S610. The terminal receives the PDU session modification command, and sends a PDU session modification command ack to the AMF.

S610 is the same as S508. Details are not described again.

S611. The AMF receives the PDU session modification command ack, and sends an Nsmf_PDU session_update SM context request to the SMF 1.

The Nsmf_PDU session_update SM context request may be used to request the SMF 1 to modify a context of the first PDU session, and the Nsmf_PDU session_update SM context request includes the identification information of the first PDU session.

S612. The SMF 1 receives the Nsmf_PDU session_update SM context request, deletes the context of the first PDU session, and sends an Nsmf_PDU session_update SM context response to the AMF.

S613. The terminal sends a NAS message to the AMF, where the NAS message carries a PDU session establishment request and the identification information of the first PDU session.

The PDU session establishment request includes identification information of the second PDU session. Specifically, S613 is the same as S511. Details are not described again.

Further, optionally, the terminal releases the first PDU session. The terminal deletes locally stored information related to the first PDU session, for example, the identification information of the first PDU session. This is not limited.

S614. The AMF receives the NAS message, and sends the PDU session establishment request to the SMF 2.

For example, after receiving the NAS message, the AMF may determine, based on an indication of the PDU session establishment request, to establish the second PDU session for the terminal, that is, the original first PDU session is unavailable, and anew PDU session needs to be established for the terminal; obtain the first information based on the correspondence that is between the identification information of the first PDU session and the first information and that is stored in S609; determine, based on the first information, that a multicast session management network element corresponding to the second PDU session is the SMF 2; and send the PDU session establishment request to the SMF 2.

For example, for a process in which the AMF determines the multicast session management network element based on the first information, refer to the process in which the mobility management network element determines the second session management network element based on the first information in the method shown in FIG. 4A and FIG. 4B. Details are not described again.

S615. The SMF 2 receives the PDU session establishment request, determines, based on the second information obtained in S607, that the second PDU session corresponds to the UPF 2, and sends the identification information of the multicast data to the UPF 2.

For example, for a process in which the SMF 2 determines the UPF 2 based on the second information, refer to the process in which the second session management network element determines the multicast user plane network element based on the second information in the method shown in FIG. 4A and FIG. 4B. Details are not described again.

Further, optionally, the SMF 2 stores a context of the second PDU session, where the context of the second PDU session includes the identification information of the second PDU session and the identification information of the UPF 2.

Further, optionally, the SMF 2 may send the identification information of the UPF 2 to an application server that provides the multicast data.

Subsequently, the application server sends the multicast data to the UPF 2 based on the identification information of the UPF 2, and the UPF 2 receives and identifies the multicast data sent by the application server, and sends the multicast data to the terminal by using an access network device.

Alternatively, in the method shown in FIG. 6A and FIG. 6B, S607 may not be performed. Instead, the SMF 1 sends the second information to the AMF, and the AMF sends the second information to the SMF 2. For example, the SMF 1 adds the second information to Namf_communication_N1N2 message transfer in S608, and sends Namf_communication_N1N2 message transfer to the AMF. When performing S614, the AMF sends the second information and the PDU session establishment request to the SMF 2.

In the method shown in FIG. 6A and FIG. 6B, S602 to S612 are a PDU session modification process, and S613 to S615 are a PDU session re-establishment process. It should be noted that FIG. 6A and FIG. 6B are described by using an example in which one terminal requests multicast data. It may be understood that when two or more other terminals request the multicast data, refer to the method shown in FIG. 6A and FIG. 6B. Details are not described again. For example, a terminal 1, a terminal 2, and a terminal 3 all request multicast data 1. The terminal 1, the terminal 2, and the terminal 3 each may switch, by using a PDU session modification process and a PDU session re-establishment process, a PDU session to the SMF 2 and the UPF 2 corresponding to the multicast data 1. The multicast data 1 is sent to the terminal 1, the terminal 2, and the terminal 3 by using the UPF 2 managed by the SMF 2.

In the methods shown in FIG. 4A to FIG. 6B, a multicast user plane network element configured to transmit multicast data is selected by using a PDU session modification process, and an anchor of a PDU session is switched to the multicast user plane network element by using a PDU session re-establishment process, so that multicast data is sent to a plurality of terminals by using the multicast user plane network element, improving resource utilization. Alternatively, a specific multicast user plane network element configured to transmit multicast data and a multicast session management network element that manages the multicast user plane network element may be pre-deployed in a communication system. In this way, when any one of a plurality of terminals initiates a PDU session establishment process to request to establish a multicast PDU session used to transmit multicast data, a pre-deployed multicast session management network element and a pre-deployed multicast user plane network element may be selected for the multicast PDU session. Multicast data is sent to terminals by using the multicast user plane network element, improving resource utilization. Compared with the methods shown in FIG. 4A to FIG. 6B, in the alternative method, an anchor of a PDU session can be located to the multicast user plane network element during PDU session establishment, and there is no need to switch the anchor of the PDU session from a unicast user plane network element to the multicast user plane network element by using a PDU session modification procedure or a PDU session re-establishment procedure. Specifically, for the method, refer to the following descriptions in FIG. 7 and FIG. 8A and FIG. 8B.

Figure 7:
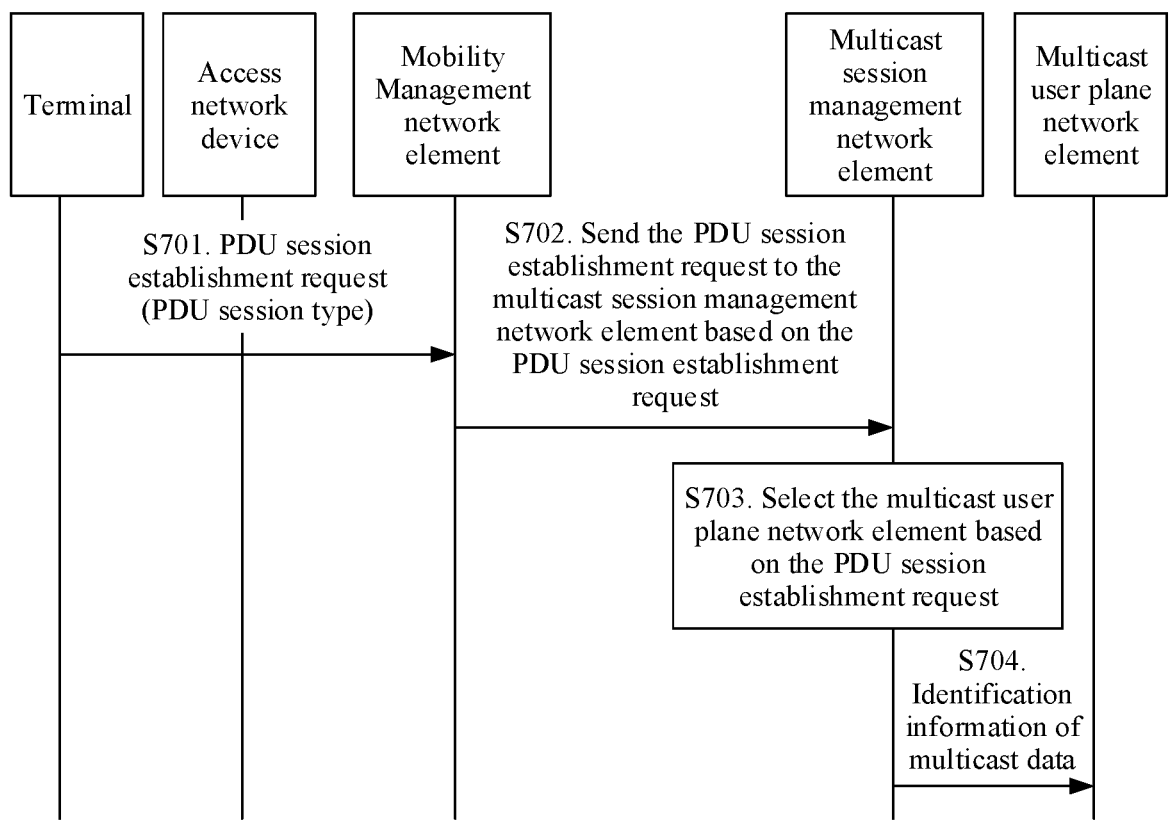
FIG. 7 is a flowchart of another communication method according to an embodiment of this application.

FIG. 7 is a flowchart of another communication method according to an embodiment of this application. As shown in FIG. 7, the method includes the following steps.

S701. A terminal sends a PDU session establishment request to a mobility management network element.

The terminal may be any terminal in the system shown in FIG. 1, for example, may be the terminal 1, the terminal 2, or the terminal 3 in the multicast group shown in FIG. 1. This is not limited.

The PDU session establishment request may be used to request to establish a PDU session. The PDU session establishment request may include a PDU session type, and may further include identification information of the PDU session, identification information of the terminal, and other information. This is not limited. The PDU session type may be used to indicate that the PDU session that the terminal requests to establish is a multicast PDU session used to transmit multicast data. For related descriptions of the identification information of the terminal, refer to the descriptions in FIG. 4A and FIG. 4B. Details are not described again.

For example, the terminal may send a NAS message to the mobility management network element, where the NAS message carries the PDU session establishment request. Alternatively, the terminal sends the PDU session establishment request to an access network device, and the access network device receives the PDU session establishment request, and sends the PDU session establishment request to the mobility management network element.

S702. The mobility management network element receives the PDU session establishment request from the terminal, and sends the PDU session establishment request to a multicast session management network element based on the PDU session establishment request.

The multicast session management network element may be a session management network element that manages a multicast user plane network element and functions of the multicast user plane network element, and the multicast user plane network element is an anchor for transmitting multicast data.

For example, that the mobility management network element sends the PDU session establishment request to a multicast session management network element based on the PDU session establishment request may include: The mobility management network element determines, based on the PDU session type carried in the PDU session establishment request, that the PDU session that the terminal requests to establish is a multicast PDU session. In this case, if there is a selection rule corresponding to the terminal, and the selection rule is used to indicate the mobility management network element to select a multicast session management network element for the multicast PDU session that the terminal requests to establish, the mobility management network element selects the multicast session management network element for the multicast PDU session, and sends the PDU session establishment request to the multicast session management network element.

The selection rule may be pre-stored in a context of the terminal that is locally stored in the mobility management network element. The context of the terminal may include the identification information of the terminal and the selection rule, and may further include other information such as subscription information of the terminal. For example, the selection rule may be preconfigured by a user who uses the terminal based on a requirement. For example, if the user has a multicast data requirement, the user configures the selection rule, and stores the selection rule in a UDM as a part of the subscription information of the terminal.

Subsequently, when the terminal requests to register with a network, the mobility management network element obtains the selection rule from the UDM and stores the selection rule in the context of the terminal. For example, before S701, the terminal sends a registration request to the mobility management network element, where the registration request may be used to request to register with a network, and the registration request may include the identification information of the terminal.

The mobility management network element receives the registration request, obtains, from the UDM, the subscription information of the terminal that includes the selection rule, and correspondingly stores the obtained subscription information of the terminal and the identification information of the terminal in the context of the terminal.

For a process in which the mobility management network element selects the multicast session management network element for the multicast PDU session that the terminal requests to establish, refer to the following descriptions in an exemplary implementation of the method shown in FIG. 7.

S703. The multicast session management network element receives the PDU session establishment request, and selects a multicast user plane network element based on the PDU session establishment request.

For example, that the multicast session management network element selects a multicast user plane network element based on the PDU session establishment request may include:

The multicast session management network element determines, based on the PDU session establishment request, that the terminal requests to establish a multicast PDU session, the PDU session establishment request triggers the multicast session management network element to send a session management policy establishment request (SM policy establishment request) to a PCF, obtains, from the PCF, a policy and charging control (PCC) rule that includes identification information of the multicast data and other information, and selects a multicast user plane network element based on the identification information of the multicast data.

Alternatively, when there is only one user plane network element connected to the multicast session management network element, the multicast session management network element determines, based on the PDU session establishment request, that the terminal requests to establish a multicast PDU session, and triggers the multicast session management network element to use the user plane network element connected to the multicast session management network element as a multicast user plane network element corresponding to the multicast PDU session.

For a process in which the multicast session management network element obtains the multicast user plane network element based on the identification information of the multicast data, refer to the process in S403 in the method shown in FIG. 4A and FIG. 4B. For example, the multicast session management network element obtains identification information of the multicast user plane network element by interacting with a first network element. Details are not described again.

Further, optionally, the multicast session management network element stores a correspondence between the identification information of the multicast data and the multicast user plane network element, so that when another terminal subsequently requests to establish a PDU session and selects the multicast session management network element as a session management network element corresponding to the PDU session that the terminal requests to establish, the multicast session management network element directly selects a multicast user plane network element based on the correspondence that is between the identification information of the multicast data and the multicast user plane network element and that is stored by the multicast session management network element, with no need to obtain the identification information of the multicast user plane network element by interacting with the first network element.

S704. The multicast session management network element sends the identification information of the multicast data to the multicast user plane network element.

For example, the multicast session management network element may send, to the multicast user plane network element through an N4 link between the multicast session management network element and the multicast user plane network element, N4 configuration information that carries the identification information of the multicast data. In addition to sending the identification information of the multicast data to the multicast user plane network element, the multicast session management network element may further send other information to the multicast user plane network element, for example, a processing policy corresponding to the multicast data, where the processing policy may be used to determine a QF for transmitting the multicast data.

Further, optionally, the multicast session management network element sends the identification information of the multicast user plane network element to an application server.

Subsequently, the application server may send multicast data to the multicast user plane network element based on the identification information of the multicast user plane network element. The multicast user plane network element receives and identifies the multicast data sent by the application server, and sends the multicast data to the terminal by using an access network device.

It should be noted that FIG. 7 is described by using an example in which one terminal requests to establish a multicast PDU session. It may be understood that, for a process in which two or more other terminals request to establish a multicast PDU session, refer to the method shown in FIG. 7. Details are not described again. For example, a terminal 1, a terminal 2, and a terminal 3 all request to establish multicast PDU sessions, and one multicast session management network element, namely, a multicast SMF 1, is deployed in a communication system. For example, the multicast SMF 1 manages a multicast UPF 1. After receiving requests sent by the terminal 1, the terminal 2, and the terminal 3 for establishing the multicast PDU sessions, a mobility management network element selects the multicast SMF 1, and the multicast SMF 1 selects the multicast UPF 1 as UPFs corresponding to the multicast PDU sessions that the terminal 1, the terminal 2, and the terminal 3 request to establish. Subsequently, an application server sends multicast data to the terminal 1, the terminal 2, and the terminal 3 by using the UPF 1. This prevents the application server from separately transmitting multicast data to the three terminals by using different UPFs, improving resource utilization.

In an exemplary implementation of the method shown in FIG. 7, that the mobility management network element selects the multicast session management network element for the multicast PDU session that the terminal requests to establish may include:

The mobility management network element sends the PDU session type to an NRF. The NRF receives the PDU session type, determines, based on the PDU session type, that the mobility management network element queries for a multicast session management network element that can manage the multicast PDU session, selects the multicast session management network element, and sends identification information of the multicast session management network element to the mobility management network element. The mobility management network element receives the identification information of the multicast session management network element sent by the NRF, and determines, based on the identification information of the multicast session management network element, the multicast session management network element corresponding to the multicast PDU session.

The NRF may be a network element having a capability of selecting a multicast session management network element.

For example, that the mobility management network element sends the PDU session type to an NRF may include:

The mobility management network element sends, to the NRF, an Nnrf-based network service_network function discovery request (Nnrf_NF discovery request) that carries the PDU session type. That the NRF sends identification information of the multicast session management network element to the mobility management network element may include: The NRF sends, to the mobility management network element, an Nnrf-based network service_network function discovery response (Nnrf_NF discovery response) that carries the identification information of the multicast session management network element.

It should be noted that when there are a plurality of NRFs in the communication system, and some of the NRFs have a capability of selecting a multicast session management network element, but the other NRFs do not have the capability of selecting a multicast session management network element, before the mobility management network element sends the PDU session type to the NRF, the method further includes:

The mobility management network element sends the PDU session type to an NSSF. The NSSF receives the PDU session type, determines, based on the PDU session type, that the mobility management network element queries for a network element having a capability of selecting a multicast session management network element corresponding to the multicast PDU session, selects an NRF having the capability of selecting a multicast session management network element, and sends identification information of the NRF to the mobility management network element. The mobility management network element receives the identification information of the NRF sent by the NSSF.

That the mobility management network element sends the PDU session type to an NRF includes: The mobility management network element sends the PDU session type to the NRF based on the identification information of the NRF.

The identification information of the NRF may be used to identify the NRF. For example, the identification information of the NRF may be an IP address of the NRF, a MAC address of the NRF, or another identifier that can identify the NRF. This is not limited.

For a process in which the NSSF selects the NRF, refer to the conventional technology. Details are not described again.

For example, that the mobility management network element sends the PDU session type to an NSSF may include: The mobility management network element sends, to the NSSF, an Nnssf-based network slice selection service_network slice instance get (Nnssf_NS selection_get), where Nnssf_NS selection_get carries the PDU session type. That the NSSF sends the identification information of the NRF to the mobility management network element may include: The NSSF sends, to the mobility management network element, an Nnssf-based network slice selection service_network slice instance get request response (Nnssf_NS selection_get_response), where Nnssf_NS selection_get_response carries the identification information of the NRF.

With reference to the 5G communication system shown in FIG. 2, the following describes the method in FIG. 7 in detail by using an example in which the access network device is the RAN, the mobility management network element is the AMF, the multicast session management network element is the SMF 1, the multicast user plane network element is the UPF 1, and the SMF 1 learns, from the NSSF, identification information of an NRF having a capability of selecting a multicast session management network element.

Figure 8A:
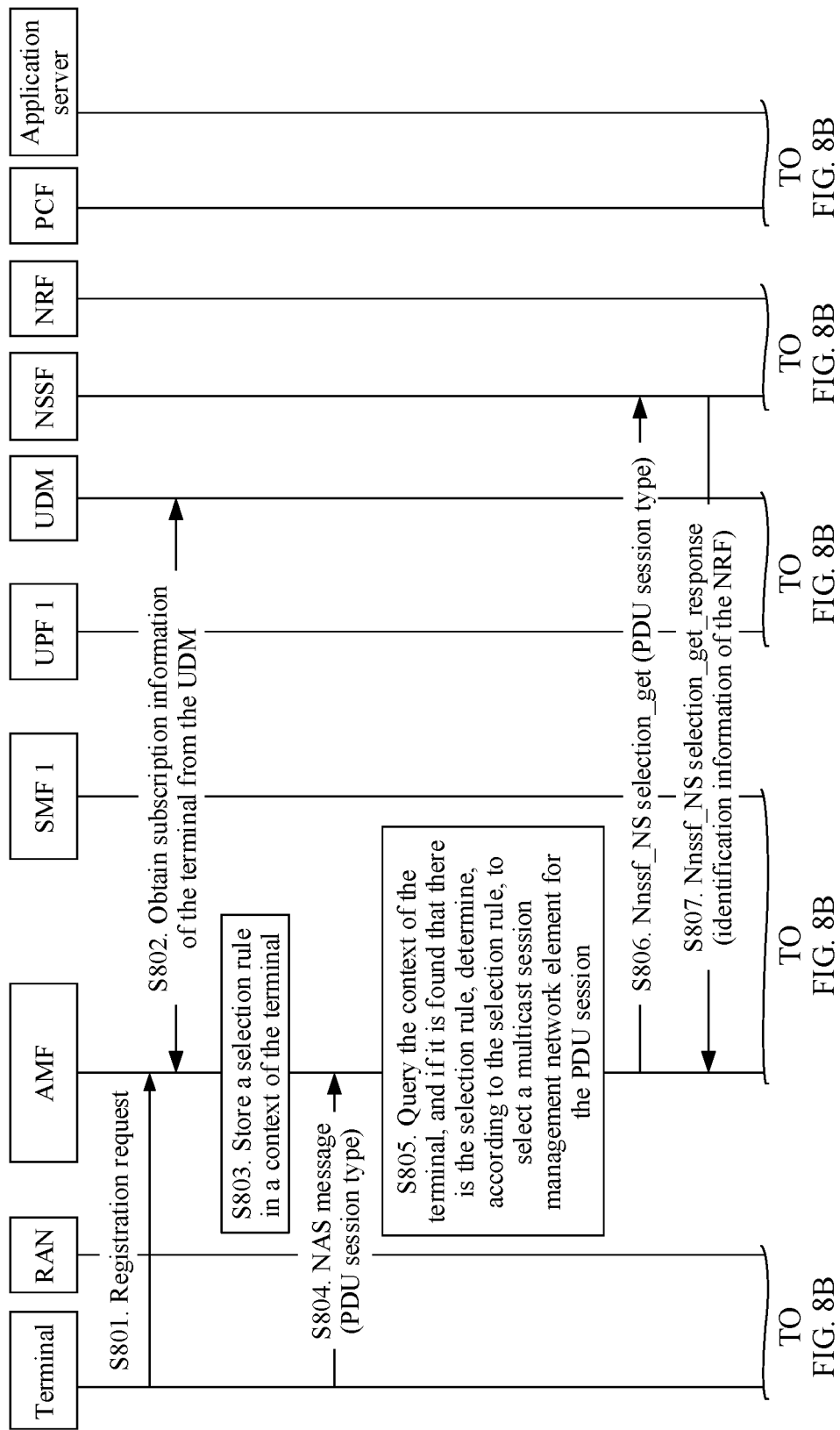

FIG. 8A and FIG. 8B are a flowchart of another communication method according to an embodiment of this application. As shown in FIG. 8A and FIG. 8B, the method includes the following steps.

S801. A terminal sends a registration request to an AMF.

The registration request may be used to register with a network, and the registration request may include identification information of the terminal and other information. For related descriptions of the identification information of the terminal, refer to the descriptions in FIG. 4A and FIG. 4B. For a sending process of S801, refer to a conventional technology. Details are not described again.

S802. The AMF receives the registration request, and obtains subscription information of the terminal from a UDM.

The subscription information of the terminal may include a selection rule, and may further include other information, for example, subscription data of the terminal. For related descriptions of the selection rule, refer to the descriptions in FIG. 7. For details about obtaining, by the AMF, the subscription information of the terminal from the UDM, refer to the conventional technology. Details are not described again.

S803. The AMF stores the selection rule in a context of the terminal.

The context of the terminal may include the identification information of the terminal and the selection rule.

It should be noted that, in addition to storing the selection rule, the AMF may further store, in the context of the terminal, other information in the subscription information of the terminal. This is not limited.

Further, optionally, the AMF sends a registration response to the terminal. The registration response may be used to indicate that the terminal is successfully registered with the network, and the registration response may also be named a registration accept message.

S804. The terminal sends a NAS message to the AMF.

The NAS message may include a PDU session establishment request, and may further include other information such as the identification information of the terminal. This is not limited.

The PDU session establishment request may be used to request to establish a PDU session. The PDU session establishment request may include a PDU session type, and may further include the identification information of the terminal, the identification information of the PDU session, and other information. The PDU session type may be used to indicate that a PDU session that the terminal requests to establish is a multicast PDU session.

S805. The AMF receives the PDU session establishment request, queries the context of the terminal, and if finding that there is the selection rule, determines, according to the selection rule, to select a multicast session management network element for the multicast PDU session.

S806. The AMF sends, to an NSSF, Nnssf_NS selection_get carrying the PDU session type.

S807. The NSSF receives Nnssf_NS selection_get, obtains, based on the PDU session type, an NRF having a function of selecting a multicast session management network element, and sends, to the AMF, Nnssf_NS selection_get_response carrying identification information of the NRF.

For a process in which the NSSF obtains the NRF having the function of selecting a multicast session management network element, refer to the conventional technology. For related descriptions of the identification information of the NRF, refer to the descriptions in FIG. 7. Details are not described again.

S808. The AMF receives Nnssf_NS selection_get_response, and sends, to the NRF based on the identification information of the NRF, Nnrf_NF discovery request carrying the PDU session type.

S809. The NRF receives Nnrf_NF discovery request, selects, based on the PDU session type, an SMF 1 as the multicast session management network element corresponding to the multicast PDU session, and sends, to the AMF, Nnrf_NF discovery response that carries identification information of the SMF 1.

S810. The AMF receives Nnrf_NF discovery response, and sends the PDU session establishment request to the SMF 1.

S811. The SMF1 receives the PDU session establishment request, and sends an SM policy establishment request to a PCF.

S812. The PCF receives the SM policy establishment request, and sends a session management policy establishment response (SM policy establishment response) to the SMF 1.

The SM policy establishment response carries a PCC rule, and the PCC rule may include identification information of multicast data and other information.

S813. The SMF 1 receives the SM policy establishment response, and selects a UPF 1 as the multicast user plane network element corresponding to the PDU session.

For example, the SMF 1 may send the identification information of the multicast data to a first network element, obtain identification information of the UPF 1 from the first network element, and determine, based on the identification information of the UPF 1, that the UPF 1 is used as the multicast user plane network element corresponding to the PDU session. For related descriptions of the first network element and a process in which the SMF 1 interacts with the first network element to obtain the identification information of the UPF 1, refer to the foregoing descriptions. Details are not described again.

S814. The SMF 1 sends N4 configuration information to the UPF 1, and correspondingly, the UPF 1 receives the N4 configuration information.

The N4 configuration information may be an N4 session establishment message or an N4 session modification message. The N4 configuration information may include the identification information of the multicast data, and may further include some existing information, such as a processing policy, a PDR, an FAR associated with the PDR, and a QF mapping rule. This is not limited.

Further, optionally, the UPF 1 stores a correspondence between the identification information of the multicast data and the processing policy, the PDR, the FAR associated with the PDR, and QF mapping rule.

S815. The SMF 1 sends an N2 message to a RAN, and correspondingly, the RAN receives the N2 message.

The N2 message may include core network (CN) tunnel information, and the core network (CN) tunnel information may include an IP address and a tunnel endpoint identifier (TEID) of the UPF 1. The N2 message may be used to establish a transmission path between the UPF 1 and the RAN.

Further, optionally, the RAN stores a correspondence between the core network tunnel information and the identification information of the multicast data.

In this case, transmission paths from an application server to the UPF 1, from the UPF 1 to the RAN, and from the RAN to the terminal are established. Subsequently, the application server may send multicast data to the UPF 1 based on the identification information of the UPF 1, and the UPF 1 receives and identifies the multicast data sent by the application server, and sends the multicast data to the terminal by using the RAN.

It should be noted that FIG. 8A and FIG. 8B are described by using an example in which one terminal requests to establish a multicast PDU session. It may be understood that, for a process in which two or more other terminals request to establish a multicast PDU session, refer to the method shown in FIG. 8A and FIG. 8B. Details are not described again. Based on the method shown in FIG. 8A and FIG. 8B, when the terminal establishes a PDU session, a same SMF and a same UPF may be selected for the PDU session established by the terminal, and multicast data is transmitted to the terminal by using the same UPF, improving resource utilization. For example, a terminal 1, a terminal 2, and a terminal 3 all request to establish multicast PDU sessions. After receiving PDU session establishment requests that are sent by the terminal 1, the terminal 2, and the terminal 3 and that are used to request to establish the multicast PDU sessions, the AMF selects the SMF 1, and the SMF 1 selects the UPF 1 as a UPF corresponding to the multicast PDU sessions that the terminal 1, the terminal 2, and the terminal 3 request to establish. Subsequently, the application server sends multicast data to the terminal 1, the terminal 2, and the terminal 3 by using the UPF 1. This prevents the application server from separately transmitting multicast data to three terminals by using different UPFs, improving resource utilization.

In the methods shown in FIG. 4A to FIG. 6B, a multicast user plane network element configured to transmit multicast data is selected by using a PDU session modification process, and an anchor of a PDU session is switched to the multicast user plane network element by using a PDU session re-establishment process, so that multicast data is sent to a plurality of terminals by using the multicast user plane network element, improving resource utilization. In the methods shown in FIG. 7 and FIG. 8A and FIG. 8B, in a PDU session establishment process, a same multicast session management network element and a same multicast user plane network element are selected for multicast PDU sessions that different terminals request to establish, so that multicast data is sent to a plurality of terminals by using the multicast user plane network element, improving resource utilization. Alternatively, when the terminal modifies the PDU session, the multicast session management network element may locate user plane network elements configured to transmit multicast data to a same multicast user plane network element, and the multicast session management network element notifies a unicast session management network element of identification information of the multicast user plane network element, to trigger the unicast session management network element to establish a transmission path between the multicast user plane network element and a unicast user plane network element. In this way, the application server delivers the multicast data to the multicast user plane network element, and the multicast user plane network element sends the multicast data to the terminal through the transmission path between the multicast user plane network element and the unicast user plane network element, improving resource utilization. Specifically, for the process, refer to the following methods shown in FIG. 9 and FIG. 10A to FIG. 10C.

Figure 9:
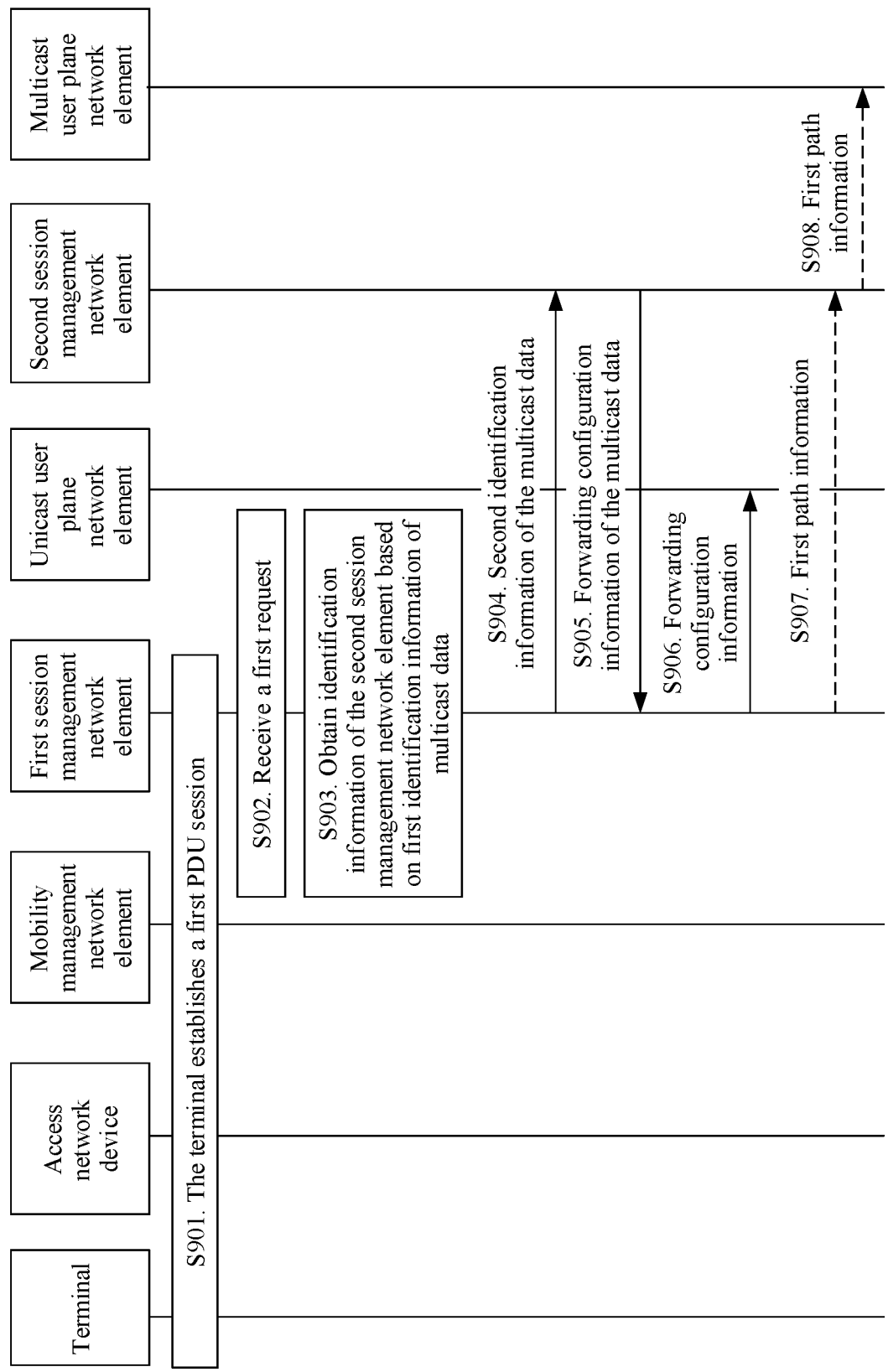
FIG. 9 is a flowchart of still another communication method according to an embodiment of this application.

FIG. 9 is a flowchart of another communication method according to an embodiment of this application. As shown in FIG. 9, the method includes the following steps.

S901. A terminal establishes a first PDU session.

S901 may be the same as S401. Details are not described again.

S902. A first session management network element receives the first request.

S902 may be the same as S402. The first request may be used to request to use the first PDU session to transmit multicast data. The first request may include first identification information of the multicast data and identification information of the first PDU session, and may further include other information, for example, identification information of the terminal.

The first identification information of the multicast data is the same as the identification information of the multicast data described above, and may be an identifier of a multicast group (for example, a TMGI of a multicast group) corresponding to the multicast data, an IP address of an application server that provides the multicast data, a service identifier of the multicast data, packet filter information of the multicast data, an SDF identification rule of the multicast data, or an ID of a multicast PDU session used to transmit the multicast data.

In an example, the first request may be a PDU session modification request. For example, the terminal sends a NAS message to a mobility management network element, where the NAS message includes an N1 SM container, and the N1 SM container includes the PDU session modification request. After receiving the NAS message, the mobility management network element obtains the PDU session establishment request from the N1 SM container in the NAS message, and sends the PDU session establishment request to the first session management network element. Specifically, for a detailed execution process, refer to S402. Details are not described again.

In another example, that the first session management network element receives a first request may include: The terminal sends, by using the first session management network element, the first request to a user plane network element (for example, a unicast user plane network element) corresponding to the first PDU session; the unicast user plane network element receives the first request, and sends the first request to the first session management network element; and the first session management network element receives the first request from the unicast user plane network element.

In this example, the first request may be a user plane event notification message.

S903. The first session management network element receives the PDU session modification request, and obtains identification information of a second session management network element based on the first identification information of the multicast data.

The second session management network element may be a session management network element that manages the multicast user plane network element, and the multicast user plane network element is an anchor for transmitting the multicast data. The second session management network element may be the same as or different from the first session management network element.

Example 1: That the first session management network element obtains identification information of a second session management network element based on the first identification information of the multicast data may include: The first session management network element sends the first identification information of the multicast data to a first network element; the first network element receives the first identification information of the multicast data, obtains the identification information of the second session management network element based on a correspondence between the first identification information of the multicast data and the identification information of the second session management network element, and sends the identification information of the second session management network element to the first session management network element; and the first session management network element receives the identification information of the second session management network element from the first network element.

The first network element may be a UDR, a PCF, a UDM, or an NRF. The correspondence between the first identification information of the multicast data and the identification information of the second session management network element is pre-stored in the first network element. Specifically, the correspondence between the first identification information of the multicast data and the identification information of the second session management network element may be pre-stored in the first network element in any one of the following plurality of manners:

Manner 1: Before S901 is performed, the application server sends the first identification information of the multicast data to the second session management network element, the second session management network element receives the first identification information of the multicast data, and sends the correspondence between the first identification information of the multicast data and the identification information of the second session management network element to the first network element, and the first network element stores the correspondence between the first identification information of the multicast data and the identification information of the second session management network element.

Manner 2: Before S901 is performed, the application server sends the first identification information of the multicast data to a second network element, the second network element obtains the identification information of the second session management network element based on the first identification information of the multicast data, and sends the correspondence between the first identification information of the multicast data and the identification information of the second session management network element to the first network element, and the first network element receives and stores the correspondence between the first identification information of the multicast data and the identification information of the second session management network element.

The second network element may be an NEF, an NRF, or another network element that has a function of selecting a multicast session management network element. For example, the second network element may select one of a plurality of session management network elements that manage a multicast service as the second session management network element, for example, select, based on current load information of the multicast session management network elements, a session management network element with low load as the second session management network element.

Manner 3: Before S901 is performed, the application server sends the first identification information of the multicast data to the first network element, and the first network element obtains the identification information of the second session management network element based on the first identification information of the multicast data, and stores the correspondence between the first identification information of the multicast data and the identification information of the second session management network element.

Manner 4: Before S901 is performed, another terminal initiates a PDU session modification request, and triggers a process described in Example 2. The first identification information of the multicast data and the identification information of the second session management network element may be stored in the first network element in a manner described in Example 2.

Example 2: That the first session management network element obtains identification information of a second session management network element based on the first identification information of the multicast data may include: The first session management network element sends the first identification information of the multicast data to a first network element; the first network element receives the first identification information of the multicast data, determines to use the first session management network element as the second session management network element, and sends identification information of the first session management network element and/or indication information to the first session management network element, where the indication information may be used to indicate that the first session management network element is the second session management network element that manages the multicast user plane network element.

In Example 2, the first network element may determine, by interacting with a second network element with reference to the foregoing manner 2, to use the first session management network element as the second session management network element. For example, the first network element sends the first identification information of the multicast data to the second network element. The second network element obtains the identification information of the first session management network element based on the first identification information of the multicast data, and sends the identification information of the first session management network element to the first network element. The first network element receives the identification information of the first session management network element, and determines to use the first session management network element as the second session management network element that manages the multicast user plane network element.

Further, optionally, the first network element stores the first identification information of the multicast data and the identification information of the second session management network element.

Further, optionally, in Example 1 or Example 2, the first session management network element stores the correspondence between the first identification information of the multicast data and the identification information of the second session management network element.

Example 3: That the first session management network element obtains identification information of a second session management network element based on the first identification information of the multicast data may include: The first session management network element queries, by using the first identification information of the multicast data as an index, a locally stored correspondence between the first identification information of the multicast data and identification information of the second session management network element, and obtains the identification information of the second session management network element based on the locally stored correspondence between the first identification information of the multicast data and the identification information of the second session management network element.

The correspondence between the first identification information of the multicast data and the identification information of the second session management network element may be stored in the first session management network element before S903 and after the first session management network element receives a PDU session modification request that is sent by another terminal and that carries the first identification information of the multicast data, and obtains the identification information of the second session management network element by using Example 1 or Example 2.

It should be noted that, in Example 3, unicast PDU sessions established by different terminals that request same multicast data may correspond to a same session management network element, for example, all correspond to the first session management network element.

S904. The first session management network element sends second identification information of the multicast data to the second session management network element based on the identification information of the second session management network element.

The first session management network element sends the second identification information of the multicast data to the second session management network element. The second identification information of the multicast data may also be used to identify the multicast data. The second identification information of the multicast data is the same as the identification information of the multicast data described above, and may be an identifier of a multicast group (for example, a TMGI of a multicast group) corresponding to the multicast data, an IP address of an application server that provides the multicast data, a service identifier of the multicast data, packet filter information of the multicast data, an SDF identification rule of the multicast data, or an ID of a multicast PDU session used to transmit the multicast data.

The first identification information of the multicast data may be the same as or different from the second identification information of the multicast data. This is not limited. For example, a unicast PDU session established by the UE corresponds to an SMF 1, and the multicast session management network element is an SMF 2. The first identification information of the multicast data carried in the PDU session modification request received by the SMF 1 may be packet filter information of the multicast data, and information sent by the SMF 1 to the SMF 2 may be an ID of a multicast PDU session rather than the packet filter information of the multicast data.

S905. The second session management network element receives the second identification information of the multicast data, and sends forwarding configuration information of the multicast data to the first session management network element based on the second identification information of the multicast data. Correspondingly, the first session management network element receives the forwarding configuration information of the multicast data.

The forwarding configuration information of the multicast data specifies a manner of processing the multicast data. The forwarding configuration information of the multicast data may include one or more of the following: a processing policy, a PDR, an FAR, a QoS enforcement rule (QER), QoS context information of the multicast data, identification information of the multicast group, identification information of the multicast user plane network element, a forwarding destination IP address, and the like. The processing policy may include related information indicating processing received data through an N6 interface or in an N9 interface. The PDR may be used to identify data, and the FAR may be used to indicate a policy of, for example, caching or discarding the data. The QER may be used to define a specific QoS processing measure for a data packet. The QoS context information of the multicast data may be used to provide a specific QoS parameter of the multicast data. The identification information of the multicast group may be used to identify a multicast group for which the forwarding configuration information is intended. The identification information of the multicast user plane network element may be used to establish a downlink transmission path of the multicast user plane network element. The identification information of the multicast user plane network element may include a general packet radio service tunneling protocol (GPRS tunneling protocol, GTP) identifier/tunnel endpoint identifier (TEID). The forwarding destination IP address may be used to identify downlink data and the like. This is not limited.

The QoS context information of the multicast data may include one or more of the following: identification information of a multicast QoS flow, identification information of a multicast context, a QoS parameter corresponding to the multicast QoS flow (for example, one or more of the identification information, a delay budget, or an error rate of the multicast QoS flow), and tunnel information corresponding to the multicast data. The multicast QoS flow may be a quality of service flow (QF) that is included in the multicast PDU session and that is used to transmit the multicast data, and the identification information of the multicast context may be the identification information of the multicast group. The tunnel information corresponding to the multicast data may be used to identify a tunnel for transmitting the multicast data.

Further, optionally, if the identification information of the multicast user plane network element is not included in the forwarding configuration information of the multicast data, in S905, the second session management network element may obtain the identification information of the multicast user plane network element based on the second identification information of the multicast data, and send the identification information of the multicast user plane network element to the first session management network element.

The identification information of the multicast user plane network element may be used to identify the multicast user plane network element. For example, the identification information of the multicast user plane network element may be an IP address of the multicast user plane network element, a MAC address of the multicast user plane network element, an FQDN of the multicast user plane network element, or another identifier that can identify the multicast user plane network element. This is not limited. A process in which the second session management network element obtains the identification information of the multicast user plane network element based on the second identification information of the multicast data is the same as a process in which the first session management network element obtains the identification information of the multicast user plane network element based on the identification information of the multicast data in the method shown in FIG. 4A and FIG. 4B. Details are not described again.

Further, optionally, the second session management network element sends the identification information of the multicast user plane network element to the application server. Alternatively, the second session management network element sends the identification information of the multicast user plane network element to the first network element, and the first network element sends the identification information of the multicast user plane network element to the application server. Correspondingly, the application server receives the identification information of the multicast user plane network element.

The multicast user plane network element may be the same as or different from the user plane network element corresponding to the first PDU session. When the multicast user plane network element is the same as the user plane network element corresponding to the first PDU session, the first session management network element sends the forwarding configuration information of the multicast data to the multicast user plane network element, for example, adds the forwarding configuration information of the multicast data to N4 configuration information, and sends the N4 configuration information to the multicast user plane network element. The procedure ends. For related descriptions of the N4 configuration information, refer to the foregoing descriptions. Details are not described again. When the multicast user plane network element is different from the user plane network element corresponding to the first PDU session, the method shown in FIG. 9 may further include the following step.

S906. The first session management network element sends the forwarding configuration information of the multicast data to a unicast user plane network element corresponding to the first PDU session. Correspondingly, the unicast user plane network element receives the forwarding configuration information of the multicast data.

Further, optionally, the unicast user plane network element stores a correspondence between the forwarding configuration information of the multicast data and the second identification information of the multicast data. Subsequently, the unicast user plane network element may receive the multicast data from the multicast user plane network element, obtain the forwarding configuration information of the multicast data based on the correspondence between the forwarding configuration information of the multicast data and the identification information of the multicast data, process the multicast data based on the forwarding configuration information of the multicast data, and send processed multicast data to an access network device. The access network device sends the processed multicast data to the terminal.

For example, that the unicast user plane network element processes the multicast data based on the forwarding configuration information of the multicast data may include: After receiving the multicast data, the unicast user plane network element generates a new data packet, where the new data packet includes the identification information (for example, the identification information of the multicast QoS flow) of the multicast data and the multicast data; and the unicast user plane network element sends the new data packet to the access network device. Alternatively, after receiving the multicast data, the unicast user plane network element sends the multicast data to the access network device based on the tunnel information corresponding to the multicast data and by using a tunnel indicated by the tunnel information corresponding to the multicast data.

Further, optionally, the first session management network element determines, based on the following method, whether a transmission path for transmitting multicast data is established between the multicast user plane network element and the unicast user plane network element: The first session management network element queries, by using the second identification information of the multicast data as an index, whether a correspondence between the second identification information of the multicast data and a first transmission path is locally stored, where the first transmission path is a transmission path between the multicast user plane network element and the unicast user plane network element. If the correspondence is not locally stored, it indicates that the transmission path for transmitting the multicast data is not established between the multicast user plane network element and the unicast user plane network element; otherwise, the transmission path for transmitting the multicast data is established between the multicast user plane network element and the unicast user plane network element. The correspondence between the second identification information of the multicast data and the first transmission path may be stored in the first session management network element when the first session management network element establishes the first transmission path for the first time.

If the transmission path for transmitting the multicast data is not established between the multicast user plane network element and the unicast user plane network element, the method shown in FIG. 9 further includes S907 and S908. If the transmission path for transmitting the multicast data is established between the multicast user plane network element and the unicast user plane network element, S907 and S908 are not performed, and the procedure ends.

S907. The first session management network element sends first path information to the second session management network element.

The first path information may be used to establish the transmission path between the multicast user plane network element and the unicast user plane network element. The first path information may include an IP address of the unicast user plane network element and/or a TEID of the unicast user plane network element. The IP address of the unicast user plane network element may be used to identify the unicast user plane network element, and the TEID of the unicast user plane network element may be used to identify an endpoint of a tunnel between the unicast user plane network element and the multicast user plane network element.

For example, the first session management network element may send a UPF forwarding path establishment request to the second session management network element, where the UPF forwarding path establishment request may carry the first path information.

S908. The second session management network element receives the first path information, and sends the first path information to the multicast user plane network element. Correspondingly, the multicast user plane network element receives the first path information.

Further, optionally, the second session management network element further sends the second identification information of the multicast data together with the first path information to the multicast user plane network element. Correspondingly, the multicast user plane network element further receives the second identification information of the multicast data, and stores a correspondence between the first path information and the second identification information of the multicast data.

Further, optionally, the second session management network element sends a UPF forwarding path establishment response to the first session management network element, where the UPF forwarding path establishment response may be used to indicate that the transmission path between the multicast user plane network element and the unicast user plane network element is successfully established. Further, optionally, the first session management network element may store a correspondence between the first identification information of the multicast data/the second identification information of the multicast data and the first transmission path, where the first transmission path is a transmission path between the multicast user plane network element and the unicast user plane network element.

Subsequently, optionally, after the multicast user plane network element receives the multicast data sent by the application server, the multicast user plane network element may process the multicast data, encapsulate the first path information as a destination address in a packet header of the data packet, encapsulate processed multicast data in a load part of the data packet, and send the data packet. Correspondingly, the unicast user plane network element receives the data packet whose destination address is the unicast user plane network element, and forwards, to the terminal in a processing manner specified in the forwarding configuration information, the multicast data carried in the data packet.

That the multicast user plane network element processes the multicast data may include: The multicast user plane network element identifies the multicast data, and generates a new data packet, where the new data packet includes the identification information of the multicast data (for example, the identification information of the multicast QoS flow) and the multicast data. Alternatively, after receiving the multicast data, the multicast user plane network element sends the multicast data to the unicast user plane network element based on a locally stored forwarding relationship. The locally stored forwarding relationship may be generated based on the first path information.

Based on the method shown in FIG. 9, the multicast user plane network element configured to transmit the multicast data may be obtained in a PDU session modification process initiated by the terminal, the identification information of the multicast user plane network element is notified to the application server, and the transmission path between the multicast user plane network element and the unicast user plane network element is established. Alternatively, the access network device sends a join message to the multicast user plane network element, and establishes, on a user plane, an IP multicast transmission path from the access device to the multicast user plane network element and from the multicast user plane network element to the application server. In this way, the application server sends multicast data to a same multicast user plane network element, and the multicast user plane network element sends the multicast data to the terminal through the transmission path between the multicast user plane network element and the unicast user plane network element or the access network device. The application server does not need to copy the multicast data into a plurality of copies and deliver the plurality of copies to a plurality of user plane network elements so that the plurality of user plane network elements send the plurality of copies to the terminal, improving resource utilization. In addition, as shown in FIG. 9, after the multicast user plane network element configured to transmit the multicast data is obtained in the PDU session modification process, the terminal does not need to be notified to re-establish a PDU session, avoiding impact of user plane network element reselection on existing unicast PDU session transmission.

With reference to the 5G communication system shown in FIG. 2, the following describes the method in FIG. 9 by using an example in which the terminal 1 and the terminal 2 request multicast data, the terminal 1 has established a first PDU session, the first PDU session corresponds to the SMF 1 and the UPF 1, the access network device is the RAN, the mobility management network element is the AMF, the first session management network element is the SMF 1, the unicast user plane network element is the UPF 1, the second session management network element is the SMF 2, the multicast user plane network element is the UPF 2, the UPF 1 is different from the UPF 2, the first network element is the PCF, the second network element is the NEF, a transmission path between the UPF 1 and the UPF 2 is established, first identification information that is of the multicast data and that is carried in a PDU session establishment request is the same as second identification information that is of the multicast data and that is sent by the SMF 1 to the SMF 2, both the first identification information and the second identification information are identification information of the multicast data, no transmission path is established between the UPF 1 and the UPF 2, and the SMF1 receives the PDU session modification request by using the AMF.

FIG. 10A to FIG. 10C are a flowchart of another communication method according to an embodiment of this application. As shown in FIG. 10A to FIG. 10C, the method includes the following steps.

S1001. An application server sends identification information of multicast data to an NEF.

The application server may be a server that provides the multicast data. The identification information of the multicast data may be described in the method shown in FIG. 4A and FIG. 4B. Details are not described again.

S1002. The NEF receives the identification information of the multicast data, and obtains identification information of an SMF 2 based on the identification information of the multicast data.

S1003. The NEF sends the identification information of the SMF 2 and the identification information of the multicast data to a PCF.

S1004. The PCF receives the identification information of the SMF 2 and the identification information of the multicast data, and stores a correspondence between the identification information of the SMF 2 and the identification information of the multicast data.

S1005. A terminal 1 sends a PDU session modification request to an AMF, and the AMF receives the PDU session modification request, and sends the PDU session modification request to an SMF 1.

S1006. The SMF 1 receives the PDU session establishment request, and sends an SM policy modification request to the PCF, where the SM policy modification request carries the identification information of the multicast data.

S1007. The PCF receives the SM policy modification request, and sends an SM policy modification response to the SMF 1 based on the correspondence between the identification information of the SMF 2 and the identification information of the multicast data, where the SM policy modification response carries the identification information of the SMF 2.

S1008. The SMF 1 receives the SM policy modification response, and sends a session management context (SM context) service information obtaining request to the SMF 2 based on the identification information of the SMF 2.

The SM context service information obtaining request may be used to request forwarding configuration information of the multicast data. The SM context service information obtaining request may include the identification information of the multicast data.

S1009. The SMF 2 receives the SM context service information obtaining request, configures the forwarding configuration information of multicast data, and obtains identification information of a UPF 2.

The SMF 2 may send the identification information of the multicast data to the PCF, and receive the identification information of the UPF 2 sent by the PCF. Specifically, for a process in which the SMF 2 interacts with the PCF to obtain the identification information of the UPF 2, refer to the foregoing descriptions. Details are not described again.

Further, optionally, the SMF 2 sends the identification information of the UPF 2 to the application server.

S1010. The SMF 2 sends the identification information of the multicast data to the UPF 2.

For example, the SMF 2 may send N4 configuration information to the UPF 2, where the N4 configuration information may carry the identification information of the multicast data. The N4 configuration information may be an N4 session modification message or an N4 session establishment message.

Further, optionally, the UPF 2 receives the identification information of the multicast data, and returns a response message 1 to the SMF 2. The response message 1 may be used to indicate that the UPF 2 has received the N4 configuration information sent by the SMF 2.

S1011. The SMF 2 sends the forwarding configuration information of the multicast data and the identification information of the UPF 2 to the SMF 1.

S1012. The SMF 1 receives the forwarding configuration information of the multicast data and the identification information of the UPF 2, and sends the forwarding configuration information of the multicast data to a UPF 1.

For example, the SMF 1 may send N4 configuration information to the UPF 1, where the N4 configuration information may carry the forwarding configuration information of the multicast data. The N4 configuration information may be an N4 session modification message or an N4 session establishment message.

Further, optionally, the UPF 1 receives the forwarding configuration information of the multicast data, and returns a response message 2 to the SMF 1. The response message 2 may be used to indicate that the UPF 1 has received the N4 configuration information sent by the SMF 1.

S1013. The SMF 1 sends first path information to the UPF 2 based on the identification information of the UPF 2.

The first path information may be used to establish a transmission path between the UPF 1 and the UPF 2, and the first path information may include an IP address of the UPF 1 and/or a TEID of the UPF 1, and the like.

Further, optionally, the UPF 2 receives the first path information, and stores a correspondence between the first path information and the identification information of the multicast data.

Further, optionally, the UPF 2 receives the first path information, and sends a response message 3 to the SMF 1. The response message 1 may be used to indicate that the UPF 2 has received the first path information sent by the SMF 1.

Alternatively, S1013 may be: The SMF 1 sends first path information to the SMF 2, the SMF 2 receives the first path information, and the SMF 2 sends the first path information to the UPF 2 based on the identification information of the UPF 2. It should be noted that, in this manner, the SMF 2 does not need to send the identification information of the UPF 2 to the SMF 1 in S1011.

In this case, a transmission path between the application server and the UPF 2, between the UPF 2 and the UPF 1, between the UPF 1 and a RAN, and between the RAN and the terminal 1 is established. The transmission path may be used to transmit the multicast data to the terminal 1.

Subsequently, if another terminal such as a terminal 2 or a terminal 3 requests multicast data, and a PDU session established by the terminal corresponds to the UPF 1, S1013 of establishing a transmission path between the UPF 2 and the UPF 1 does not need to be performed. For example, the terminal 2 establishes a PDU session 2, and the PDU session 2 corresponds to the UPF 1 and an SMF 3. After receiving, by using the AMF, a PDU session modification request that is sent by the terminal 2 and that includes the identification information of the multicast data, the SMF 3 sends the identification information of the multicast data to the SMF 2, obtains the forwarding configuration information of the multicast data from the SMF 2, and sends the obtained forwarding configuration information to the UPF 1, without initiating a process of establishing a transmission path for multicast data transmission between the UPF 1 and the UPF 2.

Based on the method shown in FIG. TOA to FIG. 10C, the UPF 2 used to transmit the multicast data may be obtained in a PDU session modification process initiated by the terminal, the identification information of the UPF 2 is notified to the application server, and the transmission path between the UPF 2 and the UPF 1 is established, so that the application server sends the multicast data to the UPF 2, and the UPF 2 sends the multicast data to the terminal through the transmission path between the UPF 2 and the UPF 1. The application server does not need to copy the multicast data into a plurality of copies and deliver the plurality of copies to a plurality of user plane network elements so that the plurality of user plane network elements send the plurality of copies to the terminal, improving resource utilization.

FIG. 9 to FIG. 10C are described by using an example of establishing a transmission path between a multicast user plane network element and a unicast user plane network element. Alternatively, a transmission path between the multicast user plane network element and an access network device may be further established. In this way, an application server delivers multicast data to the multicast user plane network element, and the multicast user plane network element sends the multicast data to a terminal through the transmission path between the multicast user plane network element and the access network device, improving resource utilization. Specifically, for this process, refer to the following FIG. 11 and FIG. 12A to FIG. 12C.

Figure 11:
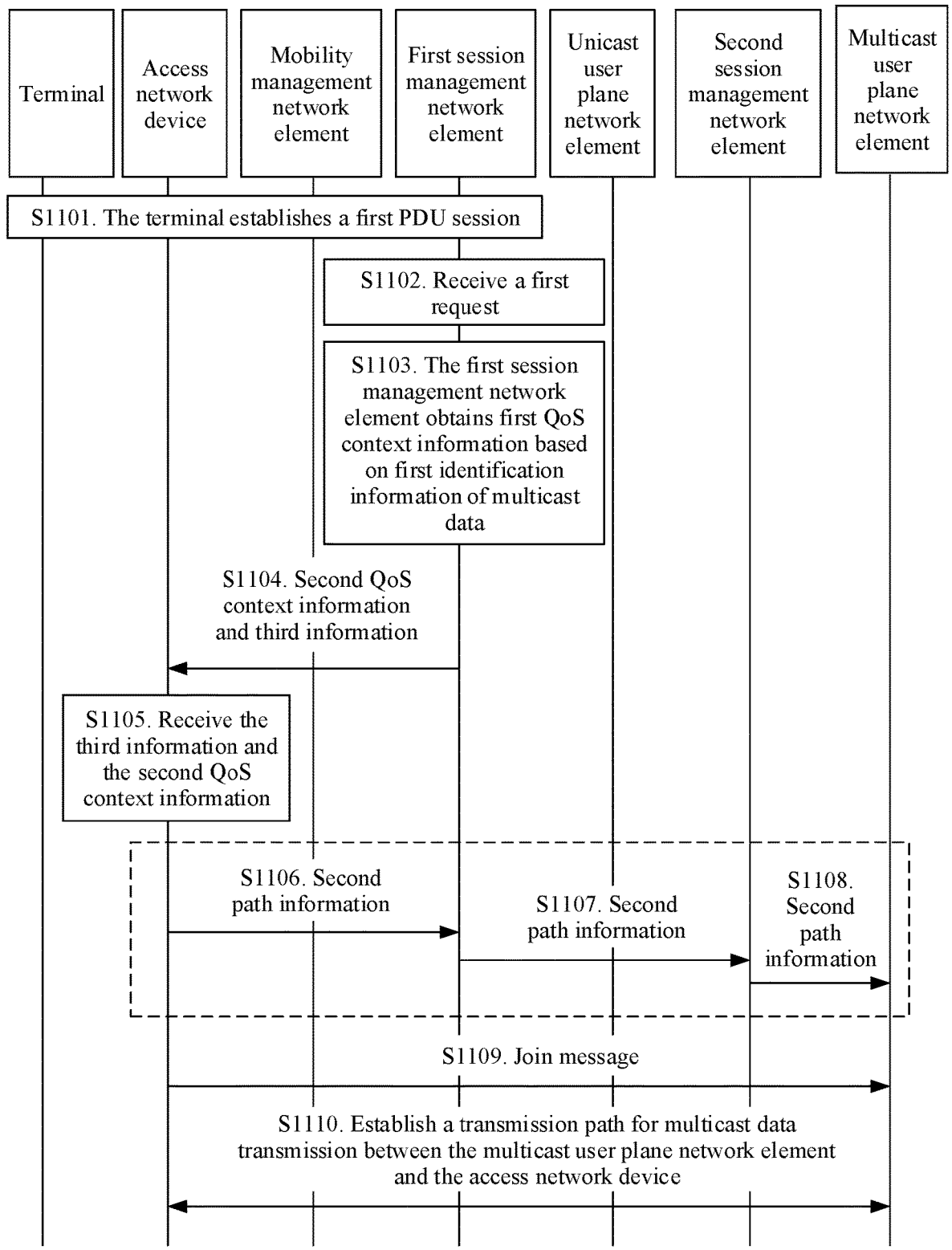
FIG. 11 is a flowchart of still another communication method according to an embodiment of this application.

FIG. 11 is a flowchart of another communication method according to an embodiment of this application. As shown in FIG. 11, the method includes the following steps.

S1101. A terminal establishes a first PDU session.

S1101 may be the same as S901. Details are not described again.

S1102. A first session management network element receives a first request.

The first request may be used to request to use the first PDU session to transmit multicast data.

In an example, that the first session management network element receives a first request may include: The terminal sends the first request to a mobility management network element; and the mobility management network element receives the first request, and sends the first request to the first session management network element.

In this example, the first request may be a PDU session modification request or other control plane signaling.

In another example, that the first session management network element receives a first request may include: The terminal sends, by using the first session management network element, the first request to a user plane network element (for example, a unicast user plane network element) corresponding to the first PDU session; the unicast user plane network element receives the first request, and sends the first request to the first session management network element; and the first session management network element receives the first request from the unicast user plane network element.

In this example, the first request may be a user plane event notification message.

S1103. The first session management network element obtains first QoS context information based on first identification information of the multicast data.

The first QoS context information may be QoS context information of the multicast data. For related descriptions of the QoS context information of the multicast data, refer to the descriptions in FIG. 9. Details are not described again.

In an example, the first session management network element may obtain identification information of a second session management network element based on the first identification information of the multicast data, and send second identification information of the multicast data to the second session management network element based on the identification information of the second session management network element. The second session management network element receives the second identification information of the multicast data, and sends the first QoS context information to the first session management network element based on the second identification information of the multicast data. The first session management network element receives the first QoS context information from the second session management network element.

For a process in which the first session management network element obtains the second session management network element based on the first identification information of the multicast data, refer to the descriptions in S903. Details are not described again.

That the second session management network element sends the first QoS context information to the first session management network element based on the second identification information of the multicast data may include: The second session management network element queries, by using the second identification information of the multicast data as an index, whether the first QoS context information corresponding to the multicast data exists; and if the first QoS context information corresponding to the multicast data exists, obtains the first QoS context information corresponding to the multicast data, and sends the first QoS context information to the first session management network element. If the first QoS context information corresponding to the multicast data does not exist, the second session management network element sends the second identification information of the multicast data to a PCF, and receives a PCC rule that is for the multicast data and that is returned by the PCF, so that the second session management network element generates the first QoS context information based on the PCC rule that is for the multicast data. Further, optionally, the second session management network element stores a correspondence between the multicast data and the first QoS context information. Further, optionally, the second session management network element sends an establishment indication to the first session management network element. The establishment indication may be used to indicate to establish a path for multicast data transmission between an access network device and a multicast user plane network element.

For a process in which the second session management network element generates the first QoS context information based on the PCC rule that is for the multicast data, refer to a conventional technology. Details are not described again.

In another example, the first session management network element may send the first identification information of the multicast data to a first network element, and receive the first QoS context information from the first network element.

For related descriptions of the first network element, refer to the foregoing descriptions. The first network element stores a correspondence between identification information (for example, the first identification information of the multicast data or the second identification information of the multicast data) of the multicast data and the first QoS context information. The correspondence between the identification information of the multicast data and the first QoS context information may be preconfigured by the second session management network element for the first network element.

S1104. The first session management network element receives the first QoS context information, and sends second QoS context information and third information to the access network device based on the first QoS context information.

The second QoS context information may be QoS context information of unicast data. The second QoS context information may be used to provide a specific QoS parameter of the unicast data. The unicast data may be understood as multicast data sent by the access network device to one terminal or a single terminal. For example, a communication group includes a terminal 1, a terminal 2, and a terminal 3, the terminals in the communication group can simultaneously watch CCTV1, and the terminal 1, the terminal 2, and the terminal 3 are connected to a same base station. In this case, an application server that provides CCTV1 may send data of CCTV1 to an M-UPF, the M-UPF sends the data of CCTV1 to the base station, and the base station divides the data of CCTV1 into three parts and sends the three parts to the terminal 1, the terminal 2, and the terminal 3. The data of CCTV1 that may be sent by the application server to the M-UPF and the data of CCTV1 that is sent by the M-UPF to the base station may be referred to as multicast data, and the data of CCTV1 that is sent by the base station to each terminal may be referred to as unicast data.

The QoS context information of the unicast data may include one or more of the following: identification information of a unicast QoS flow, identification information of a unicast context, a QoS parameter corresponding to the unicast QoS flow, tunnel information corresponding to the unicast data, and the like. The identification information of the unicast QoS flow may be used to identify the unicast QoS flow. Specifically, the identification information of the unicast QoS flow may be a quality of service flow identifier (QoS flow identifier, QFI) of the unicast QoS flow. The identification information of the unicast context may be used to identify the second QoS context information, and the identification information of the unicast context may be identification information of a PDU session established by the terminal. The QoS parameter corresponding to the unicast QoS flow may describe specific QoS information, for example, a delay budget or a packet loss rate of the unicast data. The tunnel information corresponding to the unicast data may be used to identify a tunnel for transmitting the unicast data and the like.

The second QoS context information corresponds to the first QoS context information, and one piece of first QoS context information may correspond to one or more pieces of second QoS context information. The first session management network element may generate the second QoS context information based on the first QoS context information, for example, set a QoS parameter corresponding to a unicast QoS flow included in the second QoS context information to be the same as a QoS parameter corresponding to a multicast QoS flow included in the first QoS context information. Specifically, for a process in which the first session management network element generates the second QoS context information based on the first QoS context information, refer to a conventional technology. Details are not described again.

The third information may be used by the access network device to determine the first QoS context information. The third information may include identification information of the first QoS context information, the first QoS context information, or identification information of a multicast context and the first QoS context information. The identification information of the multicast context may be used to identify the first QoS context information. The identification information of the multicast context may be the identification information of the multicast data, identification information of a multicast group corresponding to the multicast data, or the like. This is not limited.

For example, when the first session management network element determines that there is no transmission path established between the access network device and the multicast user plane network element, the third information sent by the first session management network element to the access network device includes the first QoS context information. It should be noted that when the first QoS context information does not include the identification information of the multicast context, in addition to sending the first QoS context information to the access network device, the first session management network element further sends the identification information of the multicast context to the access network device.

When the first session management network element determines that there is a transmission path established between the access network device and the multicast user plane network element, and the access network device stores the first QoS context information and the identification information of the multicast context, the third information sent by the first session management network element to the access network device may include the identification information of the multicast context.

It should be noted that when the first session management network element determines that there is a transmission path established between the access network device and the multicast user plane network element, the first session management network element may further send identification information of the multicast user plane network element to the access network device. The identification information of the multicast user plane network element may be sent by the second session management network element to the first session management network element in S1105.

For example, the first session management network element may determine, based on the establishment indication, whether there is a transmission path established between the access network device and the multicast user plane network element. For example, when the first session management network element receives the establishment indication from the second session management network element, the first session management network element determines that there is no transmission path established between the access network device and the multicast user plane network element; otherwise, the first session management network element determines that there is a transmission path established between the access network device and the multicast user plane network element.

S1105. The access network device receives the third information and the second QoS context information.

Further, optionally, the access network device determines the first QoS context information based on the third information, allocates, based on the first QoS context information, a radio bearer resource used for transmitting the multicast data between the access network device and the terminal, and stores a correspondence between the first QoS context information and the radio bearer resource. Alternatively, the access network device allocates, based on the second QoS context information, a radio bearer resource used for transmitting the multicast data between the access network device and the terminal, and stores a correspondence between the second QoS context information and the radio bearer resource.

It should be noted that the radio bearer resource allocated by the access network device based on the first QoS context information may not only be used to transmit the multicast data to be sent to the terminal, but also be used to transmit same multicast data sent to another terminal. However, because the radio bearer resource allocated based on the second QoS context information and used for transmitting the multicast data between the access network device and the terminal is limited, and only the multicast data to be sent to the terminal can be transmitted.

Further, optionally, the access network device determines the first QoS context information based on the third information, and stores a correspondence between the first QoS context information and the second QoS context information. It should be noted that, when the third information includes the first QoS context information and the identification information of the multicast context, or the third information includes the first QoS context information and the first QoS context information includes the identification information of the multicast context, the access network device may further store a correspondence between the first QoS context information and the identification information of the multicast context.

Further, optionally, the access network device sends acknowledgment information to the first session management network element, and the first session management network element receives the acknowledgment information sent by the access network device. The acknowledgment information may be used to indicate the second QoS context information accepted by the access network device, the acknowledgment information may include a context list, and the context list may include one or more pieces of second QoS context information accepted by the access network device.

Further, optionally, if the access network device determines that no transmission path for transmitting the multicast data is established between the multicast user plane network element and the access network device, the method shown in FIG. 11 further includes a process of establishing the transmission path for multicast data transmission between the multicast user plane network element and the access network device. The establishment method may include a manner shown in S1106 to S1108, where the transmission path is established through control plane signaling transmission. Alternatively, the establishment method includes a manner shown in S1109 and S1110, where the transmission path is established by using a multicast message initiated by a user plane. If a transmission path for transmitting the multicast data is established between the multicast user plane network element and the access network device, the following processes are not performed, and the procedure ends.

The access network device may determine, based on the following method, whether a transmission path for transmitting the multicast data is established between the multicast user plane network element and the access network device: If the access network device does not receive the first QoS context information or the access network device does not locally store the first QoS context information before S1105 is performed, it is determined that no transmission path is established between the multicast user plane network element and the access network device. Otherwise, if the access network device locally stores the first QoS context information before S1105 is performed, it is determined that a transmission path is established between the multicast user plane network element and the access network device.

S1106. The access network device sends second path information to the first session management network element.

The second path information may be used to establish the transmission path between the multicast user plane network element and the access network device. The second path information may include tunnel identification information allocated by the access network device for multicast data transmission, and the tunnel identification information may include an IP address of the access network device and/or a TEID of the access network device.

For example, the second path information may be carried in the acknowledgment information in S1105 and sent to the first session management network element.

S1107. The first session management network element receives the second path information, and sends the second path information to the second session management network element.

S1108. The second session management network element receives the second path information, and sends the second path information to the multicast user plane network element. Correspondingly, the multicast user plane network element receives the second path information.

Further, optionally, the second session management network element further sends the second identification information of the multicast data together with the second path information to the multicast user plane network element. Correspondingly, the multicast user plane network element further receives the second identification information of the multicast data, and stores a correspondence between the second path information and the second identification information of the multicast data.

Further, optionally, the second session management network element sends an establishment response to the first session management network element, where the establishment response may be used to indicate that the transmission path between the multicast user plane network element and the access network device is successfully established.

S1109. The access network device sends a join message, where the join message carries the identification information of the multicast group corresponding to the multicast data.

The identification information of the multicast group may be the identification information of the multicast context, and the identification information of the multicast group may be added to the third information by the first session management network element in S1104 and sent to the access network device.

The multicast group may be a combination of a plurality of terminals that receive the multicast data. For example, the multicast group may be a vehicle platoon that receives a command sent by a same command center, or a group that receives a same television program. The identification information of the multicast group may be used to identify the multicast group. Specifically, the identification information of the multicast group may be a temporary mobile group identifier (TMGI) of the multicast group, an IP address of an application server that provides the multicast data, identification information of a context of the corresponding multicast group, or multicast address information of the multicast data.

The join message may be used to indicate the terminal to join the multicast group corresponding to the multicast data. The join message may be an internet group management protocol (IGMP) message, a multicast listener discovery (MLD) message, another multicast protocol message, or the like. This is not limited.

Further, optionally, the join message further carries the identification information of the multicast user plane network element. The identification information of the multicast user plane network element may be sent by the second session management network element to the first session management network element, and sent by the first session management network element to the access network device. For example, when the first session management network element receives the first QoS context information from the second session management network element in S1103, the second session management network element may obtain the identification information of the multicast user plane network element, and send the identification information of the multicast user plane network element to the first session management network element. After receiving the identification information of the multicast user plane network element, the first session management network element may send the identification information of the multicast user plane network element to the access network device when sending the first QoS context information to the access network device.

For a process in which the second session management network element obtains the identification information of the multicast user plane network element, refer to the descriptions in S905. Details are not described again.

S1110. The multicast user plane network element detects the join message, and establishes the transmission path for multicast data transmission between the multicast user plane network element and an access network device.

Further, optionally, the multicast user plane network element sends a join response to the access network device, where the join response may be used to indicate that the transmission path between the multicast user plane network element and the access network device is successfully established.

In this case, a transmission path used to transmit the multicast data between the application server and the multicast user plane network element, between the multicast user plane network element and the access network device, and between the access network device and the terminal is established. Subsequently, the application server may send multicast data to the multicast user plane network element, and the multicast user plane network element receives and identifies the multicast data, and sends the multicast data to the access network device through a transmission path corresponding to the multicast data. The access network device receives the multicast data from the multicast user plane network element, determines first QoS context information corresponding to the multicast data, and sends the multicast data to the terminal based on a radio bearer resource corresponding to the first QoS context information; or determines second QoS context information based on a correspondence between first QoS context information and the second QoS context information, and sends the multicast data to the terminal by using a radio bearer resource corresponding to the second QoS context information.

Based on the method shown in FIG. 11, the multicast user plane network element configured to transmit the multicast data may be obtained in a PDU session modification process initiated by the terminal, the identification information of the multicast user plane network element is notified to the application server, and the transmission path between the multicast user plane network element and the access network device is established. In this way, the application server sends the multicast data to a same multicast user plane network element, and the multicast user plane network element sends the multicast data to the terminal through the transmission path between the multicast user plane network element and the access network device. The application server does not need to copy the multicast data into a plurality of copies and deliver the plurality of copies to a plurality of user plane network elements so that the plurality of user plane network elements send the plurality of copies to the terminal, improving resource utilization. In addition, as shown in FIG. 11, after the multicast user plane network element configured to transmit the multicast data is obtained in the PDU session modification process, the terminal does not need to be notified to re-establish a PDU session, avoiding impact of user plane network element reselection on existing unicast PDU session transmission.

With reference to the 5G communication system shown in FIG. 2, the following describes in detail establishment of the transmission path between the RAN and the UPF 2 through control plane signaling transmission in the method in FIG. 11 by using an example in which the terminal 1 requests multicast data, the terminal 1 has established a first PDU session, the first PDU session corresponds to the SMF 1 and the UPF 1, the access network device is the RAN, the mobility management network element is the AMF, the first session management network element is the SMF 1, the unicast user plane network element is the UPF 1, the second session management network element is the SMF 2, the multicast user plane network element is the UPF 2, the UPF 1 is different from the UPF 2, the first network element is the PCF, the second network element is the NEF, first identification information that is of the multicast data and that is carried in a PDU session establishment request is the same as second identification information that is of the multicast data and that is sent by the SMF 1 to the SMF 2, both the first identification information and the second identification information are identification information of the multicast data, and no transmission path is established between the RAN and the UPF 2.

FIG. 12A to FIG. 12C are a flowchart of another communication method according to an embodiment of this application. As shown in FIG. 12A to FIG. 12C, the method includes the following steps.

S1201. An application server sends identification information of multicast data to an NEF.

S1201 is the same as S1001. Details are not described again.

S1202. The NEF receives the identification information of the multicast data, and obtains identification information of an SMF 2 based on the identification information of the multicast data.

S1203. The NEF sends the identification information of the SMF 2 and the identification information of the multicast data to a PCF.

S1204. The PCF receives the identification information of the SMF 2 and the identification information of the multicast data, and stores a correspondence between the identification information of the SMF 2 and the identification information of the multicast data.

S1205. A terminal 1 sends a PDU session modification request to an AMF, and the AMF receives the PDU session modification request, and sends the PDU session modification request to an SMF 1.

S1206. The SMF 1 receives the PDU session modification request, and sends an SM policy modification request to the PCF, where the SM policy modification request carries the identification information of the multicast data.

S1207. The PCF receives the SM policy modification request, and sends an SM policy modification response to the SMF 1 based on the correspondence between the identification information of the SMF 2 and the identification information of the multicast data, where the SM policy modification response carries the identification information of the SMF 2.

S1208. The SMF 1 receives the SM policy modification response, and sends a session management context (SM context) service information obtaining request to the SMF 2 based on the identification information of the SMF 2.

The SM context service information obtaining request may be used to request first QoS context information. The SM context service information obtaining request may include the identification information of the multicast data.

S1209. The SMF 2 receives the SM context service information obtaining request, obtains identification information of a UPF 2, and sends a session management context (SM context) service information obtaining response to the SMF 1, where the SM context service information obtaining response includes the first QoS context information.

S1210. The SMF 1 receives the SM context service information obtaining response, and generates second QoS context information based on the first QoS context information.

S1211. The SMF 1 sends an N2 message to a RAN, where the N2 message includes the second QoS context information and the first QoS context information.

S1212. The RAN receives the second QoS context information and the first QoS context information, and sends an N2 message to the AMF, where the N2 message includes second path information; and the AMF receives the N2 message, and sends, to the SMF 1, an N11 message that carries the second path information.

Further, optionally, the second path information may include tunnel identification information allocated by the RAN for multicast data transmission, and the tunnel identification information may include an IP address of the RAN and/or a TEID of the RAN.

Further, optionally, the N2 message may further include a context list, and the context list may include one or more pieces of second QoS context information accepted by the RAN.

S1213. The SMF 1 receives the N11 message, and sends, to the SMF 2, an N16 message that carries the second path information.

S1214. The SMF 2 receives the N16 message, and sends N4 configuration information to the UPF 2, where the N4 configuration information may be an N4 session modification message or an N4 session establishment message, and the N4 configuration information may include the second path information.

Further, optionally, the UPF 2 sends an N4 response message to the SMF 2.

In this case, a transmission path between the application server and the UPF 2, between the UPF 2 and the RAN, and between the RAN and the terminal 1 is successfully established. The transmission path may be used to transmit the multicast data to the terminal 1.

Subsequently, if another terminal accesses a network by using the RAN and requests to receive the multicast data by using the RAN, a transmission path between the RAN and the UPF 2 may not need to be established. Subsequently, if another terminal such as a terminal 2 or a terminal 3 requests the multicast data, there is no need to send, in S1211, the first QoS context information to the RAN, but only need to send identification information of a multicast context corresponding to the first QoS context information and the second QoS context information, and there is no need to perform S1212 to S1114 to establish the transmission path between the UPF 2 and the RAN.

Based on the method shown in FIG. 12A to FIG. 12C, the UPF 2 used to transmit the multicast data may be obtained in a PDU session modification process initiated by the terminal, the identification information of the UPF 2 is notified to the application server, and the transmission path between the UPF 2 and the RAN is established, so that the application server sends the multicast data to the UPF 2, and the UPF 2 sends the multicast data to the terminal through the transmission path between the UPF 2 and the RAN. The application server does not need to copy the multicast data into a plurality of copies and deliver the plurality of copies to a plurality of user plane network elements so that the plurality of user plane network elements send the plurality of copies to the terminal, improving resource utilization.

The foregoing mainly describes the solutions provided in embodiments of this application from a perspective of interaction between nodes. It can be understood that, to implement the foregoing functions, the nodes, such as the first session management network element, the second session management network element, the mobility management network element, and the first network element, include corresponding hardware structures and/or software modules for performing the functions. A person skilled in the art should easily be aware that, in combination with algorithm steps of the examples described in embodiments disclosed in this specification, the methods in embodiments of this application can be implemented by hardware, software, or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function module division may be performed on the first session management network element, the second session management network element, the mobility management network element, the first network element, and the like based on the foregoing method examples, for example, function modules may be divided based on functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 13:
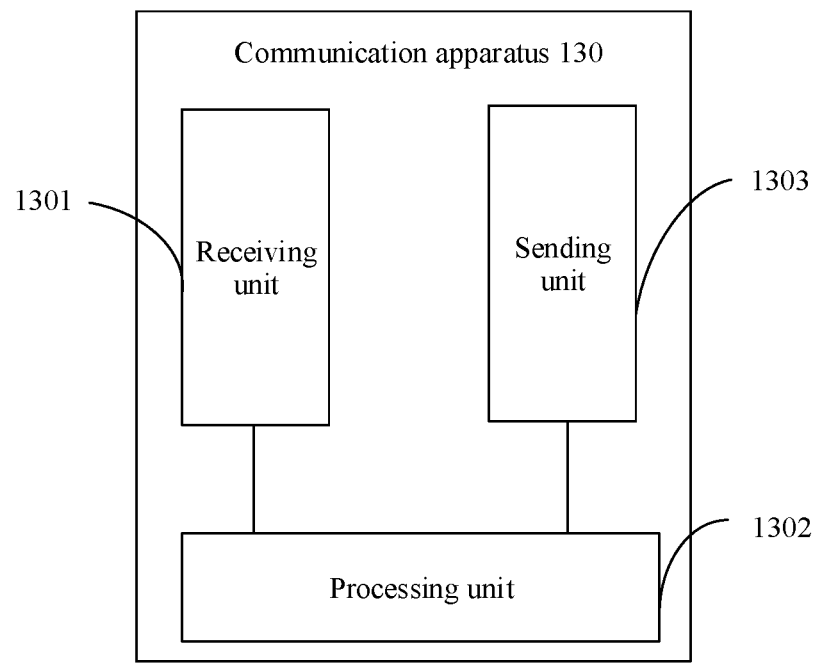
FIG. 13 is a schematic diagram of composition of a communication apparatus 130 according to an embodiment of this application.

FIG. 13 is a diagram of a structure of a communication apparatus 130. The communication apparatus 130 may be a first session management network element, a chip or a system on chip in the first session management network element, or another apparatus that can implement a function of the first session management network element in the foregoing methods. The communication apparatus 130 may be configured to perform the function of the first session management network element in the foregoing method embodiments. In an implementation, the communication apparatus 130 shown in FIG. 13 includes a receiving unit 1301, a processing unit 1302, and a sending unit 1303.

In an exemplary embodiment, the receiving unit 1301 is configured to receive a first request including identification information of multicast data, where the first request is used to request to use a first PDU session to transmit the multicast data. For example, the receiving unit 1301 is configured to support the communication apparatus 130 in performing S402, S503, and S603.

The processing unit 1302 is configured to obtain identification information of a multicast user plane network element based on the first request, where the multicast user plane network element is an anchor for transmitting the multicast data, and the first session management network element is a session management network element corresponding to the first PDU session. For example, the processing unit 1302 may support the communication apparatus 130 in performing S403, S505, and S605.

Specifically, all related content of the steps in the foregoing method embodiments shown in FIG. 4A to FIG. 6B may be cited in function descriptions of the corresponding function modules. Details are not described herein again. The communication apparatus 130 is configured to perform a function of the first session management network element in the communication methods shown in FIG. 4A to FIG. 6B, and therefore can achieve same effects as the foregoing communication methods.

In another exemplary embodiment, the receiving unit 1301 is configured to receive a first request, where the first request is used to request to use a first PDU session to transmit multicast data, the first request includes first identification information of the multicast data, and the first session management network element is configured to manage a user plane network element corresponding to the first PDU session. For example, the receiving unit 1301 is configured to support the communication apparatus 130 in performing S902, S1006, S1102, and S1206.

The processing unit 1302 is configured to obtain forwarding configuration information or first quality of service QoS context information of the multicast data based on the first identification information of the multicast data. For example, the processing unit 1302 is configured to support the communication apparatus 130 in performing S906, S1012, S1103, and S1210.

Specifically, all related content of the steps in the foregoing method embodiments shown in FIG. 9 to FIG. 12C may be cited in function descriptions of the corresponding function modules. Details are not described herein again. The communication apparatus 130 is configured to perform a function of the first session management network element in the communication methods shown in FIG. 9 to FIG. 12C, and therefore can achieve same effects as the foregoing communication methods.

In another implementation, the communication apparatus 130 shown in FIG. 13 includes a processing module and a communication module. The processing module is configured to control and manage an action of the communication apparatus 130. For example, the processing module may integrate a function of the processing unit 1302, and may be configured to support the communication apparatus 130 in performing S403, S505, S605, S906, S1012, S1103, S1210, and another process in the technology described in this specification. The communication module may integrate functions of the receiving unit 1301 and the sending unit 1303, and may be configured to support the communication apparatus 130 in performing steps such as S402, S503, S603, S902, S1006, S1102 and S1206 and communicating with another network entity, for example, communicating with a function module or a network entity shown in FIG. 1. The communication apparatus 130 may further include a storage module, configured to store instructions and/or data. When the instructions are executed by the processing module, the processing module may be enabled to implement the foregoing method on the first session management network side.

The processing module may be a processor, a controller, a module, or a circuit. The processing module may implement or execute various example logical blocks described with reference to content disclosed in this application. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 130 in this application may be the communication apparatus shown in FIG. 3.

Figure 14:
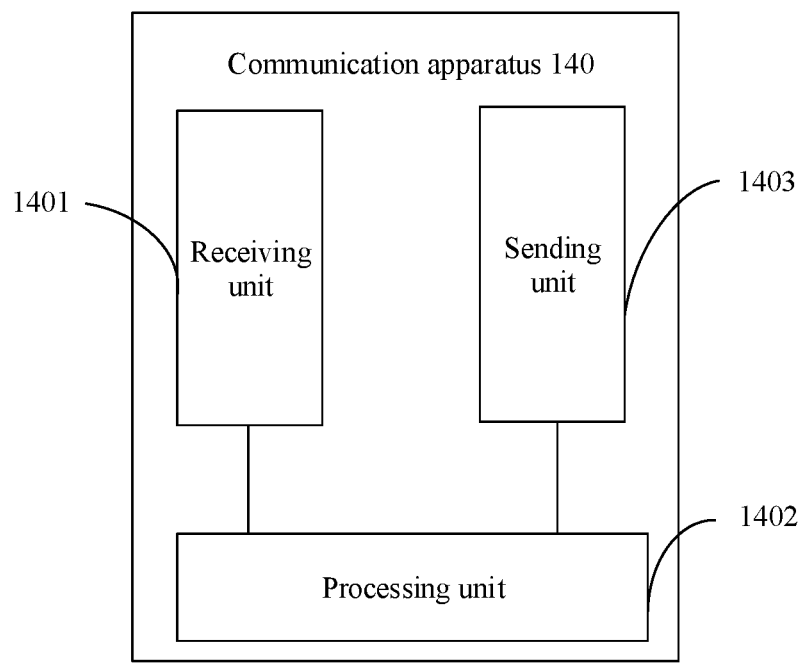
FIG. 14 is a schematic diagram of composition of a communication apparatus 140 according to an embodiment of this application.

FIG. 14 is a diagram of a structure of a communication apparatus 140. The communication apparatus 140 may be a second session management network element, a chip or a system on chip in the second session management network element, or another apparatus that can implement a function of the second session management network element in the foregoing methods. The communication apparatus 140 may be configured to perform the function of the second session management network element in the foregoing method embodiments. In an implementation, the communication apparatus 140 shown in FIG. 14 includes a receiving unit 1401, a processing unit 1402, and a sending unit 1403.

In an exemplary embodiment, the receiving unit 1401 is configured to: receive second information, and receive a PDU session establishment request for establishing a PDU session from a mobility management network element. For example, the receiving unit is configured to support the communication apparatus 140 in performing S607.

The sending unit 1403 is configured to send identification information of multicast data to a multicast user plane network element based on the PDU session establishment request and the second information, where the multicast user plane network element is an anchor for transmitting the multicast data. The second information includes one or both of identification information of the multicast user plane network element and the identification information of the multicast data. For example, the sending unit is configured to support the communication apparatus 140 in performing S615.

Specifically, all related content of the steps in the foregoing method embodiments shown in FIG. 4A to FIG. 6B may be cited in function descriptions of the corresponding function modules. Details are not described herein again. The communication apparatus 140 is configured to perform a function of the second session management network element in the communication methods shown in FIG. 4A to FIG. 6B, and therefore can achieve same effects as the foregoing communication methods.

In another exemplary embodiment, the receiving unit 1401 is configured to receive, from a mobility management network element, a PDU session establishment request used to request to establish a PDU session, where the PDU session establishment request includes a PDU session type, the PDU session type is used to indicate that the PDU session that a terminal requests to establish is a multicast PDU session, and the multicast PDU session is used to transmit multicast data. For example, the receiving unit 1401 is configured to support the communication apparatus 140 in performing S703 and S811.

The processing unit 1402 is configured to select a multicast user plane network element based on the PDU session establishment request, where the multicast user plane network element is an anchor for transmitting the multicast data. For example, the processing unit 1402 supports the communication apparatus 140 in performing S703 and S813.

The sending unit 1403 is configured to send identification information of the multicast data to the multicast user plane network element. For example, the sending unit 1403 supports the communication apparatus in performing S704 and S814.

Specifically, all related content of the steps in the foregoing method embodiments shown in FIG. 7 and FIG. 8A and FIG. 8B may be cited in function descriptions of the corresponding function modules. Details are not described herein again. The communication apparatus 140 is configured to perform a function of the second session management network element in the communication methods shown in FIG. 7 and FIG. 8A and FIG. 8B, and therefore can achieve same effects as the foregoing communication methods.

In still another exemplary embodiment, the receiving unit 1401 is configured to receive second identification information of multicast data from a first session management network element. For example, the receiving unit 1401 supports the communication apparatus 140 in performing S904, S1009, and S1209.

The sending unit 1403 is configured to send forwarding configuration information or and/or first quality of service QoS context information of the multicast data and identification information of a multicast user plane network element to the first session management network element based on the second identification information of the multicast data, where a multicast user plane network element is an anchor for transmitting the multicast data, and the second session management network element is a session management network element that manages the multicast user plane network element. For example, the sending unit 1403 is configured to support the communication apparatus 140 in performing S905, S1011, S1104, and S1209.

Specifically, all related content of the steps in the foregoing method embodiments shown in FIG. 9 to FIG. 12C may be cited in function descriptions of the corresponding function modules. Details are not described herein again. The communication apparatus 140 is configured to perform a function of the second session management network element in the communication methods shown in FIG. 9 to FIG. 12C, and therefore can achieve same effects as the foregoing communication methods.

In another implementation, the communication apparatus 140 shown in FIG. 14 includes a processing module and a communication module. The processing module is configured to control and manage an action of the communication apparatus 140. For example, the processing module may integrate a function of the processing unit 1402, and may be configured to support the communication apparatus 140 in performing S703, S813, and an action of the second session management network element described in this specification other than a sending or receiving action. The communication module may integrate functions of the receiving unit 1401 and the sending unit 1403, and may be configured to support the communication apparatus 140 in performing S607, S615, S703, S811, S704, S814, S904, S1009, S1209, S905, S1011, S1104, S1209, and communicating with another network entity, for example, communicating with a function module or a network entity shown in FIG. 1. The communication apparatus 140 may further include a storage module, configured to store instructions and/or data of the communication apparatus 140. When the instructions are executed by the processing module, the processing module may be enabled to implement the foregoing methods on the terminal side.

The processing module may be a processor, a controller, a module, or a circuit. The processing module may implement or execute various example logical blocks described with reference to content disclosed in this application. Alternatively, the processor may be a combination of processors implementing a computing function, for example, a combination of one or more microprocessors, or a combination of the DSP and a microprocessor. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 140 in embodiments of this application may be the communication apparatus shown in FIG. 3.

Figure 15:
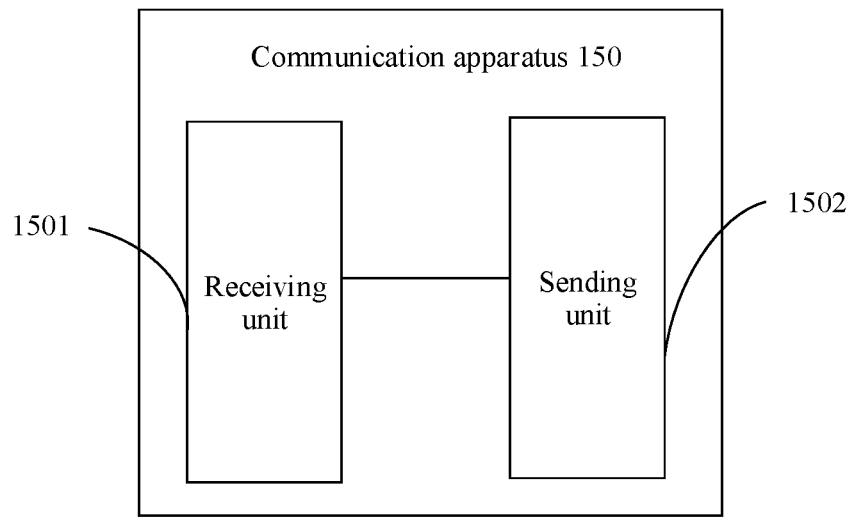
FIG. 15 is a schematic diagram of composition of a communication apparatus 150 according to an embodiment of this application.

FIG. 15 is a diagram of a structure of a communication apparatus 150. The communication apparatus 150 may be a mobility management network element, a chip or a system on chip in the mobility management network element, or another apparatus that can implement a function of the mobility management network element in the foregoing methods. The communication apparatus 150 may be configured to perform the function of the mobility management network element in the foregoing method embodiments. In an implementation, the communication apparatus 150 shown in FIG. 15 includes a receiving unit 1501 and a sending unit 1502.

In an exemplary embodiment, the receiving unit 1501 is configured to receive first information and identification information of a first PDU session from a first session management network element, where the first information is used to determine a second session management network element, and the second session management network element is a session management network element that manages a multicast user plane network element. For example, the receiving unit 1501 is configured to support the communication apparatus 150 in performing S609.

The sending unit 1502 is configured to send a PDU session re-establishment notification to a terminal, where the PDU session re-establishment notification includes the identification information of the first PDU session. For example, the sending unit 1502 is configured to support the communication apparatus 150 in performing S406, S410, S507, and S609.

The receiving unit 1501 is further configured to receive a NAS message from the terminal, where the NAS message includes a PDU session establishment request and the identification information of the first PDU session, the PDU session establishment request is used to request to establish a PDU session, and the PDU session establishment request includes identification information of a second PDU session.

For example, the receiving unit 1501 is configured to support the communication apparatus 150 in performing S411, S511, and S614.

The sending unit 1502 is further configured to send the PDU session establishment request to the second session management network element based on the NAS message and the first information. For example, the sending unit 1502 is configured to support the communication apparatus 150 in performing S411 and S614.

Specifically, all related content of the steps in the foregoing method embodiments shown in FIG. 4A to FIG. 6B may be cited in function descriptions of the corresponding function modules. Details are not described herein again. The communication apparatus 150 is configured to perform a function of the mobility management network element in the communication methods shown in FIG. 4A to FIG. 6B, and therefore can achieve same effects as the foregoing communication methods.

In another exemplary embodiment, the receiving unit 1501 is configured to receive a PDU session establishment request from a terminal, where the PDU session establishment request is used to request to establish a PDU session, the PDU session establishment request includes a PDU session type, the PDU session type is used to indicate that the PDU session that the terminal requests to establish is a multicast PDU session, and the multicast PDU session is used to transmit multicast data. For example, the receiving unit 1501 is configured to support the communication apparatus 150 in performing S702 and S805.

The sending unit 1502 is configured to send the PDU session establishment request to a multicast session management network element based on the PDU session establishment request, where the multicast session management network element is a session management network element that manages a multicast user plane network element, and the multicast user plane network element is an anchor for transmitting the multicast data. For example, the sending unit 1502 is configured to support the communication apparatus 150 in performing S702 and S810.

Specifically, all related content of the steps in the foregoing method embodiments shown in FIG. 7 and FIG. 8A and FIG. 8B may be cited in function descriptions of the corresponding function modules. Details are not described herein again. The communication apparatus 150 is configured to perform a function of the mobility management network element in the communication methods shown in FIG. 7 and FIG. 8A and FIG. 8B, and therefore can achieve same effects as the foregoing communication methods.

In another implementation, the communication apparatus 150 shown in FIG. 15 includes a processing module and a communication module. The processing module is configured to control and manage an action of the communication apparatus 150. The communication module may integrate functions of the receiving unit 1501 and the sending unit 1502, and may be configured to support the communication apparatus 150 in performing steps such as S609, S406, S410, S507, S609, S411, S511, S614, S411, S614, S702, S805, S702, and S810, and communicating with another network entity, for example, communicating with a function module or a network entity shown in FIG. 1. The communication apparatus 150 may further include a storage module, configured to store instructions and/or data. When the instructions are executed by the processing module, the processing module may be enabled to implement the foregoing method on the mobility management network side.

The processing module may be a processor, a controller, a module, or a circuit. The processing module may implement or execute various example logical blocks described with reference to content disclosed in this application. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 150 in this application may be the communication apparatus shown in FIG. 3.

Figure 16:
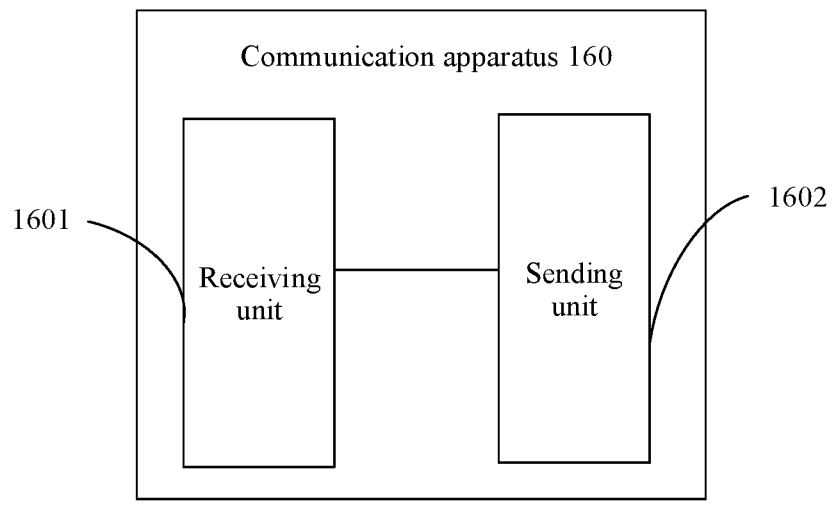
FIG. 16 is a schematic diagram of composition of a communication apparatus 160 according to an embodiment of this application.

FIG. 16 is a diagram of a structure of a communication apparatus 160. The communication apparatus 160 may be a first network element, a chip or a system on chip in the first network element, or another apparatus that can implement a function of the first network element in the foregoing methods. The communication apparatus 160 may be configured to perform the function of the first network element in the foregoing method embodiments. In an implementation, the communication apparatus 160 shown in FIG. 16 includes a receiving unit 1601 and a sending unit 1602.

In an exemplary embodiment, the receiving unit 1601 is configured to receive identification information of multicast data. For example, the receiving unit 1601 is configured to support the communication apparatus 160 in performing S504 and S604.

The sending unit 1602 is configured to send identification information of a multicast user plane network element, where the multicast user plane network element is an anchor for transmitting the multicast data. For example, the sending unit 1602 is configured to support the communication apparatus 160 in performing S504 and S604.

In another exemplary embodiment, the receiving unit 1601 is configured to receive identification information of multicast data from a first session management network element. For example, the receiving unit 1601 is configured to support the communication apparatus 160 in performing S606.

The sending unit 1602 is configured to send identification information of a second session management network element to the first session management network element based on a correspondence between the identification information of the multicast data and the identification information of the second session management network element. For example, the sending unit is configured to support the communication apparatus 160 in performing S606.

Specifically, all related content of the steps in the foregoing method embodiments shown in FIG. 5A and FIG. 5B, and FIG. 6A and FIG. 6B may be cited in function descriptions of the corresponding function modules. Details are not described herein again. The communication apparatus 160 is configured to perform a function of the first network element in the communication methods shown in FIG. 5A and FIG. 5B, and FIG. 6A and FIG. 6B, and therefore can achieve same effects as the foregoing communication methods.

In another implementation, the communication apparatus 160 shown in FIG. 16 includes a processing module and a communication module. The processing module is configured to control and manage an action of the communication apparatus 160. For example, the communication module may integrate functions of the receiving unit 1601 and the sending unit 1602, and may be configured to support the communication apparatus 160 in performing S504, S604, and S606, and communicating with another network entity, for example, communicating with a function module or a network entity shown in FIG. 1. The communication apparatus 160 may further include a storage module, configured to store instructions and/or data of the communication apparatus 160. When the instructions are executed by the processing module, the processing module may be enabled to implement the foregoing methods on the terminal side.

The processing module may be a processor, a controller, a module, or a circuit. The processing module may implement or execute various example logical blocks described with reference to content disclosed in this application. Alternatively, the processor may be a combination of processors implementing a computing function, for example, a combination of one or more microprocessors, or a combination of the DSP and a microprocessor. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 160 in this application may be the communication apparatus shown in FIG. 3.

Figure 17:
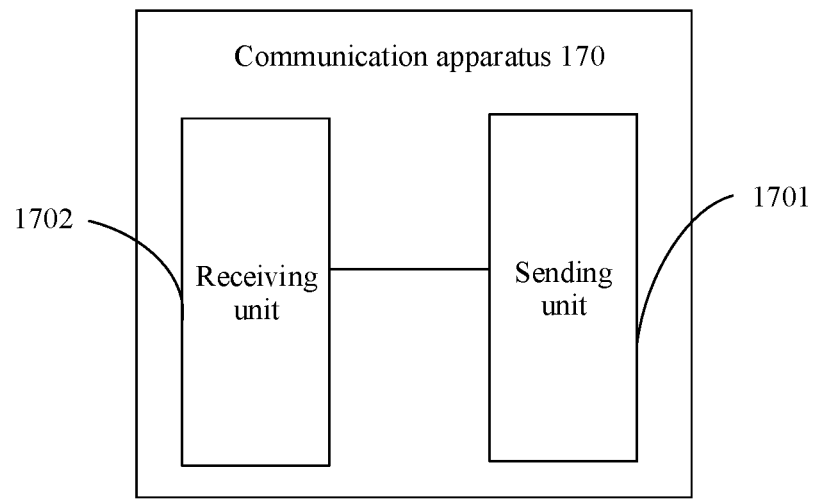
FIG. 17 is a schematic diagram of composition of a communication apparatus 170 according to an embodiment of this application.

FIG. 17 is a diagram of a structure of a communication apparatus 170. The communication apparatus 170 may be an application server, a chip or a system on chip in the application server, or another apparatus that can implement a function of the application server in the foregoing methods. The communication apparatus 170 may be configured to perform the function of the application server in the foregoing method embodiments. In an implementation, the communication apparatus 170 shown in FIG. 17 includes a sending unit 1701 and a receiving unit 1702.

In an exemplary embodiment, the sending unit 1701 is configured to send identification information of multicast data. For example, the sending unit 1701 may support the communication apparatus 170 in performing S1001 and S1201.

The receiving unit 1702 is configured to receive identification information of a multicast user plane network element, where the multicast user plane network element is an anchor for transmitting the multicast data.

Specifically, all related content of the steps in the foregoing method embodiments shown in FIG. 9 to FIG. 12C may be cited in function descriptions of the corresponding function modules. Details are not described herein again. The communication apparatus 170 is configured to perform a function of the application server in the communication methods shown in FIG. 9 to FIG. 12C, and therefore can achieve same effects as the foregoing communication methods.

In another implementation, the communication apparatus 170 shown in FIG. 17 includes a processing module and a communication module. The processing module is configured to control and manage an action of the communication apparatus 170. For example, the communication module may integrate functions of the receiving unit 1702 and the sending unit 1701, and may be configured to support the communication apparatus 170 in performing S1001 and S1201, and communicating with another network entity, for example, communicating with a function module or a network entity shown in FIG. 1. The communication apparatus 170 may further include a storage module, configured to store instructions and/or data of the communication apparatus 170. When the instructions are executed by the processing module, the processing module may be enabled to implement the foregoing methods on the terminal side.

The processing module may be a processor, a controller, a module, or a circuit. The processing module may implement or execute various example logical blocks described with reference to content disclosed in this application. Alternatively, the processor may be a combination of processors implementing a computing function, for example, a combination of one or more microprocessors, or a combination of the DSP and a microprocessor. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 170 in embodiments of this application may be the communication apparatus shown in FIG. 3.

Figure 18:
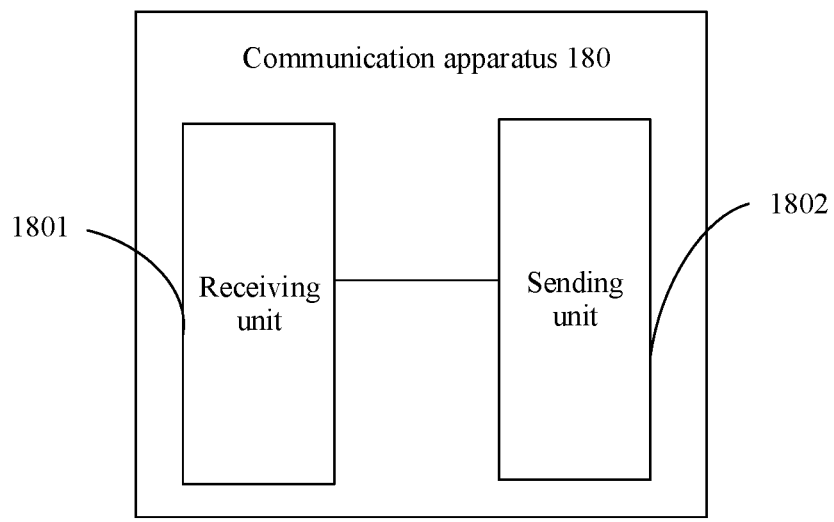
FIG. 18 is a schematic diagram of composition of a communication apparatus 180 according to an embodiment of this application.

FIG. 18 is a diagram of a structure of a communication apparatus 180. The communication apparatus 180 may be a second network element, a chip or a system on chip in the second network element, or another apparatus that can implement a function of the second network element in the foregoing methods. The communication apparatus 180 may be configured to perform the function of the second network element in the foregoing method embodiments. In an implementation, the communication apparatus 180 shown in FIG. 18 includes a receiving unit 1801 and a sending unit 1802.

In an exemplary embodiment, the receiving unit 1801 is configured to receive identification information of multicast data from an application server. For example, the receiving unit 1801 may support the communication apparatus 180 in performing S1002 and S1202.

The sending unit 1802 is configured to send the identification information of the multicast data to a second session management network element based on the identification information of the multicast data.

Specifically, all related content of the steps in the foregoing method embodiments shown in FIG. 7 and FIG. 8A and FIG. 8B may be cited in function descriptions of the corresponding function modules. Details are not described herein again. The communication apparatus 180 is configured to perform a function of the second network element in the communication methods shown in FIG. 7 and FIG. 8A and FIG. 8B, and therefore can achieve same effects as the foregoing communication methods.

In another implementation, the communication apparatus 180 shown in FIG. 18 includes a processing module and a communication module. The processing module is configured to control and manage an action of the communication apparatus 180. For example, the communication module may integrate functions of the receiving unit 1801 and the sending unit 1802, and may be configured to support the communication apparatus 180 in performing S1002 and S1202, and communicating with another network entity, for example, communicating with a function module or a network entity shown in FIG. 1. The communication apparatus 180 may further include a storage module, configured to store instructions and/or data of the communication apparatus 180. When the instructions are executed by the processing module, the processing module may be enabled to implement the foregoing methods on the terminal side.

The processing module may be a processor, a controller, a module, or a circuit. The processing module may implement or execute various example logical blocks described with reference to content disclosed in this application. Alternatively, the processor may be a combination of processors implementing a computing function, for example, a combination of one or more microprocessors, or a combination of the DSP and a microprocessor. The communication module may be a transceiver circuit, a pin, an interface circuit, a bus interface, a communication interface, or the like. The storage module may be a memory. When the processing module is the processor, the communication module is the communication interface, and the storage module is the memory, the communication apparatus 180 in embodiments of this application may be the communication apparatus shown in FIG. 3.

Figure 19:
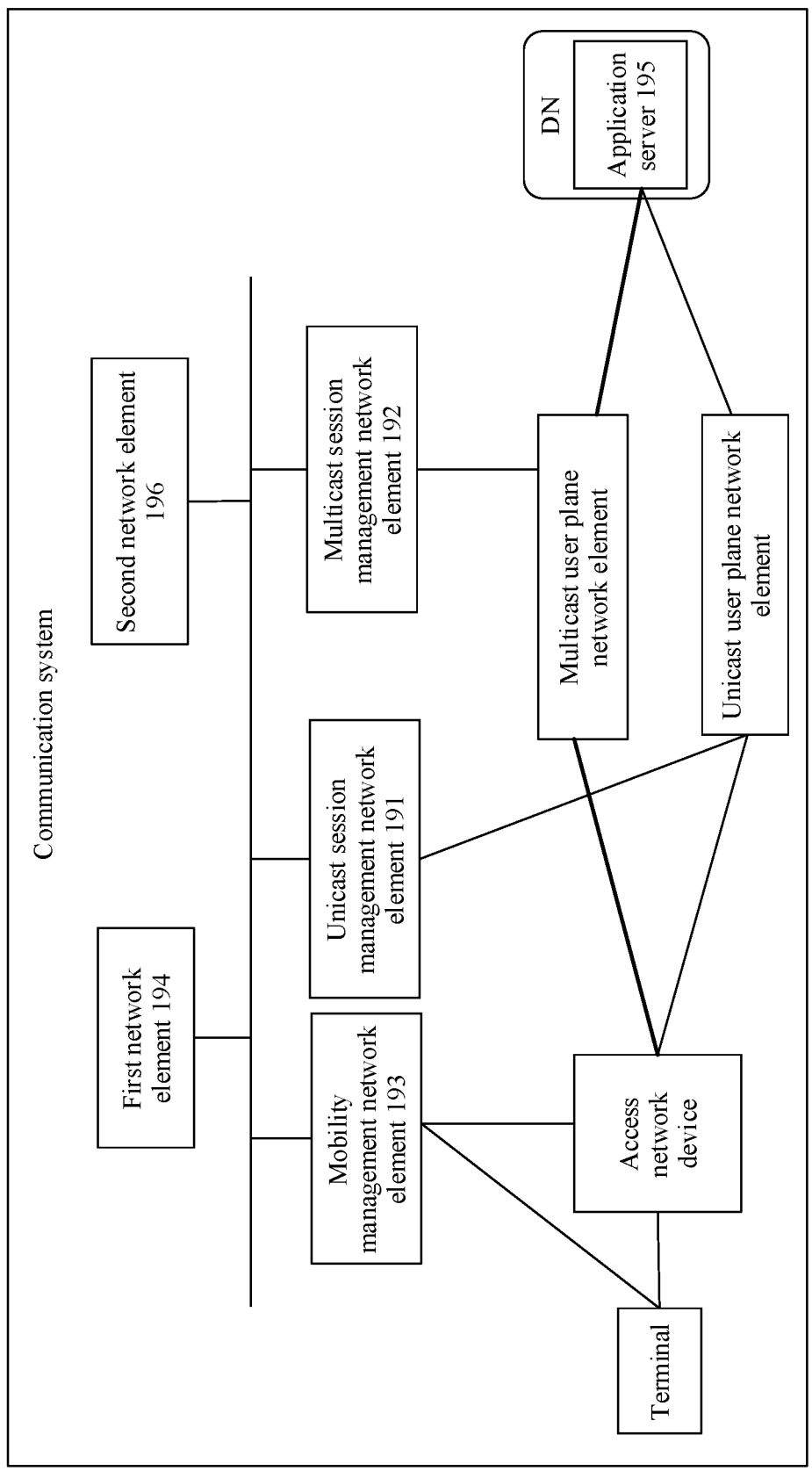
FIG. 19 is a schematic diagram of composition of a communication system according to an embodiment of this application.

FIG. 19 is a diagram of a structure of a communication system according to an embodiment of this application. As shown in FIG. 19, the communication system may include a terminal, an access network device, a mobility management network element 193, a unicast session management network element 191, a unicast user plane network element, a multicast user plane network element, a multicast session management network element 192, a first network element 194, an application server 195, and a second network element 196.

The unicast session management network element 191 may have a function of the communication apparatus 130. The multicast session management network element 192 may have a function of the communication apparatus 140. The mobility management network element 193 may have a function of the communication apparatus 150. The first network element 194 may have a function of the communication apparatus 160. The application server 195 may have a function of the communication apparatus 170. The second network element 196 may have a function of the communication apparatus 180. Details are not described herein again.

An embodiment of this application further provides a computer-readable storage medium. All or some of the processes in the foregoing method embodiments may be completed by a computer program instructing related hardware. The program may be stored in the foregoing computer-readable storage medium. When the program is executed, the processes of the foregoing method embodiments may be performed. The computer-readable storage medium may be an internal storage unit of the terminal apparatus (for example, including a data transmit end and/or a data receive end) in any one of the foregoing embodiments, for example, a hard disk or a memory of the terminal apparatus. Alternatively, the computer-readable storage medium may be an external storage device of the terminal apparatus, for example, a plug-in hard disk, a smart media card (SMC), a secure digital (SD) card, a flash card, or the like that is configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

An embodiment of this application further provides computer instructions. All or some of the procedures in the foregoing method embodiments may be implemented by related hardware (such as a computer, a processor, a network device, and a terminal) instructed by the computer instructions. The program may be stored in the foregoing computer-readable storage medium.

It should be noted that, in the specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

Unless otherwise specified, "transmit/transmission" in embodiments of this application refers to bidirectional transmission, and includes a sending action and/or a receiving action. Specifically, "transmit/transmission" in embodiments of this application includes data sending, data receiving, or data sending and data receiving. In other words, data transmission herein includes uplink and/or downlink data transmission. The data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" convey a same concept, and a communication system is a communication network.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed at different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, technical solutions of embodiments of this application may be implemented in a form of a software product. The software product is stored in a storage medium and includes several instructions for instructing a device, where for example, the device may be a single-chip microcomputer or a chip, or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions merely describe exemplary implementations of this application, but are not intended to limit the protection scope of this application. Any variation or replacement within the technical scope disclosed in this application may fall within the protection scope of this application.

What is claimed is:

1. A communication method, comprising:
    receiving, by a first session management network element, a protocol data unit (PDU) session modification request, wherein the PDU session modification request comprises first identification information of multicast data and identification information of a first PDU session, and the first session management network element is configured to manage a user plane network element corresponding to the first PDU session;
    obtaining, by the first session management network element, quality of service (QoS) context information of the multicast data based on the first identification information of the multicast data; and
    sending, by the first session management network element to an access network device, QoS context information of unicast data and identification information of a multicast group corresponding to the multicast data, wherein the identification information of the multicast group corresponding to the multicast data is usable by the access network device for determining the QoS context information of the multicast data;
    wherein obtaining the QoS context information of the multicast data based on the first identification information of the multicast data comprises:
        obtaining, by the first session management network element, identification information of a second session management network element based on the first identification information of the multicast data, wherein the second session management network element manages a multicast user plane network element, and the multicast user plane network element is an anchor for transmitting the multicast data;
        sending, by the first session management network element, second identification information of the multicast data to the second session management network element based on the identification information of the second session management network element; and
        receiving, by the first session management network element, the QoS context information of the multicast data from the second session management network element.

2. The method according to claim 1, wherein the first identification information comprises:
    an identifier of the multicast group corresponding to the multicast data; or
    an IP address of an application server that provides the multicast data.

3. The method according to claim 1, wherein the first identification information comprises an identifier (ID) of a multicast PDU session for transmitting the multicast data.

4. The method according to claim 1, wherein the QoS context information of the multicast data comprises one or more of the following:
    identification information of a multicast QoS flow;
    identification information of a multicast context;
    a QoS parameter corresponding to the multicast QoS flow; or
    tunnel information corresponding to the multicast data.

5. The method according to claim 1, wherein the QoS context information of the unicast data comprises one or more of the following:
    identification information of a unicast QoS flow;
    identification information of a unicast context;
    a QoS parameter corresponding to the unicast QoS flow; or
    tunnel information corresponding to the unicast data.

6. The method according to claim 1, wherein the method further comprises:
    generating, by the first session management network element, the QoS context information of the unicast data based on the QoS context information of the multicast data.

7. The method according to claim 6, wherein the QoS context information of the unicast data corresponds to the QoS context information of the multicast data.

8. The method according to claim 1, wherein the second identification information comprises:
    an identifier of the multicast group corresponding to the multicast data; or
    an IP address of an application server that provides the multicast data.

9. A communication apparatus, comprising:
    at least one processor; and
    a non-transitory storage medium storing executable instructions, wherein the non-transitory storage medium is coupled to the at least one processor;
    wherein the executable instructions, when executed by the at least one processor, facilitate performance of the following by the communication apparatus:
        receiving a protocol data unit (PDU) session modification request, wherein the PDU session modification request comprises first identification information of multicast data and identification information of a first PDU session, and the communication apparatus is configured to manage a user plane network element corresponding to the first PDU session;

obtaining quality of service (QoS) context information of the multicast data based on the first identification information of the multicast data; and sending, to an access network device, QoS context information of unicast data and identification information of a multicast group corresponding to the multicast data, wherein the identification information of the multicast group corresponding to the multicast data is usable by the access network device for determining the QoS context information of the multicast data;

wherein obtaining the QoS context information of the multicast data based on the first identification information of the multicast data comprises:

obtaining identification information of a second session management network element based on the first identification information of the multicast data, wherein the second session management network element manages a multicast user plane network element, and the multicast user plane network element is an anchor for transmitting the multicast data;

sending second identification information of the multicast data to the second session management network element based on the identification information of the second session management network element; and receiving the QoS context information of the multicast data from the second session management network element.

10. The apparatus according to claim 9, wherein the first identification information comprises:
an identifier of the multicast group corresponding to the multicast data; or
an IP address of an application server that provides the multicast data.

11. The apparatus according to claim 9, wherein the first identification information comprises an identifier (ID) of a multicast PDU session used to transmit the multicast data.

12. The apparatus according to claim 9, wherein the QoS context information of the multicast data comprises one or more of the following:
identification information of a multicast QoS flow;
identification information of a multicast context;
a QoS parameter corresponding to the multicast QoS flow; or
tunnel information corresponding to the multicast data.

13. The apparatus according to claim 9, wherein the QoS context information of the unicast data comprises one or more of the following:
identification information of a unicast QoS flow;
identification information of a unicast context;
a QoS parameter corresponding to the unicast QoS flow; or
tunnel information corresponding to the unicast data.

14. The apparatus according to claim 9, wherein the at least one processor is further configured to:
generate the QoS context information of the unicast data based on the QoS context information of the multicast data.

15. A communication system, comprising:
a first session management network element; and
a user plane network element;

wherein the first session management network element is configured to:

receive a protocol data unit (PDU) session modification request, wherein the PDU session modification request comprises first identification information of multicast data and identification information of a first PDU session, and the first session management network element is configured to manage the user plane network element;

obtain quality of service (QoS) context information of the multicast data based on the first identification information of the multicast data; and send, to an access network device, QoS context information of unicast data and identification information of a multicast group corresponding to the multicast data, wherein the identification information of the multicast group corresponding to the multicast data is usable by the access network device for determining the QoS context information of the multicast data; and wherein the user plane network element corresponds to the first PDU session;

wherein obtaining the QoS context information of the multicast data based on the first identification information of the multicast data comprises:

obtaining identification information of a second session management network element based on the first identification information of the multicast data, wherein the second session management network element is configured to manage a multicast user plane network element, and the multicast user plane network element is an anchor for transmitting the multicast data;

sending second identification information of the multicast data to the session management network element based on the identification information of the second session management network element; and receiving the QoS context information of the multicast data from the second session management network element.

16. The system according to claim 15, wherein the system further comprises the second session management network element;

wherein the second session management network element is further configured to:

receive the second identification information of the multicast data from the first session management network element; and send the QoS context information of the multicast data to the first session management network element.

17. A non-transitory computer-readable medium having processor-executable instructions stored thereon for a communication method for a first session management network, wherein the processor-executable instructions, when executed, facilitate performance of the following:

receiving a protocol data unit (PDU) session modification request, wherein the PDU session modification request comprises first identification information of multicast data and identification information of a first PDU session, and the first session management network element is configured to manage a user plane network element corresponding to the first PDU session;

obtaining quality of service (QoS) context information of the multicast data based on the first identification information of the multicast data; and sending, to an access network device, QoS context information of unicast data and identification information of a multicast group corresponding to the multicast data, wherein the identification information of the multicast group corresponding to the multicast data is usable by the access network device for determining the QoS context information of the multicast data;

wherein obtaining the QoS context information of the multicast data based on the first identification information of the multicast data comprises:

obtaining identification information of a second session management network element based on the first identification information of the multicast data, wherein the second session management network element is configured to manage a multicast user plane network element, and the multicast user plane network element is an anchor for transmitting the multicast data;

sending second identification information of the multicast data to the second session management network element based on the identification information of the second session management network element; and receiving the QoS context information of the multicast data from the second session management network element.

18. The non-transitory computer-readable medium according to claim 17, wherein the first identification information comprises:

an identifier of the multicast group corresponding to the multicast data; or an IP address of an application server that provides the multicast data.

19. The non-transitory computer-readable medium according to claim 17, wherein the processor-executable instructions, when executed, further facilitate performance of the following:

generating the QoS context information of the unicast data based on the QoS context information of the multicast data.

* * * * *